(12) United States Patent
Hamada

(10) Patent No.: US 6,798,960 B2
(45) Date of Patent: Sep. 28, 2004

(54) OPTICAL DEVICE

(75) Inventor: Hidenobu Hamada, Amagasaki (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 386 days.

(21) Appl. No.: 09/883,949

(22) Filed: Jun. 20, 2001

(65) Prior Publication Data

US 2001/0054681 A1 Dec. 27, 2001

(30) Foreign Application Priority Data

| Jun. 21, 2000 | (JP) | ................................... 2000-186343 |
| Oct. 31, 2000 | (JP) | ................................... 2000-333106 |
| Dec. 7, 2000 | (JP) | ................................... 2000-372771 |

(51) Int. Cl.[7] .............................................. G02B 6/02
(52) U.S. Cl. ................................. 385/122; 385/123
(58) Field of Search .................................. 385/122–128

(56) References Cited

U.S. PATENT DOCUMENTS

| 4,676,588 A | * | 6/1987 | Bowen et al. ................ 385/62 |
| 5,365,541 A | | 11/1994 | Bullock |
| 5,802,236 A | * | 9/1998 | DiGiovanni et al. ........ 385/127 |
| 6,044,190 A | | 3/2000 | Kashyap |
| 6,075,915 A | | 6/2000 | Koops et al. |
| 6,301,421 B1 | * | 10/2001 | Wickham et al. ........... 385/126 |
| 6,334,019 B1 | * | 12/2001 | Birks et al. ................. 385/125 |
| 6,470,127 B2 | * | 10/2002 | Voevodkin .................. 385/123 |
| 6,522,820 B2 | * | 2/2003 | Wang ......................... 385/125 |
| 6,535,657 B2 | * | 3/2003 | Dyott .......................... 385/11 |

FOREIGN PATENT DOCUMENTS

| EP | 1 103 829 | 5/2001 |
| JP | 58-059401 | 4/1983 |
| JP | 3-44562 | 2/1991 |
| JP | 7-248339 | 9/1995 |
| JP | 9-145745 | 6/1997 |
| JP | 10-261244 | 9/1998 |
| JP | 11-218627 | 8/1999 |
| JP | 11-266055 | 9/1999 |
| JP | 2000-56133 | 2/2000 |
| JP | 2000-055941 | 2/2000 |
| JP | 2000-504124 | 4/2000 |
| JP | 2000-180789 | 6/2000 |
| JP | 2000-241762 | 9/2000 |
| JP | 2000-241763 | 9/2000 |
| JP | 2000-284225 | 10/2000 |
| WO | 98/44367 | 10/1998 |

OTHER PUBLICATIONS

"Photonic Crystals" John D. Joannopoulos, Robert D. Meade, and Joshua N. Winn, Princeton University Press, 1995.

* cited by examiner

*Primary Examiner*—Akm Enayet Ullah
*Assistant Examiner*—Jerry T Rahll
(74) *Attorney, Agent, or Firm*—Wenderoth, Lind & Ponack, L.L.P.

(57) ABSTRACT

An optical device includes, in a predetermined section of an optical fiber, a first functional part having a plurality of Faraday crystal columns that are parallel to each other and almost penetrating perpendicularly to an optical axis of an optical fiber through a core thereof, and a second functional part having a plurality of holes that are parallel to each other and almost penetrating perpendicularly to the optical axis of the optical fiber 1 through the core thereof. A longitudinal direction of the Faraday crystal columns and a longitudinal direction of the holes form an angle of 45 degrees along a plane perpendicular to the optical axis. Thus, the optical device can be realized only by processing the optical fiber.

34 Claims, 34 Drawing Sheets

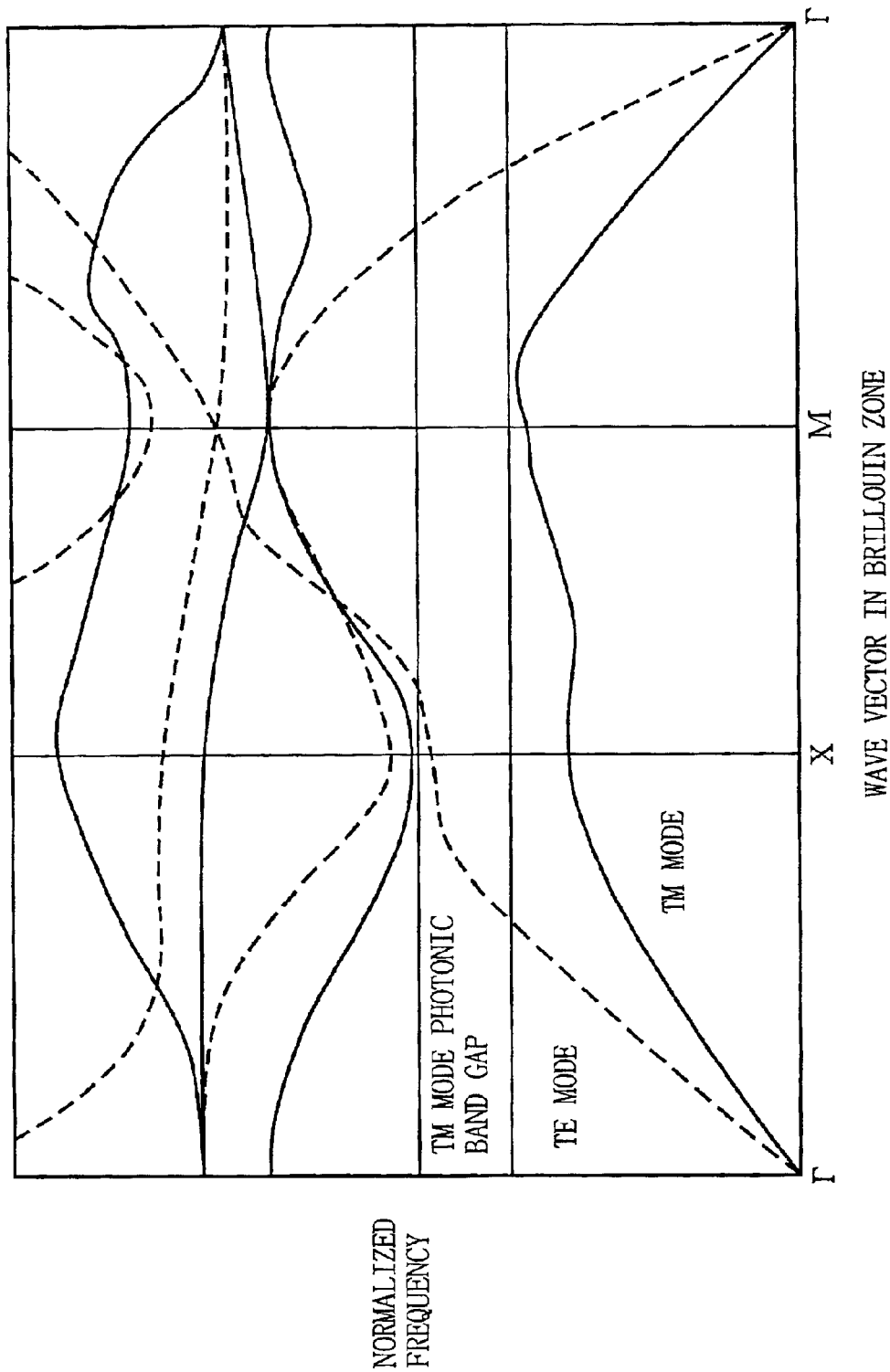

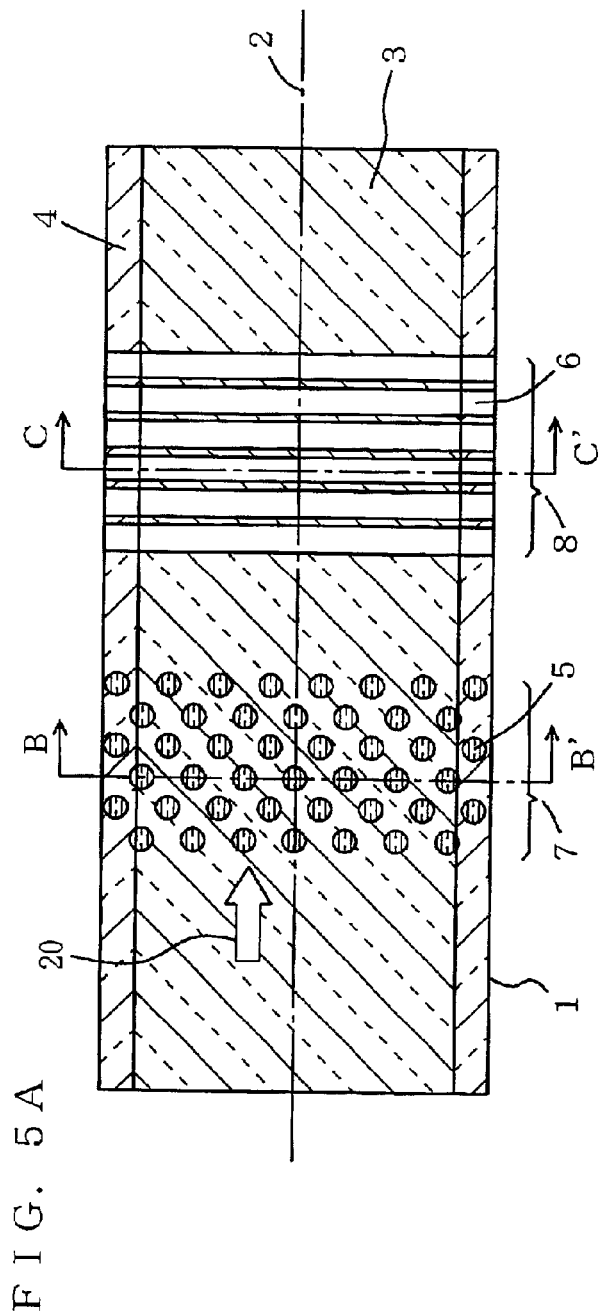
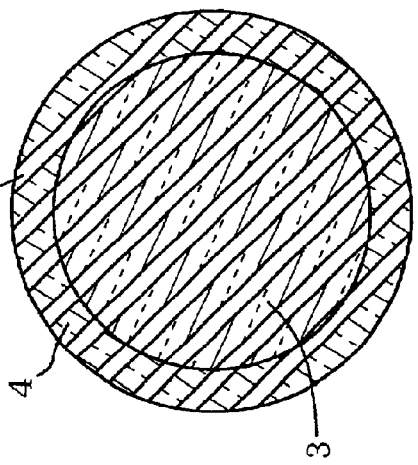
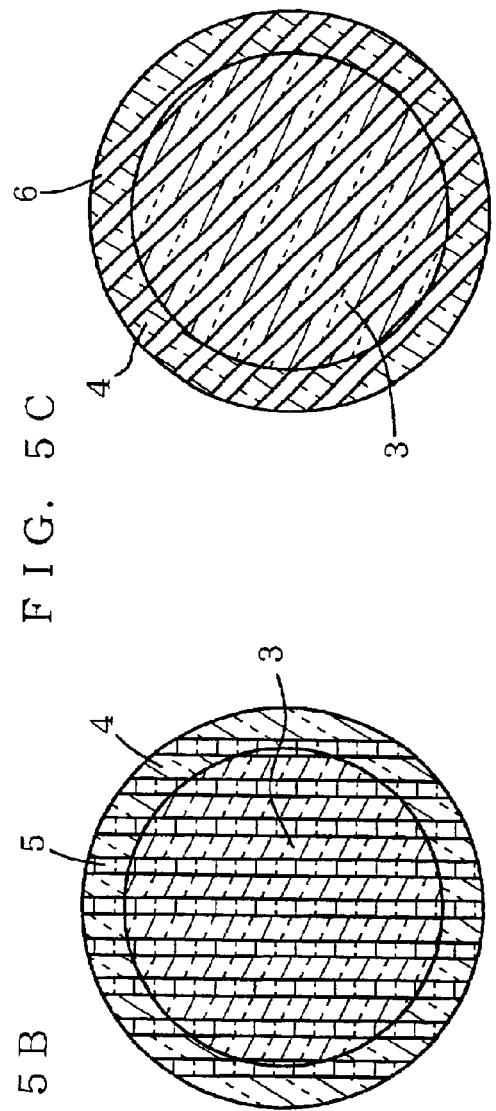
FIG. 5A
FIG. 5C
FIG. 5B

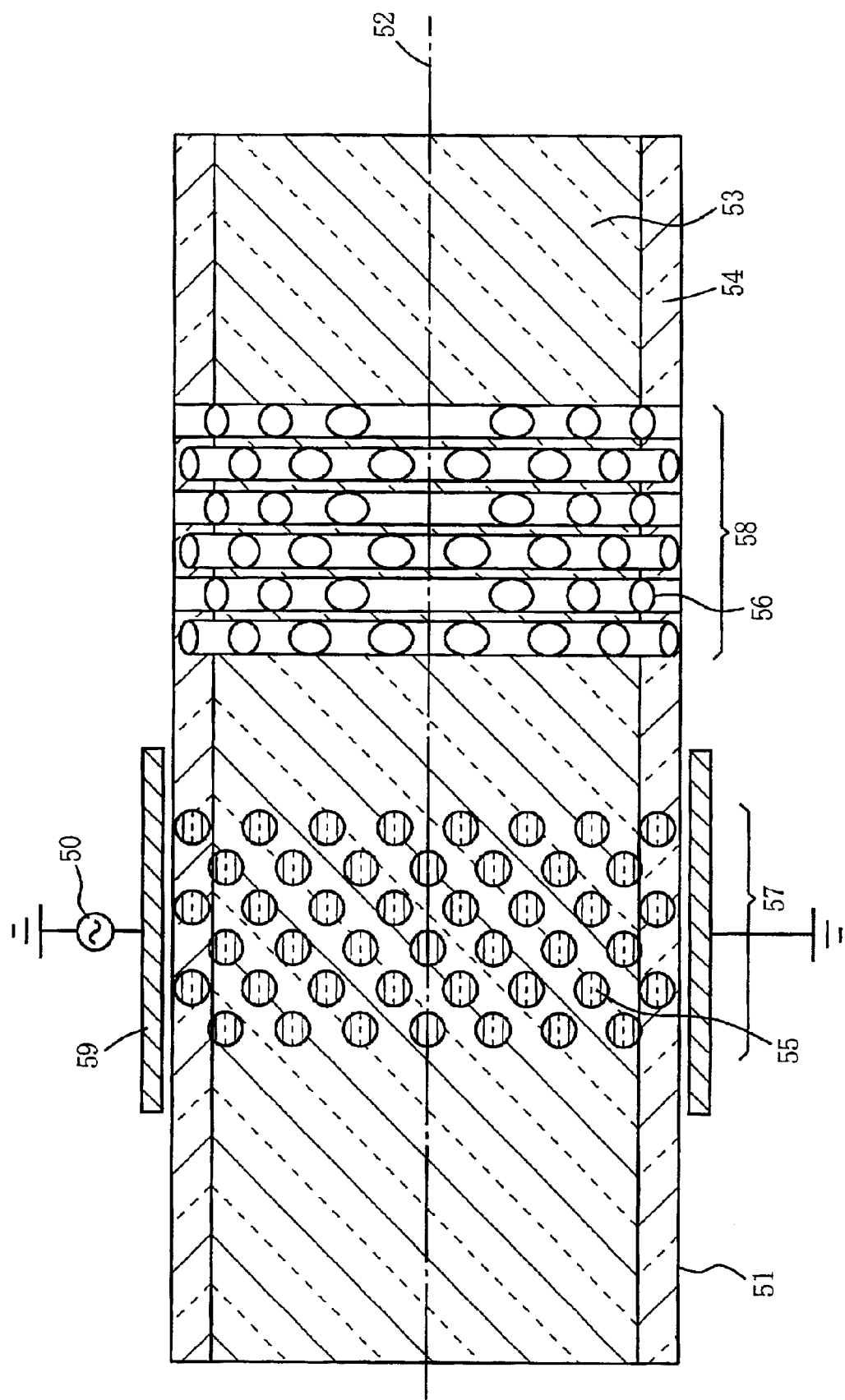

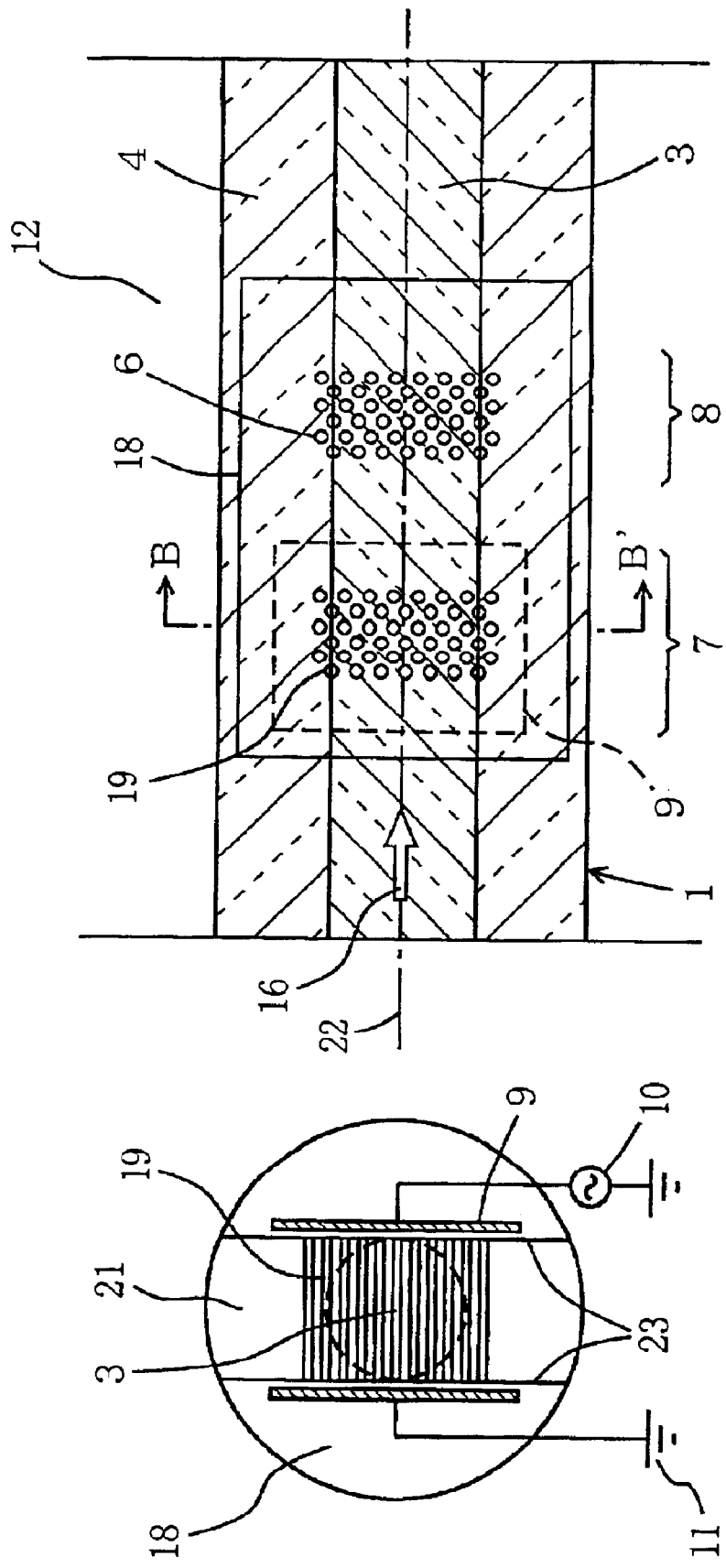

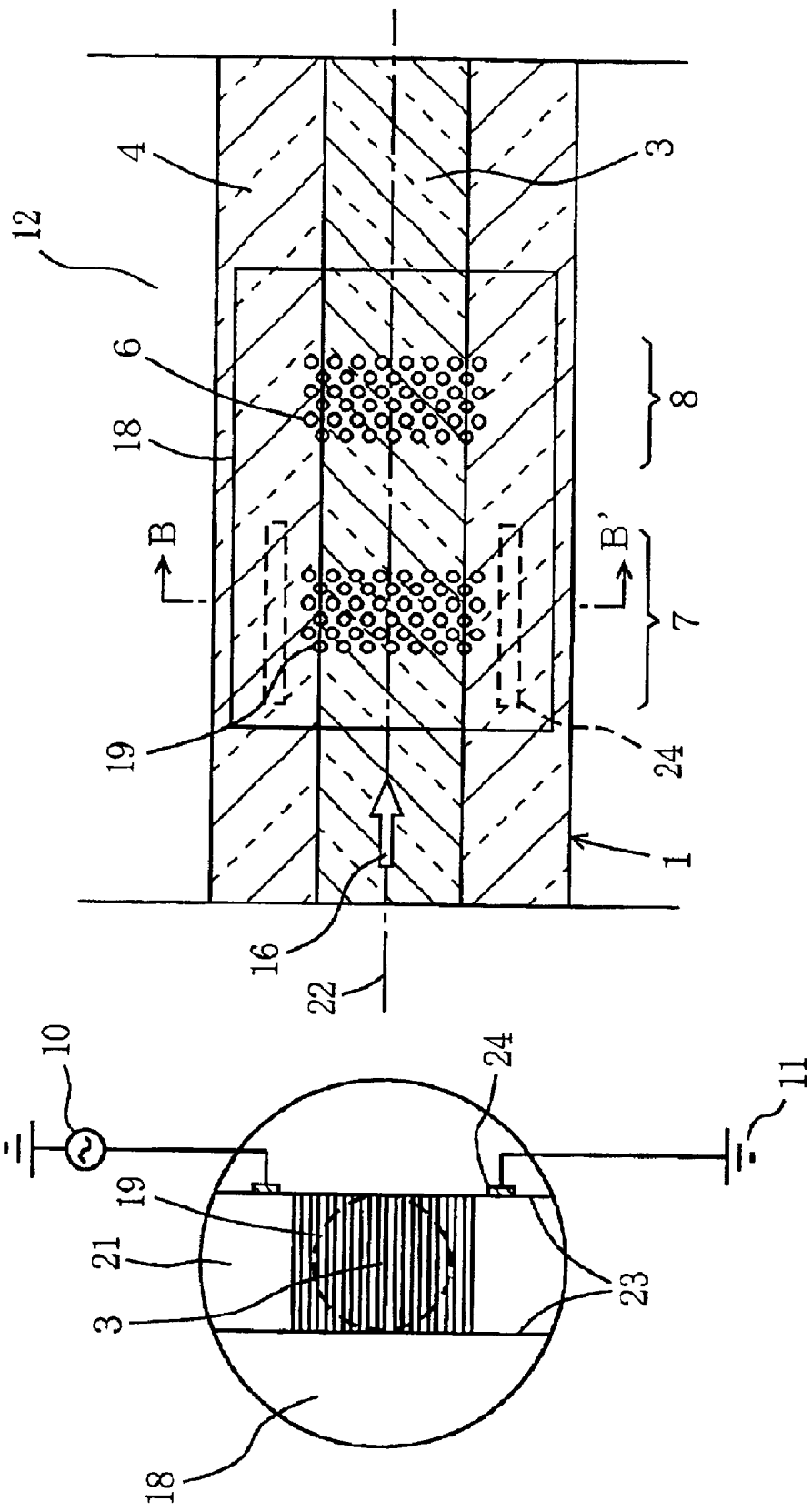

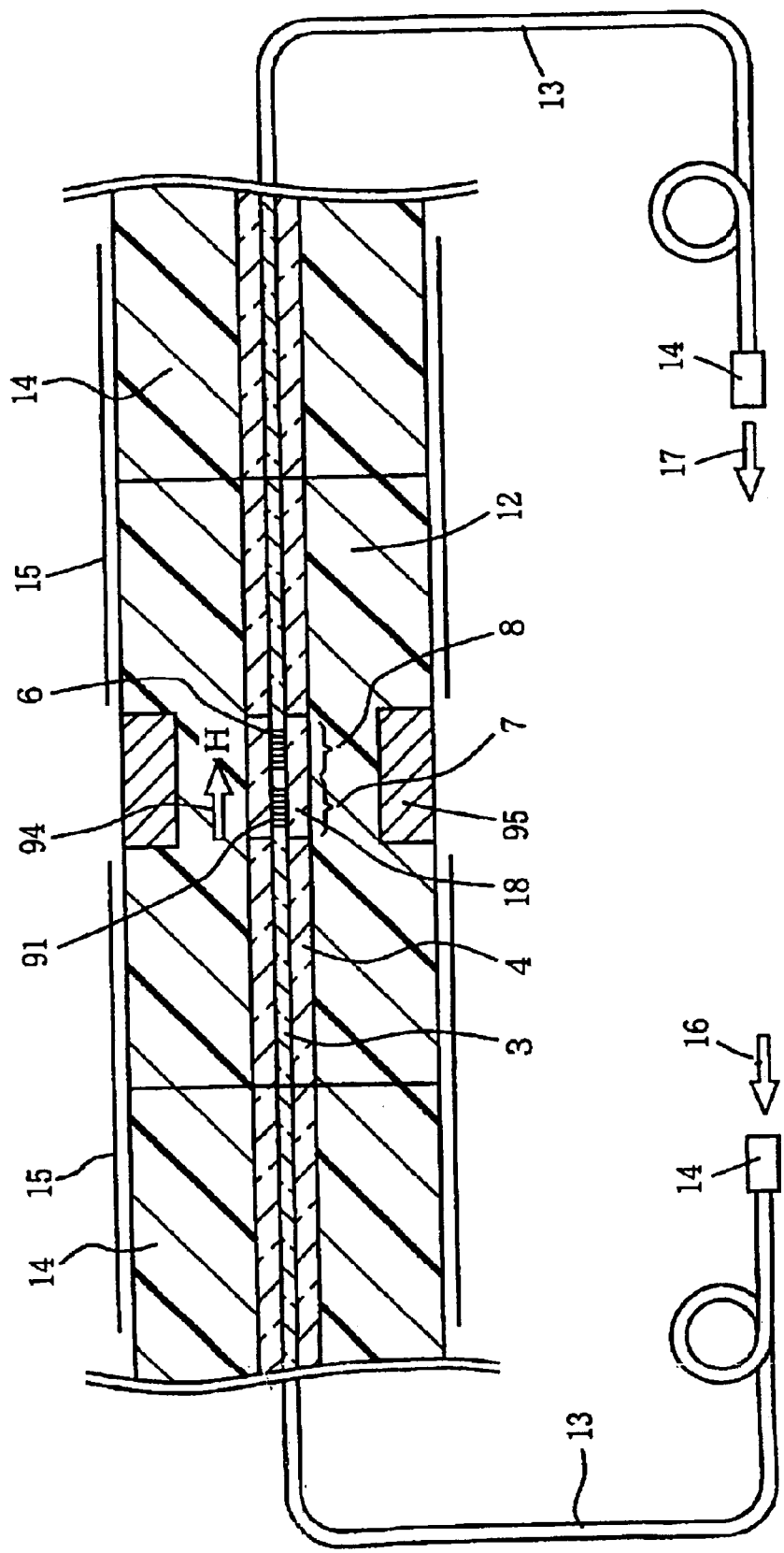

OPTICAL DEVICE

BACKGROUND OF THE INVENTION

1. Field of the Invention

The present invention relates to various optical devices exemplarily used for optical communications and, more specifically, an optical device such as a dispersion compensator for polarized waves and wavelengths of an optical fiber, an optical isolator, an optical modulator, and a photonic sensor used for detecting voltage or electric current flowing through a power transmission line or a power distribution line.

2. Description of the Background Art

Conventional various optical devices are first described below. FIG. 31 is a schematic diagram illustrating the structure of an optical isolator, which is one example of the conventional optical devices. The optical isolator includes a first and second lenses 1003 and 1004 for coupling a first optical fiber 1001 and a second optical fiber 1002 to each other through an optical system. Placed between these lenses are a polarizer 1005, a Faraday device 1006, and an analyzer 1007. Note that, in FIG. 31, outer lines of a light beam going through the optical system is represented as straight lines. Furthermore, there exists a magnetic field 1008 in the optical isolator enough to rotate the plane of polarization. Also, the polarizer 1005 and the analyzer 1007 form an angle of 45 degrees. The Faraday device 1006 is exemplarily implemented by a garnet crystal.

Described next is the principle of the optical isolator. In the optical isolator shown in FIG. 31, unpolarized light emitted from the first optical fiber 1001 is coupled through the first lens 1003 to the polarizer 1005, and therein converted into linearly polarized light. Then, the linearly polarized light goes to the Faraday device 1006 that rotates a plane of polarization thereof by 45 degrees. The linearly polarized light with its plane of polarization rotated is coupled by the analyzer 1007 having the above stated angle to the second optical fiber 1002 through the second lens 1004.

On the other hand, return light from the second optical fiber 1002 is coupled through the second lens 1004 to the analyzer 1007 for conversion into linearly polarized light. Then, the linearly polarized light goes to the Faraday device 1006 that rotates a plane of polarization thereof by 45 degrees. In the analyzer 1005, however, the plane of polarization of the linearly polarized light is perpendicular to the polarizing direction of the polarizer 1005. Therefore, no return light can be coupled to the first optical fiber 1001 through the first lens 1003. As such, the conventional optical isolator requires two lenses for coupling optical fibers.

Described next is a conventional dispersion compensator. In the conventional dispersion compensator, an optical system is placed between optical fibers. Thus, for coupling therebetween the optical system, at least two lenses are required.

Described next is a conventional optical modulator. The optical modulator functionally includes, for example, a polarizer, a λ/4 plate, a Pockels device, and an analyzer. Linearly polarized light obtained by the polarizer becomes circularly polarized light by the λ/4 plate, and then becomes elliptically polarized light depending on the electric field applied to the Pockels device. In the analyzer, this elliptic polarization causes changes in the amount of light. Thus, optical modulation can be achieved depending on the applied electric field. Such conventional optical modulator also requires at least two lenses for coupling the optical system between optical fibers.

The structure of the conventional optical modulator is described in more detail. For example, as shown in FIG. 32, a Mach-Zehnder type modulator 2012 used as the optical modulator is formed on a substrate 2001 made of $LiNbO_3$ crystal, for example. In this Mach-Zehnder type modulator 2012, a waveguide unit 2002 includes a waveguide supplied at its incidence side with unpolarized light (TM light+TE light) 2005, and waveguides each polarizing and separating the unpolarized light into two polarized lights (TM light and TE light) for emission, and a waveguide coupling these lights for emission. Among these waveguides, the waveguides for polarization and separation are provided with electrodes 2003 to one of which a predetermined electric field is applied by a signal source 2004. Output light 2010 is coupled to an optical fiber 2006 through a lens 1009. The optical fiber 2006 is composed of a core 2007 through which light is transmitted, and a clad 2008.

As stated above, the conventional optical device such as the optical modulator requires expensive waveguides and at least one lens for optically coupling the waveguides and the optical fibers. Moreover, such coupling requires enormous amount of time and effort.

Described next is a conventional optical sensor. FIG. 33 is a schematic front perspective view of one conventional optical voltage sensor. This optical voltage sensor includes a sensor part, a light-emitting part, a light-receiving part, and signal processing circuits in light-emitting and light-receiving sides (not shown). The sensor part is composed of a polarizer 241, a 1/4 waveplate (also called "λ/4 plate") 242, an electro-optic crystal 243, and an analyzer 244, all arranged on the same optical axis in such order from a light incidence side as mentioned above. The light-emitting part includes an E/O circuit including a light-emitting device typified by LED (Light Emitting Diode) as a light source, and an incidence side optical system composed of an optical fiber 246a, a ferrule 248a, a GRIN lens 247a, and a holder 245a, all of these arranged on the same optical axis and attached together on each optical axis plane with an adhesive. The light-emitting part includes an output side optical system composed of an optical fiber 246b, a ferrule 248b, a GRIN lens 247b, and a holder 245b, all of these arranged on the same optical axis and attached together on each optical axis plane with an adhesive, and an O/E circuit including a device for converting an optical signal emitted from the output side optical system into an electrical signal.

In the sensor part of the above optical voltage sensor, the polarizer 241, the λ/4 plate 242, the electro-optic crystal 243, and the analyzer 244 all arranged on the same optical axis are attached together on each optical axis plane with an adhesive. Here, the optical axis plane is a plane perpendicular to the optical axis. Each of these optical components has two such planes: an plane of incidence and a plane of emittance. On the electro-optic crystal 243, a pair of electrodes 235 is evaporated, and electrically connected to a pair of electrode terminals 249 by lead wires. Between the electrode terminals 249, voltage to be measured by this optical voltage sensor is applied.

The signal processing circuits in the light-emitting and light-receiving sides are respectively connected through the light-emitting part and the light-receiving part to the sensor part. In the sensor part, the polarizer 241 is fixed, with an adhesive, at its plane of incidence to the optical axis plane of the GRIN lens 247a in the light-emitting part. The analyzer 244 is fixed, with an adhesive, at its plane of emittance to the optical axis plane of the GRIN lens 247b. The adhesively fixed sensor part, incidence side optical system in the light-emitting part, and output side optical system in the light-receiving part are mechanically fixed to a case (not shown). As the adhesive for the optical components in the above optical voltage sensor, epoxy resin or urethane resin is used.

In the above optical voltage sensor, used as the electro-optic crystal 243 is $Bi_{12}SiO_{20}$ (BSO), $KH_2PO_4$ (KDP), or a natural birefringent material such as $LiNbO_3$ and $LiTaO_3$, for example.

With reference to FIG. 34, the operational principle of the optical voltage sensor is described next. When an LED whose center wavelength is 0.85 μm is exemplary used as the light source in the light-emitting part, unpolarized light emitted therefrom is inputted as incident light 109 to the sensor part. This incident light 109 passes through the polarizer 241 of the sensor part, and then becomes linearly polarized light. This linearly polarized light passes through the λ/4 plate 242 to become circularly polarized light, and then passes through the electro-optic crystal ($LiNbO_3$) 243 to become elliptically polarized light depending on applied voltage Vm to the electro-optic crystal ($LiNbO_3$). That is, the polarization state of the elliptically polarized light in the electro-optic crystal 243 is varied depending on the applied voltage Vm. Such elliptically polarized light passes through the analyzer 244, and then is received as output light 110 by the light-receiving part. The intensity of the output light 110 is varied depending on the polarization state of the elliptically polarized light in the electro-optic crystal 243, which is varied according to the applied voltage Vm, as stated above. Therefore, by monitoring, at the light-receiving part, the change in the output intensity of the analyzer 244 to calculate a modulation index of the amount of light (intensity), the applied voltage Vm can be measured. Here, the modulation index of the amount of light is a ratio of AC components to DC components in the amount of light.

The light voltage sensor is often used outdoors under a hostile environment, and therefore required to have such temperature dependency as that change in modulation index at −20° C. to 80° C. is preferably below ±1%. Such temperature dependency is caused by changes in refractive index due to stress at an adhesive portion on the λ/4 plate 242 and the electro-optic crystal 243, or by temperature dependency of birefringence of the λ/4 plate 242. Also, when the electro-optic crystal 243 having natural birefringence such as $LiNbO_3$ is used, the output of the optical voltage sensor is varied, for example, depending on the beam state of the incident light coming to the electro-optic crystal 243.

FIG. 35 is a graph exemplarily illustrating a relation between an angular deviation α and a directional deviation β, and the output of the optical voltage sensor. In FIG. 35, β1 represented by a dotted line indicates outputs when the directional deviation are 0, 90, 180, and 270 (degrees). β2 represented by a one-dot-chain line indicates outputs when the directional deviation are 45 and 225 (degrees). β3 represented by a two-dot-chain line indicates outputs when the directional deviation are 135 and 315 (degrees). As shown in FIG. 35, depending on the beam state of the incident light coming to the electro-optic crystal 243 (the angular deviation α and the directional deviation β), the output of the optical voltage sensor, that is, the modulation index, is varied, and the temperature dependency thereof are varied.

To cope with the above problems, the following three methods have been suggested for improving the temperature dependency.

(1) A first method, disclosed in Japanese Patent Laid-Open Publication No. 9-145745 (1997-145745), is to improve the temperature dependency of the electro-optic crystal by relaxing stress applied thereto. This relaxation is achieved by fixing the electro-optic crystal without an adhesive.

(2) A second method, disclosed in Japanese Patent Laid-Open Publication No. 3-44562(1991-44562), is to improve the temperature dependency of natural birefringence of the electro-optic crystal by reducing angular deviation of the incident light to 0.2° or less by improving surface accuracy of each optical component.

(3) A third method, disclosed in Japanese Patent Laid-Open Publication No. 7-248339 (1995-248339), is to improve the temperature dependency of the sensor output by an incident angle adjuster changing incident angle of the incident light to the electro-optic device depending on the ambient temperature. In the incident angle adjuster, output changes due to temperature change are cancelled out with output changes due to incident angle change.

As stated above, in the conventional optical device, at least one (or two) lens(es) are required for connecting the optical system between optical fibers, thereby increasing the number of components. Moreover, such coupling of the optical system requires enormous amount of time and efforts. Therefore, with the above mentioned structure, the optical device disadvantageously costs more.

Furthermore, the optical sensor bears another unique problems in relation to the temperature dependency. That is, according to the first method, fluctuations in beam state that cause large temperature dependency can be prevented, but variations in temperature dependency cannot be prevented if the initial beam state fluctuates. The second method is easy to use, but axial deviation affects not only angular deviation, but also directional deviation. Therefore, only reducing axial deviation based on the second method do not yield stable dependency. In the third method, the incident angle adjuster for changing the incident angle of the incident light to the electro-optic crystal depending on ambient temperature is required. This causes complexity in structure, leading to reduction in productivity and increase in cost. Also, as stated above, axial deviation affects not only angular deviation, but also directional deviation. Therefore, only adjusting the incident angle of the light, that is, the axial deviation, does not yield stable temperature dependency.

To cope with the above problems, the Applicant has submitted an application of Japanese Patent Laid-Open Publication No. 11-215798 (1996-215798) disclosing the invention of an optical voltage sensor based on a method of controlling the modulation index by using axial deviation characteristics of an electro-optical crystal having natural birefringence. According to the optical voltage sensor of the above pending application, the temperature dependency of the optical voltage sensor is improved by controlling the beam state of the incident light to the electro-optical crystal. That is, by appropriately setting the state of axial deviation in consideration of not only angular deviation, but also directional deviation, the temperature dependency is improved.

However, controlling the beam state based on the invention of the above pending application requires beam-state management for preventing variations in beam state caused by tolerances among optical components such as a lens, thereby disadvantageously increasing cost.

Therefore, to bring down the price of optical voltage sensors, the beam state has to be managed at low cost.

SUMMARY OF THE INVENTION

Therefore, an object of the present invention is to provide a low-cost optical device having a smaller number of components capable of easily coupling an optical system between optical fibers at low cost. A further object of the present invention is to provide an optical sensor such as an optical voltage sensor with temperature dependency stabilized by suppressing variations in beam state caused by tolerances among optical components and other factors.

The present invention has the following features to attain the above objects.

A first aspect of the present invention is directed to a method of fabricating a photonic crystal, including the step of forming the photonic crystal directly on an end surface of at least one optical fiber as a substrate. For example, a plurality of optical fibers are tied in bundle with each end surface aligned on a same plane to form an optical fiber bundle, and the photonic crystal directly is directly on an end surface of the optical fiber bundle formed by the end surfaces of the optical fibers aligned on the same plane as the substrate. Then, by separating the optical fiber bundle into the optical fibers, the photonic crystal formed on the each end surface of the optical fibers is obtained.

A second aspect of the present invention is directed to a method of fabricating a photonic crystal. The method includes the step of forming the photonic crystal by making, in a predetermined section along an optical axis of an optical fiber composed of a core through which light propagate and a clad surrounding the core, a plurality of columns penetrate through the core. For example, the clad is partially removed, in the predetermined section from the optical fiber to form at least one plane parallel to the optical axis, and a plurality of holes penetrating the core are formed perpendicularly to the plane formed in the removing step.

A third aspect of the present invention is directed to an optical transmission member for transmitting light having a predetermined wavelength. The optical transmission member includes an optical fiber for transmitting the light inputted at one end surface thereof to another end surface thereof for output; and a photonic crystal layer formed on at least either one of the end surfaces of the optical fiber and functioning as a linear polarizer for the light having the wavelength.

A fourth aspect of the present invention is directed to an optical transmission member for transmitting light having a predetermined wavelength. The optical transmission member includes an optical fiber for transmitting the light inputted at one end surface thereof to another end surface thereof for output; and a photonic crystal layer formed on at least either one of the end surfaces of the optical fiber and functioning as a λ/4 plate for the light having the wavelength.

A fifth aspect of the present invention is directed to the optical transmission member for transmitting light having a predetermined wavelength. The optical transmission member includes an optical fiber for transmitting the light inputted at one end surface thereof to another end surface thereof for output; and a photonic crystal layer formed on at least either one of the end surfaces of the optical fiber and functioning as a photonic-crystal circular polarizer for the light having the wavelength.

A sixth aspect of the present invention is directed to an optical device at least one functional part formed as the photonic crystal with a plurality of columns penetrating through a core in a predetermined section of an optical fiber along an optical axis of the optical fiber, and a propagation part for propagating the light as a function of the optical fiber. The functional part may be formed by the plurality of columns parallel to each other and periodically distributed on a plane perpendicular to a longitudinal direction of the columns. The plurality of columns forming the functional part may penetrate through the core and the clad of the optical fiber. Also, the plurality of columns forming the functional part may have a refractive index different from a refractive index of material forming the core. All or part of the plurality of columns forming the functional part may be a hole, or made of material having a Faraday effect or material having an electro-optic effect.

Furthermore, electrodes may be provided on a surface formed by partially removing the clad. The electrodes may be provided in pair on a surface perpendicular to a longitudinal direction of the plurality of columns forming the functional part. Alternatively, the electrodes may be provided in pair on two surfaces parallel and opposed to each other with the functional part therebetween, and perpendicular to the longitudinal direction of the plurality of columns forming the functional part. Still alternatively, the electrodes may be provided in pair on two surfaces parallel and opposed to each other with the functional part therebetween, and parallel to the optical axis and the longitudinal direction of the plurality of columns forming the functional part. Still alternatively, the electrodes may be arranged to apply the electric field to the functional part in a direction parallel to the optical axis of the optical fiber. Still alternatively, the electrodes may be arranged to apply the electric field to the functional part perpendicularly to a longitudinal direction of the plurality of columns forming the functional part and the optical axis of the optical fiber. Still alternatively, the electrodes may be arranged to apply the electric field to form a predetermined angle with a longitudinal direction of the plurality of columns along a plane perpendicular to the optical axis.

The functional part may include a first functional part composed of a plurality of columns parallel to each other and periodically distributed on a plane perpendicular to a longitudinal direction of the columns, the columns made of a Faraday crystal having a refractive index different from a refractive index of material forming the core; and a second functional part composed of a plurality of holes parallel to each other and distributed on a plane perpendicular to a longitudinal direction of the holes. The longitudinal direction of the plurality of columns forming the first functional part may form an angle of 45° with the longitudinal direction of the holes forming the second functional part along a plane perpendicular to the optical axis.

The first functional part may be composed of a plurality of columns made of an electro-optic crystal. The second functional part may be composed of a plurality of first holes. The longitudinal direction of the columns may be perpendicular or parallel to the longitudinal direction of the first holes along a plane perpendicular to the optical axis.

The functional part may further include a third functional part composed of a plurality of second holes. The longitudinal direction of the columns may be perpendicular or parallel to the longitudinal direction of the second holes along the plane perpendicular to the optical axis.

Furthermore, the functional part may be formed as a photonic crystal with a predetermined refractive index and state of distribution, to have a wavelength dispersion characteristic of recovering a waveform of the light to be a steep waveform for output, the light being spread by a wavelength dispersion characteristic unique to an optical fiber through which the light passed before inputted to the optical fiber.

The present optical device may further include a guide for surrounding the optical fiber. The guide may be cylindrically shaped having a diameter approximately equal to a diameter of a ferrule of another optical fiber connected to the optical fiber. By way of example only, such guide is a capillary.

A seventh aspect of the present invention is directed to an optical isolator that includes first and second optical fibers formed by a plurality of holes parallel to each other penetrating through the core in a predetermined section along an optical axis and periodically distributed on a plane perpendicular to a longitudinal direction of the holes; a Faraday device placed to be closely attached between the first and second optical fibers; and a guide for mechanically adjusting an optical axis of the first optical fiber and an optical axis of the second optical fiber. In the optical isolator, a longitudinal direction of the holes of the first optical fiber forms an angle of 45° with a longitudinal direction of the holes of the second optical fiber along a plane perpendicular to the optical axis.

An eighth aspect of the present invention is directed to an optical sensor that includes a light-emitting part for emitting a light beam; a sensor part including circular polarizer means for converting unpolarized light into circularly polarized light, an electro-optic crystal film, and an analyzer sequentially arranged on a predetermined optical axis set along an optical path of the light beam; and a light-receiving part for receiving the light beam after passing through the sensor part. The optical sensor measures, based on the light beam received by the light-receiving part, a voltage applied to the electro-optic crystal film. In the optical sensor, the light-emitting part includes a first optical fiber for inducing the light beam into the sensor part. The light-receiving part includes a second optical fiber for inducing, from the sensor part, the light beam after passing therethrough. The circular polarizer means includes a polarizer for converting the unpolarized light into linearly polarized light; and a λ/4 plate for converting the linearly polarized light into the circularly polarized light. Here, the polarizer is formed on an end surface of the first optical fiber as a photonic crystal layer for converting the light beam from the light-emitting part into a linearly polarized beam. The analyzer is formed on an end surface of the second optical fiber as a photonic crystal layer for converting the light beam after passing through the sensor part into a linearly polarized beam.

A ninth aspect of the present invention is directed to an optical sensor that includes a light-emitting part for emitting a light beam; a sensor part including circular polarizer means for converting unpolarized light into circularly polarized light, an electro-optic crystal film, and an analyzer sequentially arranged on a predetermined optical axis set along an optical path of the light beam; and a light-receiving part for receiving the light beam after passing through the sensor part. The optical sensor measures, based on the light beam received by the light-receiving part, a voltage applied to the electro-optic crystal film. In the optical sensor, the light-emitting part includes a first optical fiber for inducing the light beam into the sensor part. The light-receiving part includes a second optical fiber for inducing, from the sensor part, the light beam after passing therethrough. Here, the circular polarizer means is formed on an end surface of the first optical fiber as a photonic crystal layer for converting the light beam from the light-emitting part into a circularly polarized beam. The analyzer is formed on an end surface of the second optical fiber as a photonic crystal layer for converting the light beam after passing through the sensor part into a linearly polarized beam.

A tenth aspect of the present invention is directed to an optical sensor that includes a light-emitting part for emitting a light beam; a sensor part including a polarizer, a magneto-optic crystal film, and an analyzer sequentially arranged on a predetermined optical axis set along an optical path of the light beam; and a light-receiving part for receiving the light beam after passing through the sensor part The optical sensor measures, based on the light beam received by the light-receiving part, a voltage applied to the magneto-optic crystal film. In the optical sensor, the light-emitting part includes a first optical fiber for inducing the light beam into the sensor part. The light receiving part includes a second optical fiber for inducing the light beam for the sensor part. Here, the polarizer is formed on an end surface of the first optical fiber as a photonic crystal layer for converting the light beams from the light-emitting part into a linearly polarized light beam. The analyzer is formed on an end surface of the second optical fiber as a photonic crystal layer for converting into the light beams after passing through the sensor part into a linearly polarized beam.

An eleventh aspect of the present invention is directed to an optical sensor that includes a light-emitting part for emitting a light beam; a sensor part including a polarizer, a λ/4 plate, an electro-optic crystal, and an analyzer sequentially arranged on a predetermined optical axis set along an optical path of the light beam; and a light-receiving part for receiving the light beam after passing through the sensor part. The optical sensor measures, based on the light beam received by the light-receiving part, a voltage applied to the electro-optic crystal. The optical sensor includes a first reflective film having a reflection plane perpendicular to the optical axis and placed between the λ/4 plate and the electro-optic crystal; and a second reflective film having a reflection plane perpendicular to the optical axis and placed between the electro-optic crystal and the analyzer. An interval between the first reflective film and the second reflective film is an integer multiple of half a wavelength of the light beam.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing a photonic band for a square array of columns in a core of an optical fiber;

FIGS. 5A to 5C is a schematic diagram showing the structure of an optical device according to a first embodiment of the present invention;

FIG. 8 is a schematic side view showing the structure of an optical device according to a third embodiment of the present invention;

FIGS. 13A and 13B are schematic diagrams each showing the structure of an optical device according to the sixth embodiment of the present invention;

FIGS. 14A to 14B are schematic diagrams showing the structure of an optical device according to a seventh embodiment of the present invention;

FIG. 19 is a horizontal section view of an optical device according to a twelfth embodiment of the present invention;

DESCRIPTION OF THE PREFERRED EMBODIMENTS

Figure 1:
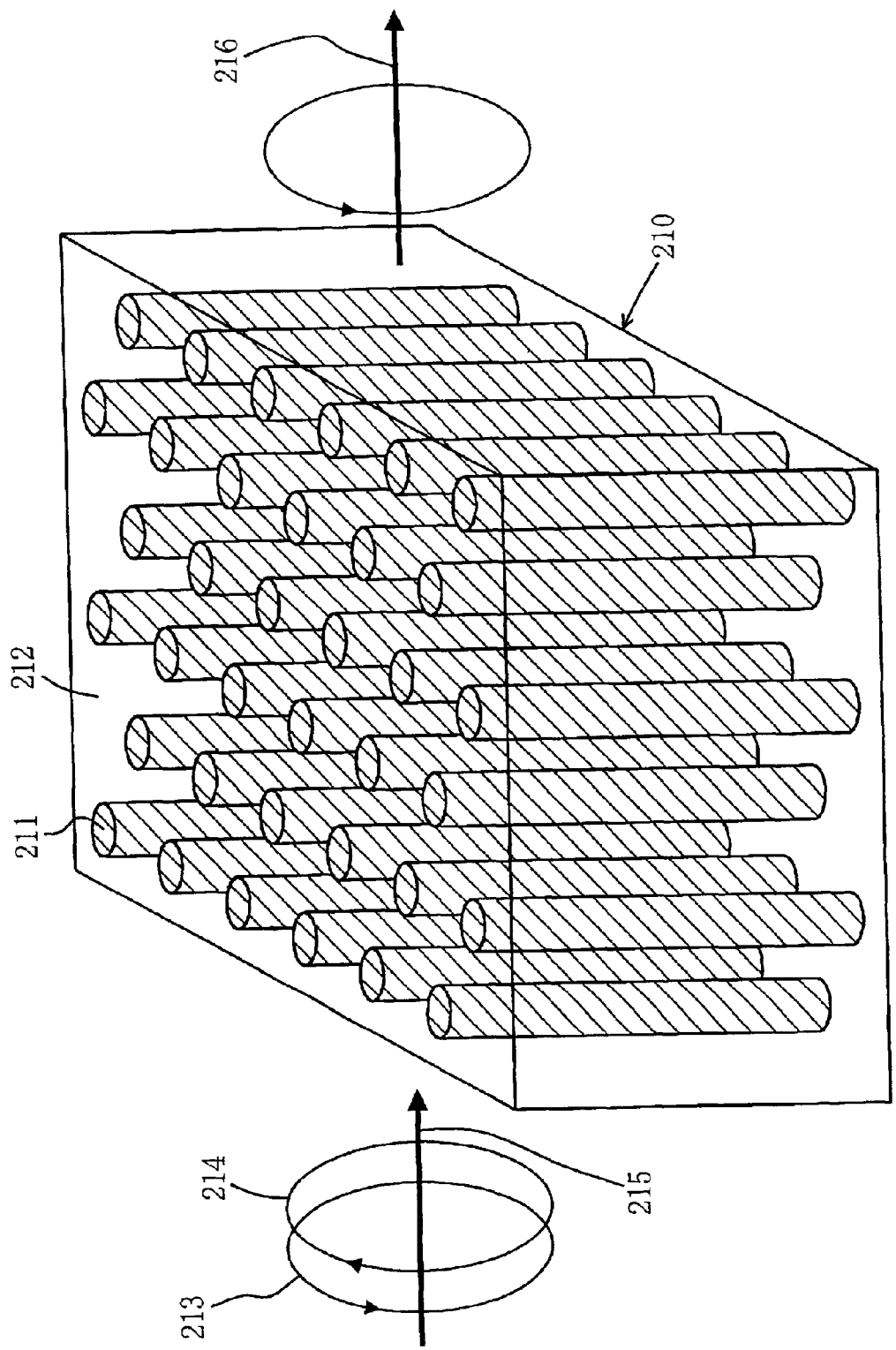
FIG. 1 is a perspective view of a photonic crystal circular polarizer.

The structures of optical devices according to embodiments are described in detail. Prior to that, briefly described are photonic crystals used for polarizers (linear polarizers and circular polarizers), analyzers, λ/4 plates, Pockels devices, and other components, and a method of fabricating such photonic crystals.

<Fabrication of Photonic Crystals Functioning as Liner Polarizers>

Photonic crystals are exemplarily described in a document "Photonic Crystals", John D. Joannopoulos, Robert D. Meade, and Joshua N. Winn, 1995, Princeton University Press (hereinafter simply referred to as "document"), which is herein incorporated by reference. As described in this document, a photonic crystal has one, two or three dimensional periodic structure made of a relatively high refractive-index material and relatively low refractive-index material. The photonic crystal controls a light wave by mainly using dispersion characteristics of the light wave in the above periodic structure. The dispersion characteristics are caused by a refractive index and shape of such high and low refractive-index materials, periodicity of spatial change in refractive index, and the direction and wavelength of an incident light beam (hereinafter, "beam direction" and "beam wavelength", respectively). Therefore, such phenomenon can be observed as that appropriately controlling the refractive index and shape, periodicity of spatial change in refractive index, and the beam direction of the photonic crystal with respect to the beam wavelength causes a difference in dispersion characteristics between two types of linearly polarized lights, that is, TM wave and TE wave. Using this phenomenon, polarizers and λ/4 plates can be realized. For example, a polarizer using such photonic crystal is disclosed in Japanese Patent Laid-Open Publication No. 2000-56133. Also, many types of shapes of the high-refractive-index material and low-refractive-index material used for photonic crystals have been suggested and fabricated, as described in the above document.

Therefore, it is possible to form, on an end surface of an optical fiber, a photonic crystal layer functioning as a linear polarizer or an analyzer used in an eighteenth embodiment described later, for example. That is, when a photonic crystal layer made of a high-refractive-index material and a low-refractive-index material is formed on the end surface of the optical fiber, the refractive index and shape of such high and low refractive-index materials, the periodicity of spatial change in refractive index, and the beam direction with respect to the wavelength of the light are so set that only one of the TM wave and the TE wave is enabled to pass through the photonic crystal layer (refer to FIGS. 4 and 6 in Japanese Patent Laid-Open Publication No. 2000-56133). A specific method of forming a photonic crystal on an end surface of an optical fiber will be described later.

In a thirteenth embodiment which will be described later, a multiplayer film is fabricated as a photonic crystal by alternately laminating two types of layers, that is, a high-refractive-index layer and a low-refractive-index layer. If lamination is made in a direction of an incident light to a sensor part (optical axis direction) so that the sum of the thickness of high- and low-refractive-index layers is equal to one-fourth the wavelength of the incident light, neither TM wave nor TE wave can pass through the photonic layer. This means that the multilayer film formed as a one-dimensional photonic crystal functions as a reflector. The structure of an optical device using such function will be specifically described later in the corresponding embodiments.

<Fabrication of Photonic Crystals functioning as $\lambda/4$ Plates>

If the above mentioned phenomenon is used, $\lambda/4$ plates can also be realized. Therefore, as in a nineteenth embodiment, which will be described later, for example, a photonic crystal layer functioning as a $\lambda/4$ plate can be formed on the end surface of an optical fiber. That is, when a photonic crystal layer composed of high- and low-refractive-index layers is formed on the end surface of the optical fiber (a method used therefor will be described later in detail), the refractive index and shape of the high and low refractive-index materials, the periodicity of spatial change in refractive index, and the beam direction with respect to the wavelength of the light are so set as that both TM wave and TE wave forming a light to be transmitted through the optical fiber can pass through the photonic crystal and, after passing, have a difference in phase which is equal to one-fourth the wavelength of the light.

<Fabrication of Photonic Crystals Functioning as Circular Polarizers>

A circular polarizer converts an unpolarized light into a circularly polarized light. Such circular polarizer can be realized by a photonic crystal having one-, two-, or three-dimensional periodic structure made of relatively high and low magnetically-permeable materials in a light propagating direction.

FIG. 1 is a perspective view showing one example of a photonic crystal functioning as the circular polarizer. This photonic crystal is structured by periodically arranging columns made of material of high magnetic permeability in a medium of low magnetic permeability (air, for example). The photonic crystal has a periodic structure in which a high magnetically-permeable part 211 and a low magnetically-permeable part 212 are two-dimensionally repeated at predetermined periods, that is, the magnetic permeability is two-dimensionally changed at predetermined periods. Such periodic structure is hereinafter referred to as "two-dimensional periodic structure for magnetic permeability". Note that the high magnetically permeable part 211 is required to have high magnetic permeability at least in a propagating direction of the incident light to this two-dimensional photonic crystal 210, but not in all directions. Similarly, the low magnetically permeable part 212 is required to have low magnetic permeability at least in the propagating direction as the above.

Now, assume that an unpolarized light 215 is inputted into the photonic crystal 210 having the two-dimensional peri-odic structure for magnetic permeability. Such light is hereinafter referred to as "unpolarized incident light". Also assume herein that the two-dimensional photonic crystal 210 is so structured, as shown in FIG. 1, as that permeability is periodically changed in a propagating direction of the unpolarized incident light 215 and in at least one direction perpendicular to the propagating direction. In general, such unpolarized incident light 215 can be resolved into a right-handed circularly polarized light 213 whose electric-field vector rotates clockwise and a sinistrorse circularly polarized light 214 whose electric-field vector rotates counter-clockwise. The magnetic field of the right-handed circularly polarized light 213 (a wave in such field is hereinafter referred as "first magnetic field wave") and that of the sinistrorse circularly polarized light 214 (a wave in such field is hereinafter referred to as "second magnetic field wave") are oriented parallel to the propagating direction of the unpolarized incident light 215 and in a reverse direction to each other. Here, assume a case where magnetic permeabilities of the high and low magnetically permeable parts 211 and 212, periodicity of spatial change in magnetic permeability, and the direction of the unpolarized incident light 215 are appropriately set with respect to the wavelength of the unpolarized incident light 215. In this case, when the first and second magnetic field waves are reflected at the boundary between the high and low magnetically permeable pars 211 and 212, a phase difference before and after reflection of the first magnetic field wave is dissimilar to the second magnetic field wave. If such dissimilarity in phase difference satisfies predetermined conditions, dispersion of one of the first and second magnetic field waves acts in a direction weakening the corresponding magnetic field, dispersion of the other acts in a direction strengthening the corresponding magnetic field. Consequently, as with the above stated photonic crystal functioning as the linear polarizer, only one of the first and second magnetic field waves can pass through the two-dimensional photonic crystal 210. Therefore, by appropriately setting in the two-dimensional photonic crystal 210 magnetic permeabilities of the high and low magnetically permeable parts 211 and 212, periodicity of spatial change in magnetic permeability, and the direction of the unpolarized incident light 215 with respect to the wavelength of the unpolarized incident light 215, the two-dimensional photonic crystal 210 can function as the circular polarizer and a circularly polarized output light 216 can be obtained. Therefore, as in a twentieth embodiment which will be described later, for example, it is possible to form the photonic crystal layer functioning as the circular polarizer on the end surface of the optical fiber as a single layer. A specific forming method will be described later.

<Fabrication of a Photonic Crystal Layer on the End Surface of the Optical Fiber>

Figure 2:
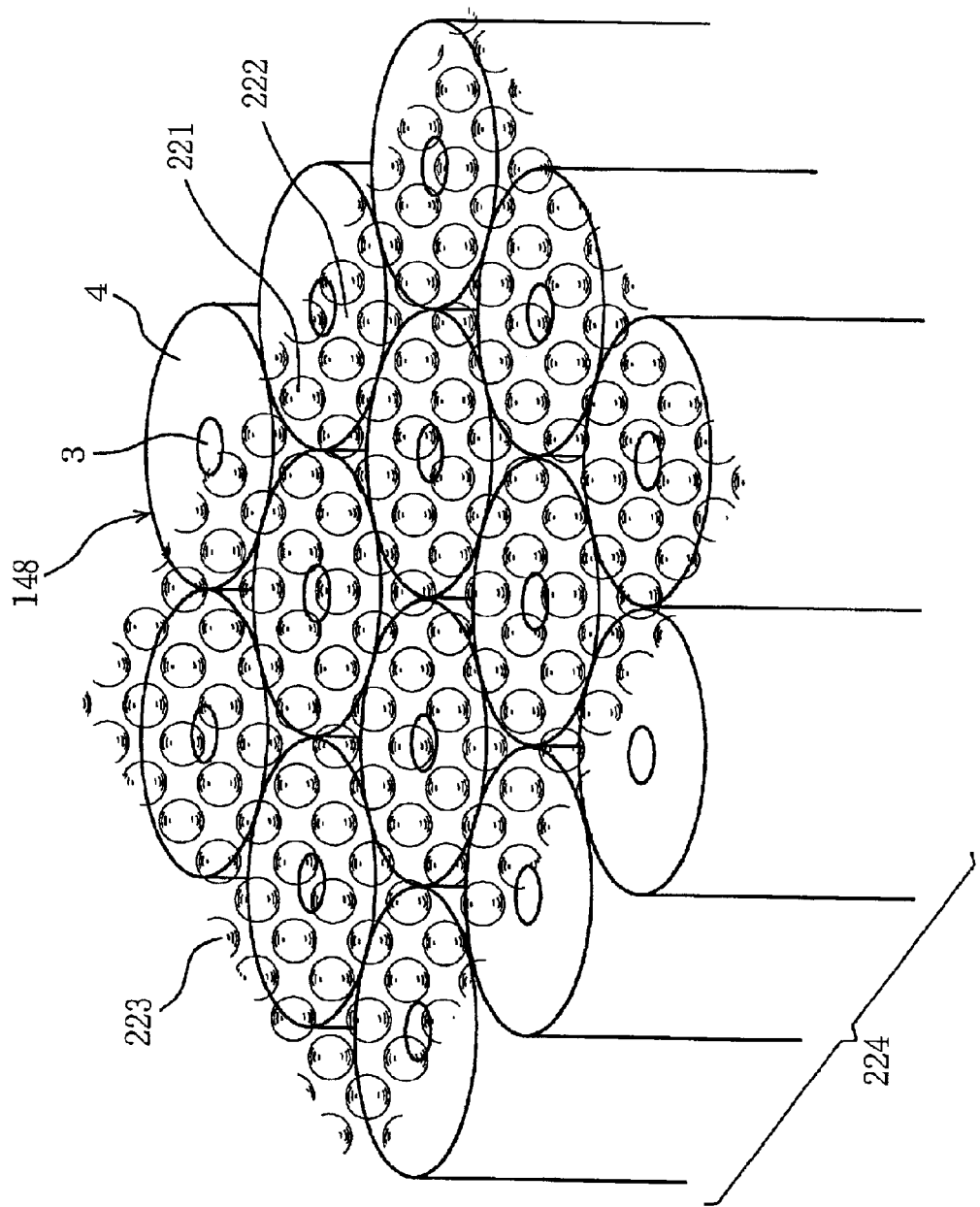
FIG. 2 is diagram showing a method of fabricating a photonic crystal that functions as a polarizer, an analyzer, a circular polarizer, etc.

A method of fabricating a photonic crystal on the end surface of the optical fiber is now described. FIG. 2 is a diagram demonstrating a method of fabricating a photonic crystal having the periodic structure composed of three-dimensional high refractive particles 221 and low refractive parts 222. With this fabricating method, a photonic crystal 223 is formed on the end surface of the optical fiber through processes which will be described below. Although the processes described below are applied to fabricating a photonic crystal having a periodic structure in refractive index, they can also be applied to fabricating a photonic crystal having a periodic structure in magnetic permeability.

(1) First, a plurality of optical fibers are tied in a bundle with each end surface aligned on approximately the same plane to form an optical fiber bundle 224.

(2) Onto the end surface of the optical fiber bundle 224 composed of the end surfaces of the optical fibers aligned in the above described manner as a substrate, the high refractive particles 221 are periodically multilayered. Each of the high refractive index particles 221 has a diameter of 20% to 80% of the wavelength of the light beam to be transmitted through these optical fibers.

(3) The optical fiber bundle 224 with the high refractive index particles 221 periodically multilayered on the end surface is separated into optical fibers.

Through the above processes (1) to (3), optical fibers with photonic crystals fabricated on the end surface can be mass-produced. Needless to say, the number of optical fibers for forming the optical fiber bundle 224 is not restrictive. Although not suitable for mass production, only one optical fiber will do.

In FIG. 2, the cross-section of the core 3 of the optical fiber is equal in diameter to the high refractive index particle 221. The actual core diameter of the optical fiber is normally 5 $\mu$m to 300 $\mu$m. When the beam wavelength is 0.85 $\mu$m, the diameter of the high refractive index particle 221 is 0.17 $\mu$m to 0.68 $\mu$m. Also, in the photonic crystal 223 shown in FIG. 2, the low refractive index part 222 is air. Alternatively, after multilayering the particles in the manner as stated in the above process (2), materials having a refractive index larger than that of the particles may be filled therebetween. In this case, such a photonic crystal is obtained as to have a periodic structure including the multilayered particles as low refractive index parts and the material filled between the particles as high refractive index parts. Furthermore, although the photonic crystal 223 shown in FIG. 2 has a periodic structure where the high and low refractive index parts are alternately repeated, a photonic crystal having a periodic structure where high and low magnetic permeability parts are alternately repeated can also be formed on the end surface of the optical fiber in the manner similar to the above.

Through the processes (1) to (3) for periodically multilayering the high refractive index particles 221, these particles 221 are arranged in a regular pattern and, typically, spaced uniformly. If high refractive index particles 221 are multilayered on the end surface of the optical fiber in a specific pattern, however, further processes should be required.

For example, in the process (2), before multilayering the high refractive index particles 221, a process is added for forming a desired groove pattern on the end surface of the optical fiber. With this process, the high refractive index particles 221 can be arrange according to the pattern, and a photonic crystal having a desired structure on the end surface of the optical fiber can be formed.

Here, the groove pattern is a collection of shallow grooves provided for fixing each of the high refractive index particles 221 in each predetermined position. The width and depth of each groove is not specifically restrictive. Also, the pattern is not restricted to be groove-like, and may be of any type, such as formed by one or more projecting lines or dots, or dented lines or dots.

To form the above stated groove pattern on the end surface of the optical fiber, the following three specific methods can be exemplarily thought. A first method is to coat the substrate with a resin film made of PMMA (polymethyl methacrylate), for example, by using a spin coating method, and then draw a desired groove pattern with a electronic beam for print. A second method is to put a mask of the desired groove patter onto the substrate for etching, and then remove the mask. A third method is to press a precise die of the desired groove pattern on to the substrate by predetermined force.

Figure 3:
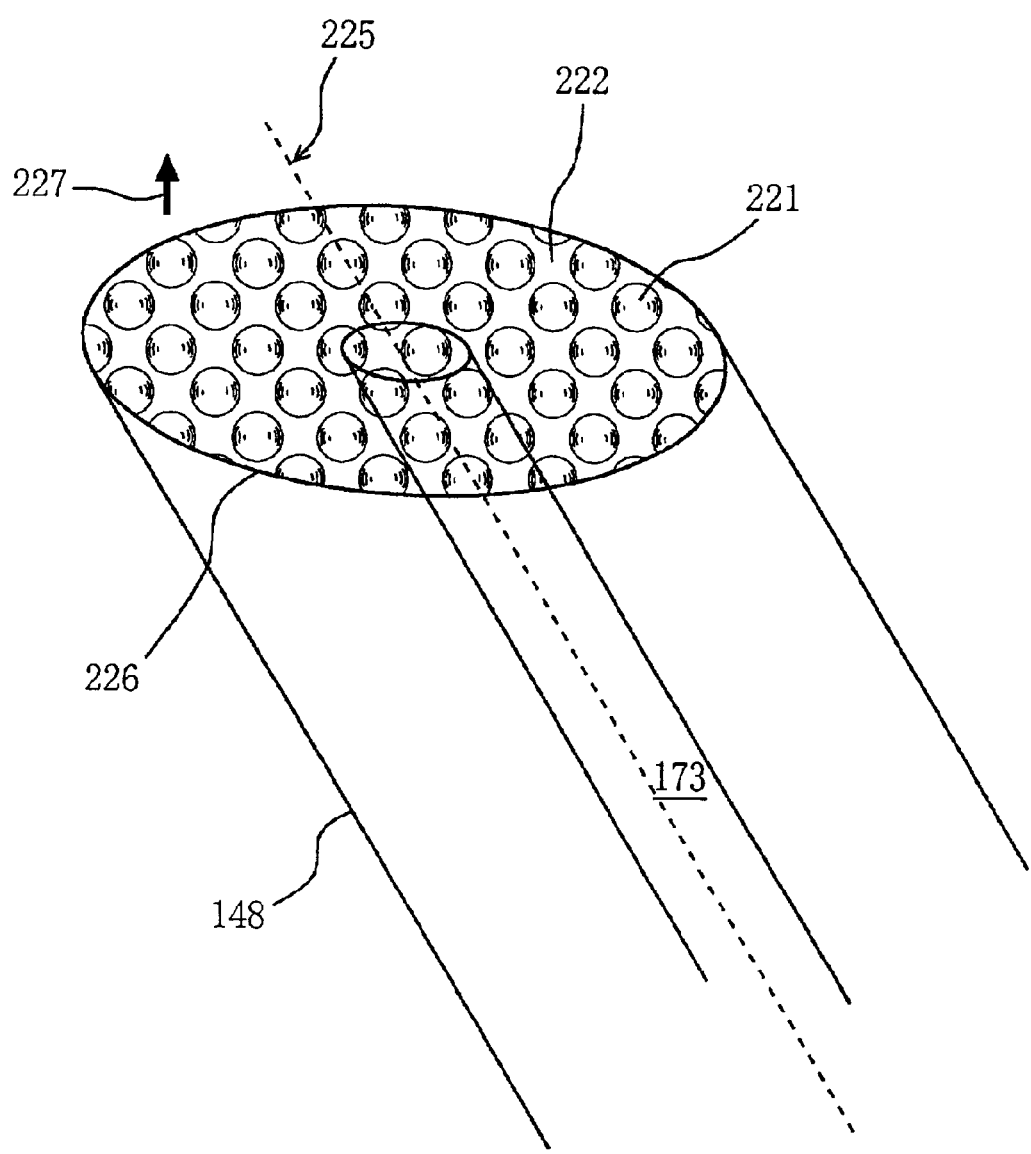
FIG. 3 is a diagram showing another method of fabricating the photonic crystal that functions as the above.

The end surface of the optical fiber on which the photonic crystal 223 shown in FIG. 2 is formed is perpendicular to a center axis of the core 3 of the optical fiber. In some cases, however, an optimal (or preferable) orientation of the end surface may be a direction different from that of multilayering (growing) of the photonic crystal 223. More specifically, when the photonic crystal functioning as a polarizer is formed, for example, it may functions optimally or preferably if multilayered in a predetermined direction different from that of light emitted from (or inputted to) the end surface of the optical fiber. In such case, the end surface where the photonic crystal is formed is so processed as to have a predetermined angle with respect to the center axis of the core 3 of the optical fiber (in FIG. 3, an optical axis 225 of a core 173, which will be described later). This processing is done by diagonal abrading, for example. That is, as shown in FIG. 3, an optical fiber 148 is formed having a diagonally sectioned end surface 226 so processed as that the angle between the normal and the optical axis 225 becomes optimal. Then, as with the above stated process (2), the high refractive index particles 221 are periodically multilayered in the direction of the normal to the diagonal end surface 226. Thus, a photonic crystal having a periodic structure including particles 221 as a high refractive index part and air between the particles 221 as a low refractive index part is formed on the diagonal end surface 226.

In an alternative method, by following the above processes (1) through (3), the plurality of optical fibers 148 each having the diagonal end surface 226 is first tied as being aligned on the same plane into an optical fiber bundle, a photonic crystal is formed thereon, and then the optical fiber bundle is separated into optical fibers. With this method, optical fibers with a photonic crystal fabricated on each diagonal end surface 226 can be mass-produced.

Furthermore, consider a case where the photonic crystals multilayered in the direction diagonal to the optical axis 225 of the optical fiber 148 as shown in FIG. 3 are optically coupled to an optical component having a plane perpendicular to the optical axis 225. In this case, the optical fiber may be used as it is with such diagonal end surface. Alternatively, the photonic crystal diagonally multilayered on the end surface may be coated with resin, for example, to become perpendicular to the optical axis 225, thereby intimately contacting with the optical component.

In the above description, the photonic crystal to be formed has a three-dimensional periodic structure on the end surface perpendicular or diagonal to the optical axis. This is not restrictive, and the description can also be applied to a photonic crystal having a one-dimensional multilayered periodic structure.

<Fabrication of Photonic Crystal Layers in the Optical Fiber>

Described next is a method of fabricating a photonic crystal in the optical fiber. In this method, a plurality of cylindrical holes parallel to each other are so formed as to penetrate through an optical fiber composed of a core and a clad. These cylindrical holes are distributed at regular intervals. Such cylindrical holes are formed perpendicularly to the optical axis of the optical fiber by, for example, mechanical processing with a drill, optical or thermal processing with a laser, or chemical processing such as etching. For etching, dry etching is performed using anodic aluminum oxide as a mask. With any of such processing, the plurality of microholes are formed penetrating through the core.

Filled in each cylindrical hole formed as such may be air or gas having any refractive index, or a material having an arbitrary refractive index with a sol-gel process, for example. Here, the filled material is such functional material as Faraday crystal or liquid crystal, and the corresponding part thereto functions as, by way of example only, a polarizer, a Faraday device, and a λ/4 plate. How to fabricate such optical device will be described in each embodiment.

The cylindrical holes form a photonic crystal depending on the state of distribution thereof. FIG. 4 shows a photonic band obtained by simulation when the cylindrical holes are squarely distributed in the core of the optical fiber. In FIG. 4, the lateral axis corresponds to the direction of propagation of light, spreading to all directions in a Brillouin zone. The vertical axis represents normalized frequency. A solid line indicates light in TM mode, while a dotted line indicates light in TE mode. A wave vector in the Brillouin zone on the lateral axis corresponds to the direction of propagation of light through the optical fiber, while the normalized frequency on the vertical axis corresponds to the wavelength of a light source In the example shown in FIG. 4, no light in TM mode can have the same wavelength as that of the light source within a TM mode photonic band gap, and only the light in TE mode having such wavelength can propagate, although in a restricted direction. Therefore, the cylindrical holes are preferably so distributed that the direction of propagation of the light in TE mode coincides with the optical axis of the optical fiber. This enables the optical device to function as a polarizer for propagating the light in TE mode with the wavelength of the light source in a predetermined direction. As such, if the cylindrical holes are so distributed as that the direction of propagation coincides with an optical axis of the optical fiber for polarization, the optical fiber can serve as a polarizer even for light propagating in the vicinity of the optical axis.

The photonic band shown in FIG. 4 is one example when the cylindrical holes are distributed. This is not restrictive. By filling each cylindrical hole with material to form a cylinder, for example, the refractive index of the material forming the cylinder can be varied depending on the filled material. With this, the optical fiber can function as a polarizer for light not only in TE mode, but also in TM mode, in all direction of propagation depending on the refractive index, outer diameter, distribution state of the cylindrical hole parts.

As such, a plurality of cylindrical holes having a refractive index different from that of the core are formed parallel to each other perpendicularly to the optical axis of the optical fiber at predetermined intervals. By controlling the refractive index, the outer diameter, and the distribution state of the cylindrical holes, dispersion characteristics become varied between the two types of linearly polarized lights (TM, TE), thereby enabling the optical fiber to function not only as an optical waveguide, but also a polarizer, λ/4 plate, or other component. Note that the shape of the hole is not restricted to be cylindrical. Described below is embodiments where the above method is applied to various optical devices.

The optical device according to each of the following embodiments includes two functional part, that is, first and second functional parts, arranged in a predetermined section of an optical fiber along an optical axis, the optical fiber being composed of a core through which light propagates and a clad surrounding the core, or further includes a third functional part. These functional parts are provided at predetermined intervals along the optical axis of the optical fiber. The first functional part is so structured as that a plurality of columns parallel to each other and made of material having a refractive index different from that of material forming the core are penetrating through the optical fiber or the core thereof. Specifically, these columns are filled with material having electro-optic effects or Faraday effects. The second and third functional parts are so structured as that a plurality of hollow columns (holes) parallel to each other are penetrating through the core. These functional parts enable the optical device according to the present invention to function as a polarizer, a λ/4 plate, a Faraday device, and other components by varying the dispersion characteristics of two types of linearly polarized lights (TM, TE).

(First Embodiment)

Described below is a first embodiment of the present invention with reference to the drawings. FIG. 5A is a schematic side view showing the structure of an optical device according to the first embodiment of the present invention. FIG. 5B is a schematic view of a section of the optical device of FIG. 5A through a line B–B' perpendicular to an optical axis 2. FIG. 5C is a schematic view of a section of the optical device of FIG. 5A through a line C–C' perpendicular to the optical axis 2. Note that, in FIG. 5A, an optical fiber 1 is shown only in part that corresponds to the optical device.

As shown in FIG. 5A, the optical device is formed in the optical fiber 1. The optical fiber 1 is composed of a core 3 through which light propagates, and a clad 4 surrounding the core 3. Also, in the optical fiber 1, two functional parts, that is, a first functional part 7 and a second functional part 8, are formed, functioning the optical device. These first and second functional parts 7 and 8 are spaced at a predetermined interval along the optical axis 2 of the optical fiber 1. Note that, in the optical fiber 1, part other than the above functional parts achieves only the normal optical transmission function.

The first functional part 7 is structured by a plurality of Faraday crystal columns 5 that are parallel to each other and so formed in a predetermined section of the optical fiber 1 along the optical axis 2 as to penetrate perpendicularly to the optical axis 2 through the core 3 and the clad 4 of the optical fiber 1. These Faraday crystal columns 5 are fabricated by filling Faraday crystals having a refractive index different from that of the core 3 in cylindrical holes penetrating perpendicularly to the optical axis 2 through the core 3 and the clad 4 of the optical fiber 1. This fabrication is exemplarily made with the sol-gel process. The Faraday crystal is a garnet crystal, for example. These Faraday crystal columns 5 are so distributed as to form lattices on a plane perpendicular to a longitudinal direction of each column. Assume herein that there exists a magnetic field 20 parallel to the optical axis 2 of the optical fiber, having an intensity enough to rotate the plane of polarization of light.

The second functional part 8 is structured by a plurality of holes 6 that are parallel to each other and so formed in a predetermined section of the optical fiber 1 along the optical axis 2 as to penetrate through the core 3 and the clad 4 of the optical fiber 1 perpendicularly to the optical axis 2. As with the Faraday crystal columns 5, these holes 6 are so distributed as to form lattices on a plane perpendicular to a longitudinal direction of the holes 6. The longitudinal direction of the holes 6 is set to have, along a plane perpendicular to the optical axis 2, an angle of 45° with respect to the longitudinal direction of the Faraday crystal columns 5 of the first functional part 7. These cylindrical holes 6 are naturally filled with air, for example, to have a refractive index different from that of the core 3 of the optical fiber 1.

As is evident from FIGS. 5B and 5C, the Faraday crystal substitute columns 5 of the first functional part 7 form the angle of 45° with the cylindrical holes 6 of the second functional part 8.

The first and second functional parts 7 and 8 are further described. The cylindrical holes having a refractive index different from that of the core 3 of the optical fiber 1 can be formed perpendicularly to the optical axis of the optical fiber with a drill, a laser, or through etching, as described above. The first functional part 7 is structured by the plurality of Faraday crystal columns 5 by filling thus formed cylindrical holes in the Faraday crystal by the sol-gel process. With this structure, the first functional part 7 functions as a polarizer and a Faraday device. The second functional part 8 is structured only by the plurality of holes 6. To enable the second functional part 8 to function as a polarizer (analyzer), the outer diameter of each hole 6 and the distribution state of the holes 6 are calculated in advance. The longitudinal direction of the holes 6 forms an angle of 45° with the Faraday crystal columns 5 of the first functional part 7.

As stated above, the plurality of cylindrical holes or columns filled with functional material that are parallel to each other having the refractive index different from that of the core 3 are formed perpendicularly to the optical axis 2 of the optical fiber at predetermined intervals. In such formation, by controlling the refractive index, the outer diameter, and the distribution state of the holes or columns, dispersion characteristics become varied between two types of linearly polarized lights (TM, TE). As a result, in the optical fiber 1, the first functional part 7 functions as a polarizer and a Faraday device, while the second functional part 8 functions as an analyzer. Therefore, the optical fiber 1 acts as not only an optical waveguide, but also an optical isolator. Therefore, there is no need to couple the optical fiber to a separate waveguide to the optical isolator via a lens, and the number of components can be reduced, thereby significantly reducing cost.

Figure 6:
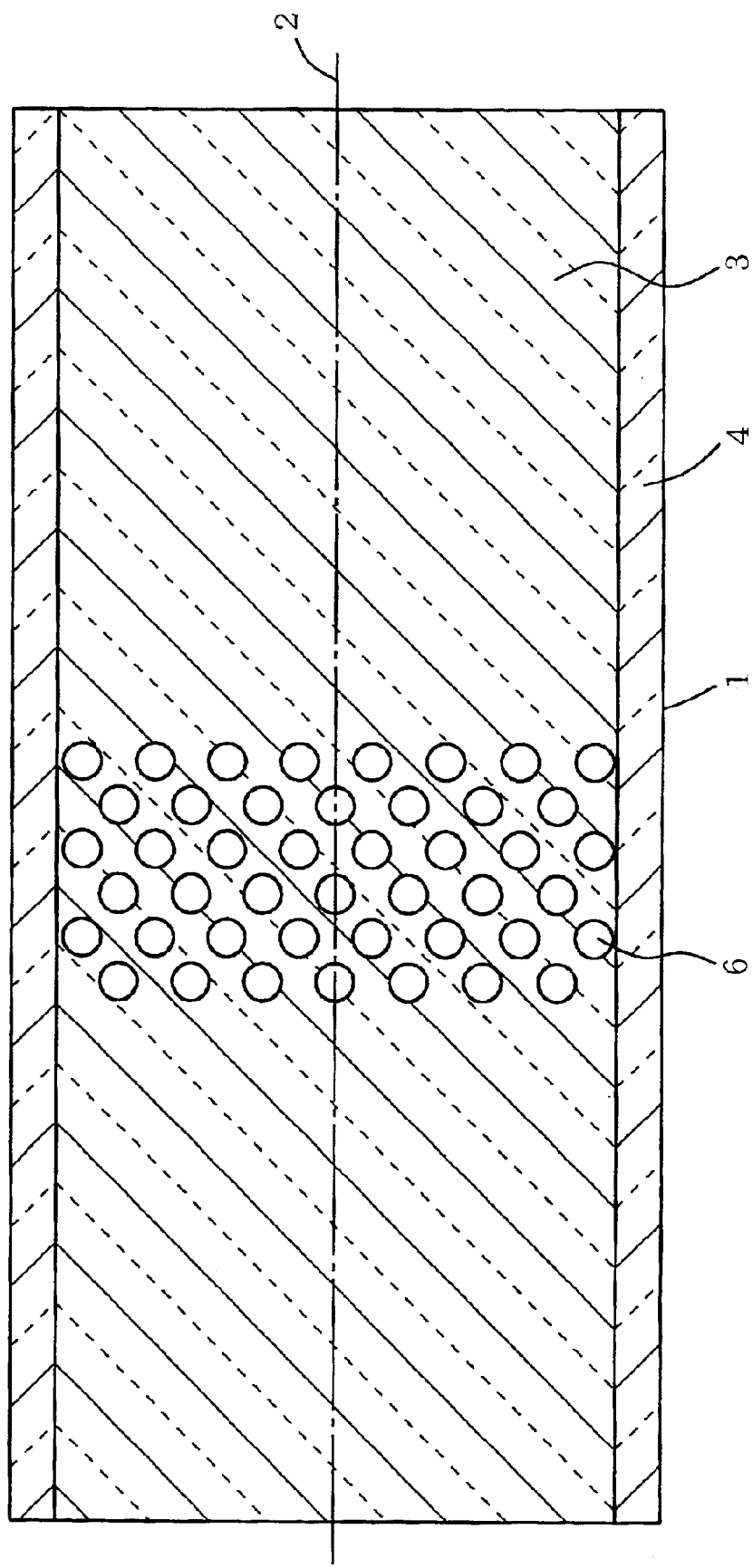
FIG. 6 is a schematic diagram partially showing the structure of another optical device according to the first embodiment of the present invention.

FIG. 6 is a schematic diagram partially showing the structure of another optical device according to the first embodiment of the present invention. The holes 6 shown in FIG. 6 may be those included in the second functional part 8 of FIG. 5A, or those before forming the Faraday crystal columns 5.

In the above description, the cylindrical holes 6 or the holes for forming the Faraday crystal columns 5 are so formed as to penetrate through both the core 3 and the clad 4. In FIG. 6, however, these holes may be formed only in the core 3. This is because, in reality, light passes through only the core 3 in the optical fiber 1. Therefore, the effects on the light passing inside the optical fiber 1 vary whether these holes penetrate through only the core 3 or both the core 3 and the clad 4.

In the first embodiment, the hole is shaped in column. This is not restrictive, and the hole may be shaped in quadratic prism, polygonal prism, cylindroid, or other shapes. Furthermore, the above described functions are achieved by a two-dimensional photonic crystal including the plurality of columns and holes parallel to each other. This is not restrictive, and those functions may be achieved by a three-dimensional photonic crystal having the structure called as Yablonovite or woodpile.

(Second Embodiment)

Figure 7A:
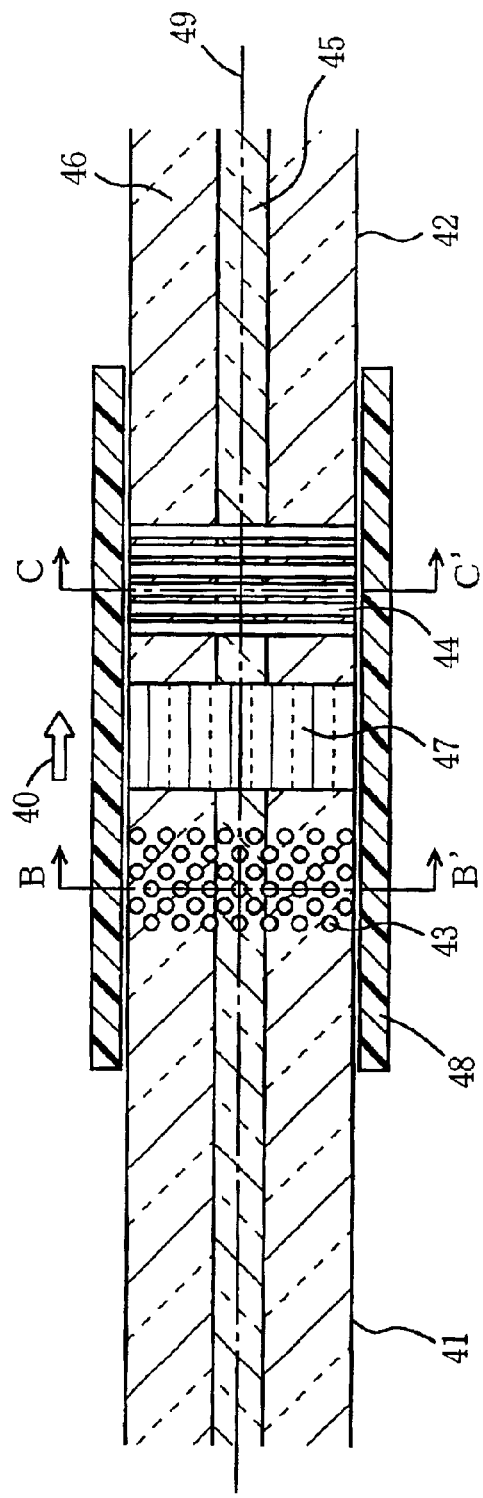
FIGS. 7A to 7C are schematic diagrams each showing the structure of an optical device according to a second embodiment of the present invention.
Figure 7C:
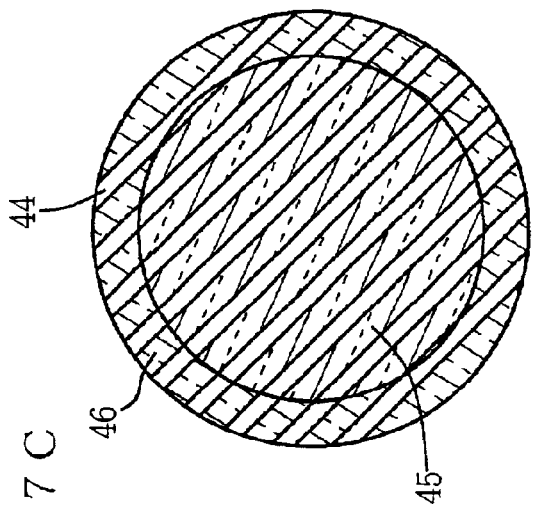
Figure 7B:
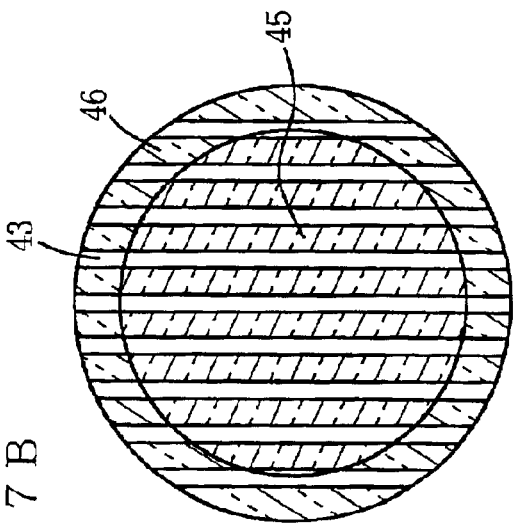

Described below is a second embodiment of the present invention with reference to the drawings. FIG. 7A is a schematic side view showing the structure of an optical device according to the second embodiment of the present invention. FIG. 7B is a schematic view of a section of the optical device of FIG. 7A through a line B–B' perpendicular to an optical axis 49. FIG. 7C is a schematic view of a section of the optical device of FIG. 7A through a line C–C' perpendicular to the optical axis 49. Note that, in FIG. 7A, an optical fiber is shown only in part that corresponds to the optical device.

As shown in FIG. 7A, the optical device includes an incidence side optical fiber 41 having a core 45 and a clad 46, and an output side optical fiber 42 having the core 45 and the clad 46, a Faraday device 47 provided between the incidence side optical fiber 41 and the output side optical fiber 42 for rotating a plane of polarization of light, and a guide 48 for mechanically adjusting the optical axes of those optical fibers 41 and 42. The Faraday device 47 is exemplarily implemented by a garnet crystal.

The incidence side optical fiber 41 has a plurality of cylindrical first holes 43 parallel to each other formed along a predetermined section along the optical axis 49 so as to penetrate the core 45 and the clad 46 perpendicularly to the optical axis 49. These first holes 43 are distributed at predetermined intervals, and have a refractive index different from that of the core 45 in the optical fiber 41.

Similarly, the output side optical fiber 42 has a plurality of cylindrical second holes 44 parallel to each other formed along a predetermined section along the optical axis 49 so as to penetrate the core 45 and the clad 46 perpendicularly to the optical axis 49. These second holes 44 are also distributed at predetermined intervals, and have a refractive index different from that of the core 45 in the optical fiber 41.

Here, as described in the first embodiment, these first and second holes 43 and 44 are so distributed as to function as polarizers, and arranged periodically, as described in FIG. 4. The longitudinal directions of the first and second holes 43 and 44 are set to form an angle of 45° with each other, as can be seen from FIGS. 5B and 5C. there exists a magnetic field 40 parallel to the optical axis 49 and having an intensity enough to rotate the plane of polarization of light.

The first and second holes 43 and 44 are formed in a similar manner to that in the first embodiment. That is, these holes are formed perpendicularly to the optical axis 49 of the optical fiber by a drill, a laser, or through etching.

In the present embodiment, the incidence side optical fiber 41 and the output side optical fiber 42 are mechanically related to each other via the guide 48, which can freely rotate both about the optical axis 49. Therefore, the first holes 43 of the incidence optical fiber 41 and the second holes 44 of the output light optical fiber 42 are so adjusted by the guide 48 as to form an angle of 45° with each other. With such structure, the first holes 43 of the incidence side optical fiber 41 and the second holes 44 of the output side optical fiber 42 are similarly created, and the angle formed thereby can be adjusted later. Therefore, the optical device can be fabricated at low cost.

In the above description, the cylindrical holes are so formed as to penetrate through both the core 45 and the clad 46. However, as with the case shown in FIG. 6, these holes may be formed only in the core 45. Furthermore, the first or second hole 43 or 44 may be filled with material such as a Faraday crystal having a refractive index different form that of the core 45 of each optical fiber. Here, if the first or second holes 43 or 44 are filled with a Faraday crystal, the Faraday device 47 can be omitted.

In the first embodiment, the hole is shaped in column. This is not restrictive, and the hole may be shaped as a quadratic prism, polygonal prism, cylindroid, or other shapes. Furthermore, the above described functions are achieved by a two-dimensional photonic crystal including the plurality of columns and holes parallel to each other. This is not restrictive, and those functions may be achieved by a three-dimensional photonic crystal having the structure called as Yablonovite or woodpile. Still further, instead of the first and second holes 43 and 44, the incidence side optical fiber 41 and the output side optical fiber 42 may each have a photonic crystal layer fabricated on the end surface thereof. How to fabricate a photonic crystal layer on the end surface of the optical fiber has been described, by using FIG. 2, for example, described in which is how to fabricate a photonic crystal having a three-dimensional periodic structure including the high refractive index particles 221 and the low refractive index parts 222.

As such, a polarizer and an analyzer can be formed only with the same process applied to the optical fiber for forming holes. By combining the optical fiber functioning as the polarizer and analyzer with a Faraday device, an optical isolator can be formed. Therefore, there is no need to couple the optical fiber to a separate waveguide to the optical isolator via a lens, and the number of components can be reduced, thereby significantly reducing cost.

(Third Embodiment)

Described below is a third embodiment of the present invention with reference to the drawings. FIG. 8 is a schematic side view showing the structure of an optical device according to the third embodiment of the present invention. Note that, in FIG. 8, an optical fiber 51 is shown only in part that corresponds to the optical device.

As shown in FIG. 8, the optical device includes the optical fiber 51, a pair of electrodes 59 causing an electric field perpendicular to an optical axis 52 of the optical fiber 51, and a signal source 50 applying a predetermined voltage to one of the electrodes 59. The optical fiber 51 is composed of a core 53 through which light passes and a clad 54 surrounding the core 53. Also formed in the optical fiber 51 are two functional parts, that is, a first functional part 57 and a second functional part 58, functioning as the optical device. These first and second functional parts 57 and 58 are provided at a predetermined interval along the optical axis 52 of the optical fiber 51.

The first functional part 57 is structured by a plurality of Pockels crystal columns 55 that are parallel to each other and so formed in a predetermined section of the optical fiber 51 along the optical axis 52 as to penetrate through the core 53 and the clad 54 of the optical fiber 51 perpendicularly to the optical axis 52. These Pockels crystal columns 55 are so distributed as to form lattices on a plane perpendicular to a longitudinal direction of each column. These Pockels crystal columns 55 are fabricated by filling a Pockels crystal with the sol-gel process, for example. The Pockels crystal is known as a material having a linear electro-optic effect, and exemplarily made of $LiNbO_3$, $LiTaO_3$, $NH_4H_2PO_4$, and $KH_2PO_4$.

The second functional part 58 is structured by a plurality of holes 56 that are parallel to each other and so formed in a predetermined section of the optical fiber 51 along the optical axis 52 as to penetrate through the core 53 and the clad 54 of the optical fiber 51 perpendicularly to the optical axis 52. These holes 6 are also so distributed as to form lattices on a plane perpendicular to a longitudinal direction of the holes 56, and have a refractive index different from that of the core 53 of the optical fiber 51.

The first and second functional parts 57 and 58 are further described in detail. The cylindrical holes having a refractive index different from that of the core 53 of the optical fiber 51 can be formed perpendicularly to the optical axis of the optical fiber with a drill, a laser, or through etching, as described above. The first functional part 57 is structured by the plurality of Pockels crystal columns 55 fabricated in the above described manner, and functions as both a polarizer and a Pockels device. The second functional part 58 is structured only by the plurality of holes 56. To enable the second functional part 58 to function as a polarizer (analyzer), the outer diameter of each hole 56 and the distribution state of the holes 56 are calculated in advance. The formed holes 56 are perpendicular or parallel to the Pockels crystal columns 55 of the first functional part 57 along a plane perpendicular to the optical axis 52.

Furthermore, to enable the Pockels crystal columns 55 to function as a $\lambda/4$ plate, the electric field applied to the electrode 59 by the signal source 50 is controlled in magnitude for varying the refraction index of the Pockels crystal column 55. Also, the signal source 50 can vary the electric field of the electrode 59 periodically. Consequently, the refractive index of the Pockels crystal columns 55 is varied. Therefore, an optical signal passing through the first functional part 57 can be changed.

As such, a polarizer, an analyzer, and a $\lambda/4$ plate can be formed only by processing the optical fiber 51. With this, the optical fiber 51 acts as an optical modulator. Therefore, there is no need to couple the optical fiber to a separate waveguide to the optical isolator via a lens, and the number of components can be reduced, thereby significantly reducing cost.

In the above description, the cylindrical holes are so formed as to penetrate through both the core 53 and the clad 54. However, as with the case shown in FIG. 6, these holes may be formed only in the core 53. Furthermore, in the above description, the hole is shaped in column. This is not restrictive, and the hole may be shaped as a quadratic prism, polygonal prism, cylindroid, or other shapes. Still further, in the above description, the above described functions are achieved by a two-dimensional photonic crystal including the plurality of columns and holes parallel to each other. This is not restrictive, and those functions may be achieved by a three-dimensional photonic crystal having the structure called as Yablonovite or woodpile.

(Fourth Embodiment)

Figure 9:
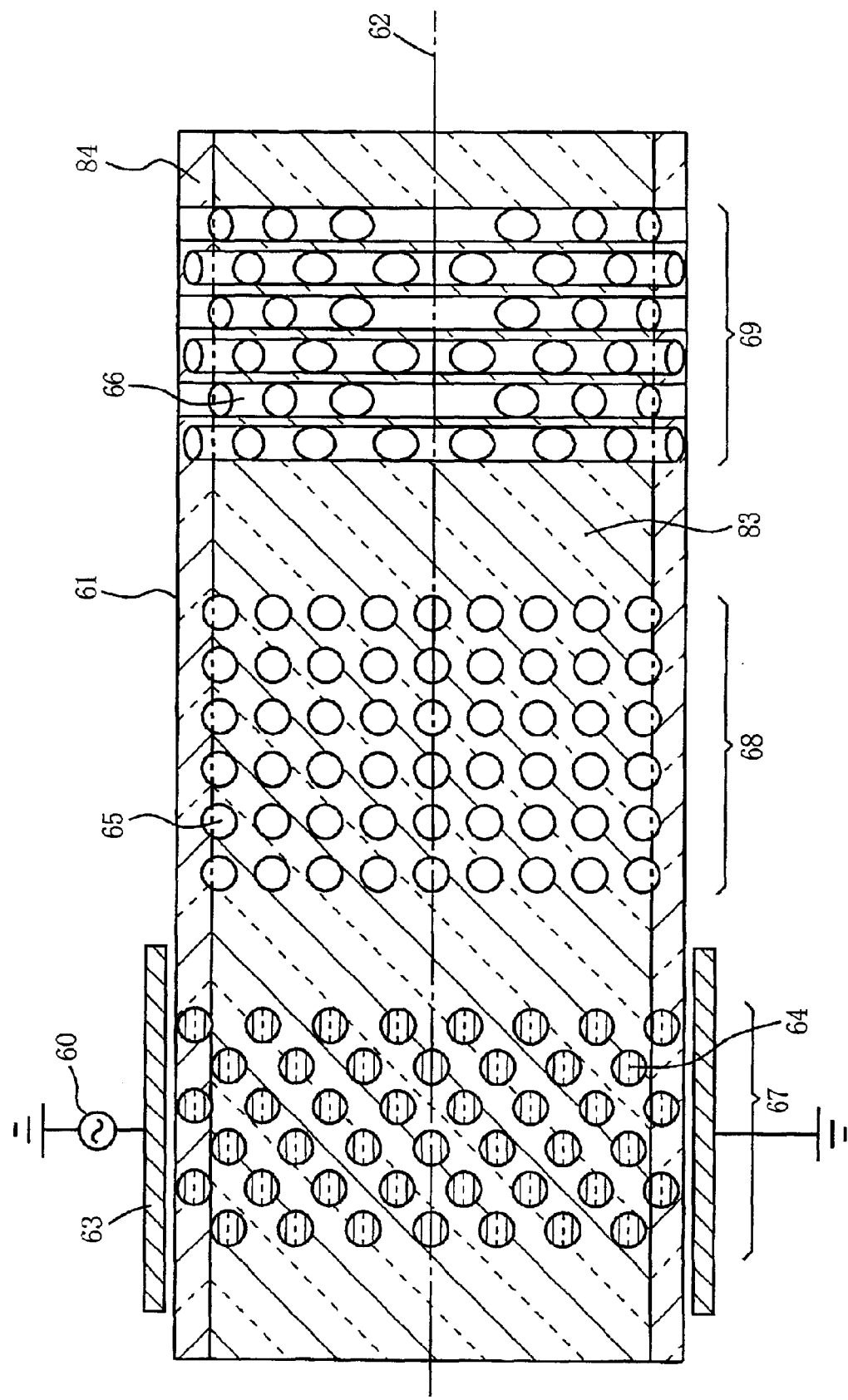
FIG. 9 is a schematic side view of an optical device according to a fourth embodiment of the present invention.

Described below is a fourth embodiment of the present invention with reference to the drawings. FIG. 9 is a schematic side view showing the structure of an optical device according to the fourth embodiment of the present invention. Note that, in FIG. 9, an optical fiber 61 is shown only in part that corresponds to the optical device.

As shown in FIG. 9, the optical device includes the optical fiber 61, a pair of electrodes 63 causing an electric field perpendicular to an optical axis 62 of the optical fiber 61, and a signal source 60 applying a predetermined voltage to one of the electrodes 63. The optical fiber 61 is composed of a core 83 through which light passes and a clad 84 surrounding the core 83. Also formed in the optical fiber 61 are three functional parts, that is, a first functional part 67, a second functional part 68, and a third functional part 69, functioning as the optical device. These first to third functional parts 67 and 69 are provided at predetermined intervals along the optical axis 62 of the optical fiber 61.

As with the first functional part 57 of the third embodiment, the first functional part 67 is structured by a plurality of Pockels crystal columns 64 that are parallel to each other and so formed in a predetermined section of the optical fiber 61 along the optical axis 62 as to penetrate through the core 83 and the clad 84 of the optical fiber 61 perpendicularly to the optical axis 62.

As with the second functional part 58 of the third embodiment, the first and second functional parts 68 and 69 of the present embodiment are structured by a plurality of first holes 65 and second holes 66, respectively, that are parallel to each other and so formed in a predetermined section of the optical fiber 61 along the optical axis 62 as to penetrate through the core 83 and the clad 84 of the optical fiber 61 perpendicularly to the optical axis 62. These first and second holes 65 and 66 are respectively so distributed as to form lattices on a plane perpendicular to a longitudinal direction of each hole, and have refractive indexes different from that of the core 83 of the optical fiber 61. The first and second holes 65 and 66 are also provided perpendicularly or parallel to the Pockels crystal columns 64 of the first functional part 67 along a plane perpendicular to the optical axis 62.

The first to third functional parts 67 to 69 are further described in detail. The cylindrical holes having a refractive index different from that of the core 83 of the optical fiber 61 can be formed perpendicularly to the optical axis of the optical fiber with a drill, a laser, or through etching, as described above. The first functional part 67 is structured by the plurality of Pockels crystal columns 64 fabricated in the above described manner, and functions as both a polarizer and a Pockels device. The second functional part 68 is structured only by the plurality of first holes 65. To enable the second functional part 58 to function as a λ/4 plate, the outer diameter of each first hole 65 and the distribution state of the first holes 65 are calculated in advance. The formed first holes 65 are perpendicular or parallel to the Pockels crystal columns 64 of the first functional part 67, and arranged periodically, as already described in FIG. 4. Also, the third functional part 69 has, as with the second functional part 68, has second holes 66 formed perpendicularly or parallel to the Pockels crystal columns 64 of the first functional part 68 in order to function as a polarizer (analyzer).

Furthermore, the signal source 60 periodically varies the electric field applied to the electrode 63 to vary the refractive index of the Pockels crystal columns 64, thereby changing an optical signal passing through the first functional part 67.

As such, a polarizer, a Pockels device, a λ/4 plate, and an analyzer can be formed only by processing the optical fiber 61. With this, the optical fiber 61 acts as an optical modulator. Therefore, there is no need to couple the optical fiber to a separate waveguide to the optical isolator via a lens, and the number of components can be reduced, thereby significantly reducing cost.

In the above description, the cylindrical holes are so formed as to penetrate through both the core 83 and the clad 84. However, as with the case shown in FIG. 6, these holes may be formed only in the core 83. Furthermore, in the above description, the hole is shaped as a column. This is not restrictive, and the hole may be shaped as a quadratic prism, polygonal prism, cylindroid, or other shapes. Still further, in the above description, the above described functions are achieved by a two-dimensional photonic crystal including the plurality of columns and holes parallel to each other. This is not restrictive, and those functions may be achieved by a three-dimensional photonic crystal having the structure called as Yablonovite or woodpile.

(Fifth Embodiment)

Figure 10:
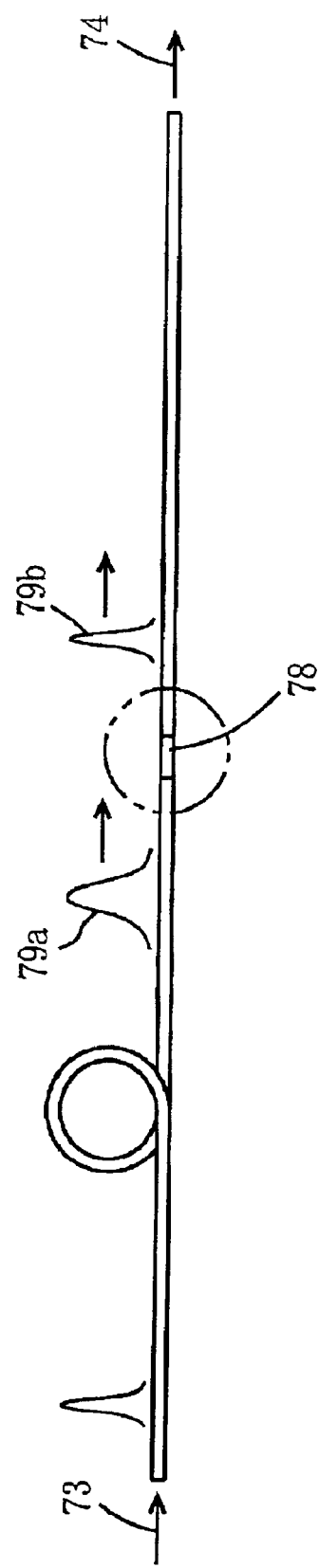
FIG. 10 is an overall view of an optical device according to a fifth embodiment of the present invention.
Figure 11:
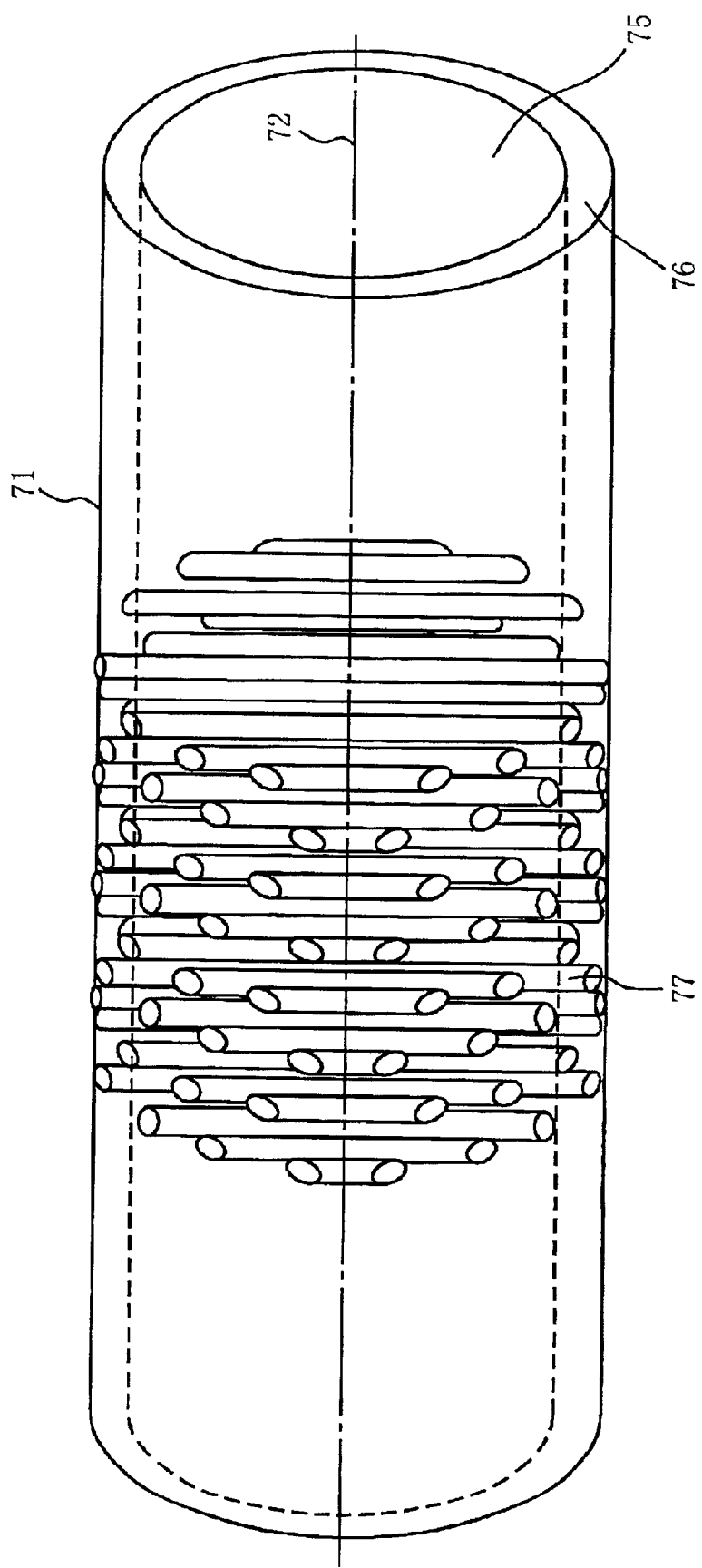
FIG. 11 is a schematic perspective view of an optical fiber 71 with a functional part 78 shown in FIG. 10 enlarged.

Described below is a fifth embodiment of the present invention with reference to the drawings. FIG. 10 is a diagram showing the entire structure of an optical device according to the fifth embodiment of the present invention. FIG. 11 is a schematic perspective view of an optical fiber 71 with a functional part 78 shown in FIG. 10 enlarged.

As shown in FIGS. 10 and 11, the optical device is formed in the optical fiber 71. The optical fiber 71 is composed of a core 75 through which light passes and a clad 76 surrounding the core 75. Also formed in the optical fiber 71 is the functional part 78, functioning as the optical device.

The functional part 78 is structured by a plurality of holes 77 that are parallel to each other and so formed in a predetermined section of the optical fiber 71 along an optical axis 72 as to penetrate through the core 75 and the clad 76 of the optical fiber 71 perpendicularly to the optical axis 72. These holes 77 are so distributed as to form lattices on a plane perpendicular to a longitudinal direction of each hole, and have a refractive index different from that of the core 75 of the optical fiber 71. The holes 77 can be formed perpendicularly to the optical axis 72 of the optical fiber 71 with a drill, a laser, or through etching, as described above.

As stated above, the plurality of cylindrical holes 77 parallel to each other having the refractive index different from that of the core 75 are formed perpendicularly to the optical axis 72 of the optical fiber at predetermined intervals. In such formation, by controlling the refractive index, the outer diameter, and the distribution state of the holes, dispersion characteristics become varied between two types of linearly polarized lights (TM, TE). As a result, in the optical fiber 71, the functional part 78 can have a dispersion characteristic of delaying or advancing the wavelength. As such, if the phase velocity of the wavelength of the light source can be delayed and advanced, a signal 79a dispersed due to a wavelength dispersion characteristic unique to the optical fiber can be recovered through the functional part 78 to a steep pulse signal 79b such as incident light 73. Therefore, output light 74 becomes a signal such as the incident light 73. Therefore, the present optical device functions as a dispersion compensator.

As such, the optical fiber 71 can act as a dispersion compensator only by processing the optical fiber 71. Therefore, there is no need to couple the optical fiber to a separate waveguide to the optical modulator via a lens, and the number of components can be reduced, thereby significantly reducing cost.

In the above description, the cylindrical holes are so formed as to penetrate through both the core 75 and the clad 76. However, as with the case shown in FIG. 6, these holes may be formed only in the core 75. Furthermore, in the above description, the hole is shaped in column. This is not restrictive, and the hole may be shaped in quadratic prism, polygonal prism, cylindroid, or other shapes. Still further, in the above description, the above described functions are achieved by a two-dimensional photonic crystal including the plurality of holes parallel to each other. This is not restrictive, and those functions may be achieved by a three-dimensional photonic crystal having the structure called as Yablonovite or woodpile. However, if the optical fiber 71 is a polarization-plane-maintaining optical fiber, it is not preferable, in view of a direction of arrangement of the holes, to achieve these functions with such three-dimensional photonic crystal.

<Specific Implementations to the Optical Fiber>

Specifically described next are cases where an optical device such as an optical modulator is implemented in an optical fiber. In the following embodiments, by using a plane formed by partially removing the clad, a plurality of columns parallel to each other are easily formed through the core. Also, the clad-removed plane is provided with electrodes, thereby enabling application of an uniform, stable electric field to the functional parts.

(Sixth Embodiment)

Figure 12:
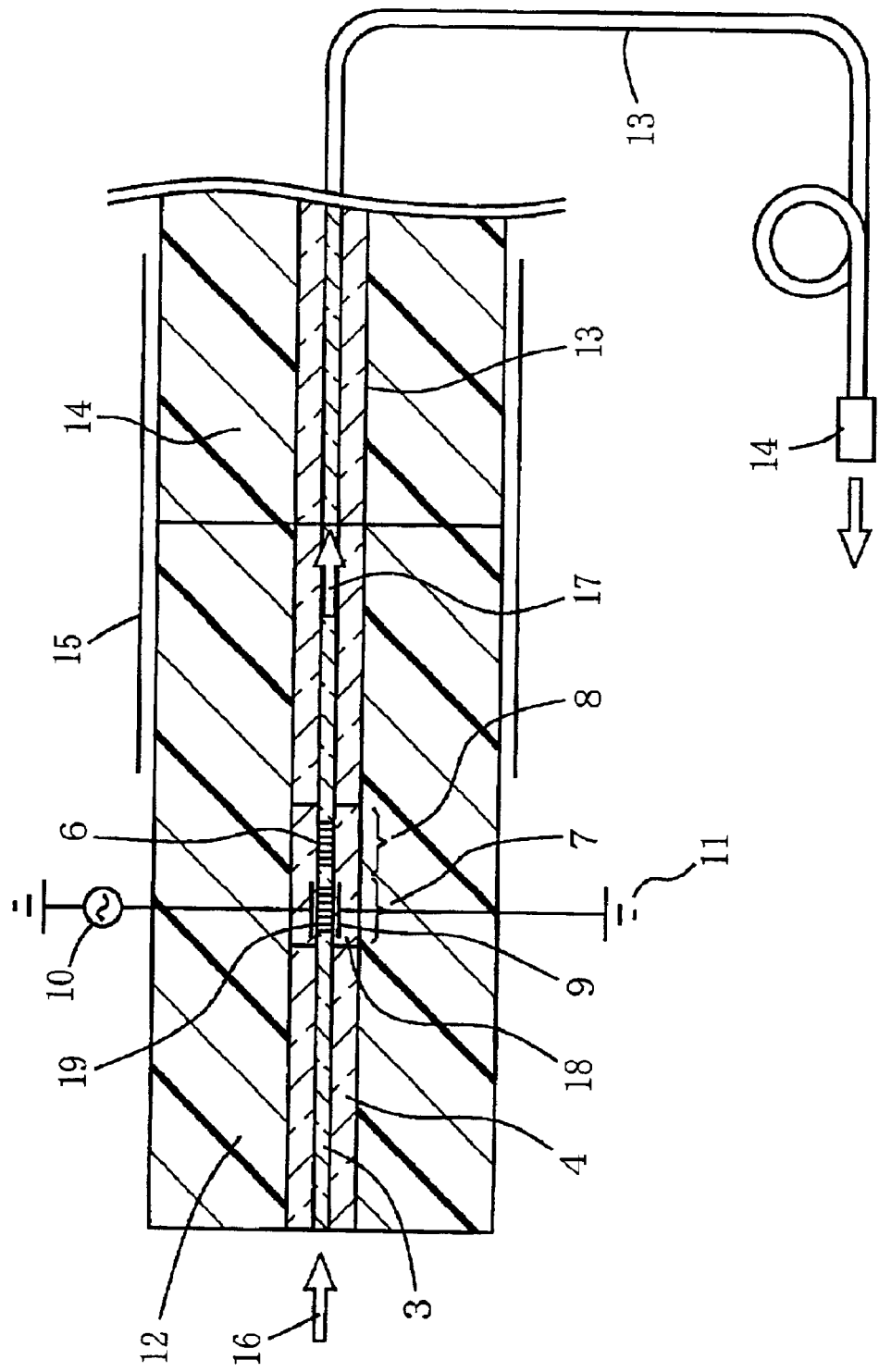
FIG. 12 is a horizontal section view of the entire optical device according to the sixth embodiment of the present invention.

Described below is a sixth embodiment of the present invention with reference to the drawings. FIG. 12 is a horizontal section view of the entire optical device according to the sixth embodiment of the present invention. FIG. 13A is schematic section view of the optical device shown in FIG. 12 partly enlarged. FIG. 13B is a schematic view of a section of the optical device of FIG. 13A through a line B–B' perpendicular to an optical axis 22.

As shown in FIGS. 12, 13A, and 13B, the optical device is formed in an optical fiber 1 and a capillary 12 surrounding the optical fiber 1. The optical fiber 1 is composed of a core 3 through which light passes and a clad 4 surrounding the core 3. Also formed in the optical fiber 1 is two functional parts, that is, a first functional part 7 and a second functional part 8. These first and second functional parts 7 and 8 are provided at a predetermined interval along an optical axis 22 of the optical fiber 1. With these functional parts, there is a difference in dispersion characteristics between the two types of linearly polarized lights (TM, TE), thereby enabling the optical device to function as polarizer or other component.

Here, the first and second functional parts 7 and 8 according to the present embodiment are similar to the first and second functional parts 57 and 58 according to the third embodiment. Also, columns 19 and holes 6 according to the present embodiment are formed and distributed in a similar manner to that used for forming and distributing the Pockels crystal columns 55 and the holes 56 according to the third embodiment. Therefore, they are not described herein. Note that the columns 19 are formed parallel to the holes 6.

Here, to form the first and second functional parts 7 and 8, a portion 18 is removed from the clad 4 for a predetermined length on the left and right sides of the optical fiber 1, and each section exposed after removal almost touches on the core 3. Such sections on both sides are parallel to each other with the core 3 placed therebetween, and hereinafter called as parallel boundary surfaces 23. Therefore, as shown in FIG. 13B, the optical fiber 1 is so shaped, in a predetermined section, as to have remaining clad parts 21 on upper and lower sides thereof with the right and left sides thereof removed, and parallel boundary surfaces 23 in a pair are exposed. With such formation, the columns 19 and holes 6 are easily formed.

Furthermore, for applying an electric field to the plurality of columns 19 made of a Pockels crystal forming the first functional part 7, a pair of electrodes 9 is provided on the pair of the parallel boundary surfaces 23 as described above. The electrodes 9 are provided on the sides of the optical fiber 1, and the direction of applying the electric field is parallel to the plurality of columns 19. As such, the electrodes 9 are placed on the pair of parallel boundary surfaces 23, thereby enabling easy, correct application of the electric field to the columns 19. Voltage is applied to one electrode 9 by a signal source 10, which is placed externally to the capillary 12. The other electrode 9 is connected to a ground 11.

The capillary 12 surrounding the optical fiber 1 has a diameter approximately equal to that of a ferrule 14 of another optical fiber 13 to be connected. Thus, when the optical device is connected to the optical fiber 13, the capillary 12 is supported by the ferrule 14 and split sleeves 15 of the optical fiber 13 for easy axial alignment in a similar manner as that used for coupling an optical system between optical fibers.

(Seventh Embodiment)

Described below is a seventh embodiment of the present invention with reference to the drawings. FIG. 14A is a schematic side view of an optical device according to the seventh embodiment of the present invention. FIG. 14B is a schematic view of a section of the optical device of FIG. 14A through a line B–B' perpendicular to an optical axis 22.

As shown in FIGS. 14A and 14B, the optical device is similar in structure to that according to sixth embodiment shown in FIGS. 13A and 13B, except that a pair of parallel electrodes 24 is different in place and shape from the pair of electrodes 9. The parallel electrodes 24 according to the present embodiment are so provided as to apply an electric field perpendicularly to a longitudinal direction of a plurality of columns 19 made of a Pockels crystal forming a first functional part 7 and also perpendicularly to the optical axis 22 of an optical fiber 1. To do this, the parallel electrodes 24 are characterized by being placed parallel to each other with respect to the optical axis 22 and perpendicularly to the longitudinal direction of the columns 19. That is, as shown in FIG. 14A, the electrodes 24 are provided on a plane perpendicular to the longitudinal direction of the columns 19, one electrode being placed above the uppermost columns, and the other below the lowermost. Such provision is different from that of the electrodes 9. Note that, as shown in FIG. 14B, the plane perpendicular to the longitudinal direction of the columns 19 is equivalent to one of the parallel boundary surfaces 23, which are in rectangular shape formed by removing the portions 18 from the clad 4 and parallel to each other with the core 3 therebetween. As stated above, the pair of parallel electrodes 24 is provided on the same single surface, and therefore does not require two surfaces (parallel boundary surfaces 23) formed by removing the portion 18 from both the right and left sides of the optical fiber 1 as shown in FIG. 14B. For this reason, the portion 18 may be removed from the optical fiber 1 so that only one surface is formed where the parallel electrodes 24 are placed. These parallel electrodes 24 arranged as such can adjust an optical modulation function in the first functional part 7 structured by the columns 19 made of a Pockels crystal.

Voltage is applied to one electrode 24 by a signal source 10, which is placed externally to a capillary 12. The other electrode 24 is connected to a ground 11. Such structure is the same as that of the optical device according to the sixth embodiment. Therefore, further description is omitted herein.

(Eighth Embodiment)

Figures 15A, 15B:
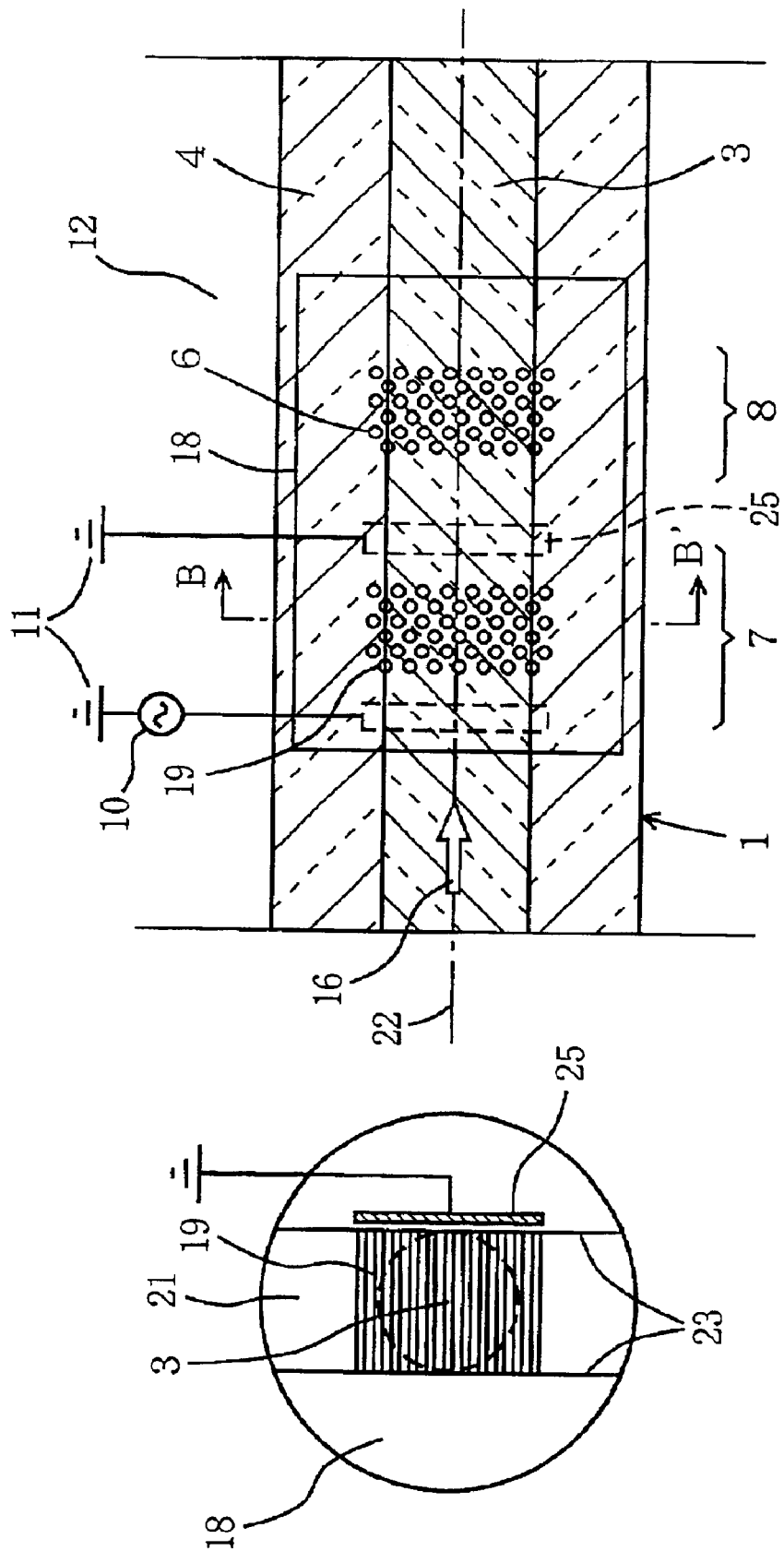
FIGS. 15A and 15B are schematic diagrams showing the structure of an optical device according to an eight embodiment of the present invention.

Described below is an eighth embodiment of the present invention with reference to the drawings. FIG. 15A is a schematic side view of an optical device according to the eighth embodiment of the present invention. FIG. 15B is a schematic view of a section of the optical device of FIG. 15A through a line B–B' perpendicular to an optical axis 22.

As shown in FIGS. 15A and 15B, the optical device is similar in structure to that according to sixth embodiment shown in FIGS. 13A and 13B, except that a pair of longitudinal electrodes 25 is different in place and shape from the pair of electrodes 9. The longitudinal electrodes 25 according to the present embodiment are so provided as to apply an electric field perpendicularly to a longitudinal direction of a plurality of columns 19 made of a Pockels crystal forming a first functional part 7 and parallel to an optical axis 22 of an optical fiber 1. To do this, the longitudinal electrodes 25 are characterized by being placed parallel to each other with respect to the optical axis 22 and perpendicularly to the longitudinal direction of the columns 19. That is, as shown in FIG. 15A, the electrodes 25 are provided on a plane perpendicular to the longitudinal direction of the columns 19, one electrode being placed on the right of the rightmost columns, and the other on the left of the leftmost. Such provision is different from that of the electrodes 9. Note that, as shown in FIG. 15B, the plane perpendicular to the longitudinal direction of the columns 19 is equivalent to one of the parallel boundary surfaces 23. As stated above, the pair of longitudinal electrodes 25 is provided on the same single surface, and therefore does not require two surfaces (parallel boundary surfaces 23) formed by removing a portion 18 from both the right and left sides of the optical fiber 1 as shown in FIG. 15B. For this reason, the portion 18 may be removed from the optical fiber 1 so that only one surface is formed where the longitudinal electrodes 25 are placed. These longitudinal electrodes 25 arranged as such can adjust an optical modulation function in the first functional part 7 structured by the columns 19 made of a Pockels crystal.

Voltage is applied to one electrode 25 by a signal source 10, which is placed externally to the capillary 12. The other electrode 25 is connected to a ground 11. Such structure is the same as that of the optical device according to the sixth embodiment. Therefore, further description is omitted herein.

(Ninth Embodiment)

Figure 16A:
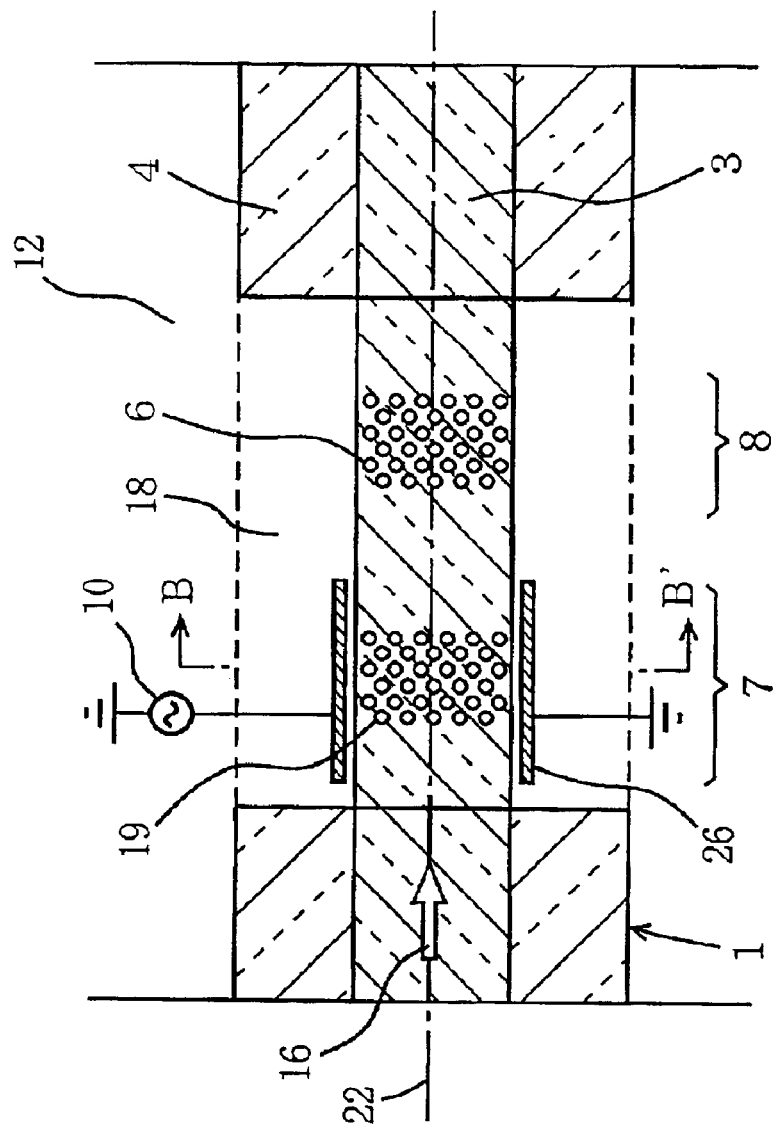
FIGS. 16A and 16B are schematic diagrams each showing the structure of an optical device according to a ninth embodiment of the present invention.
Figure 16B:
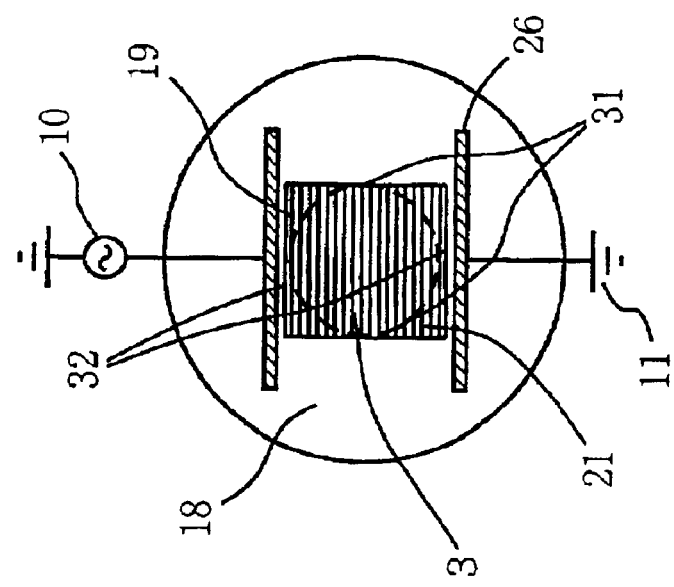

Described below is a ninth embodiment of the present invention with reference to the drawings. FIG. 16A is a schematic side view of an optical device according to the ninth embodiment of the present invention. FIG. 16B is a schematic view of a section of the optical device of FIG. 16A through a line B–B' perpendicular to an optical axis 2.

As shown in FIGS. 16A and 16B, the optical device is similar in structure to that according to sixth embodiment shown in FIGS. 13A and 13B, except that further portions are removed from a clad 4, and a pair of opposed electrodes 26 is different in place from the pair of electrodes 9.

First, as shown in FIG. 16B, an optical fiber 1 includes first and second functional parts 7 and 8, and a part 18 is removed from the clad 4 for a predetermined length on the left, right, upper, and lower sides of the optical fiber 1. Each section exposed after removal almost touches on the core 3. The sections on the upper and lower sides are in rectangular shape and parallel to each other with the core 3 placed therebetween, and hereinafter called first parallel boundary surfaces 32. The sections on the left and right sides are also in rectangular shape and parallel to each other with the core 3 placed therebetween, and hereinafter called second parallel boundary surfaces 31. Therefore, as shown in FIG. 16A, the optical fiber 1 is so shaped, in a predetermined section, as to have a remaining clad part 21 shaped in quadratic prism surrounding the core 3 and having a longitudinal axis equal to an optical axis 22, and the first and second parallel boundary surfaces 31 and 32 are exposed. With such formation, columns 19 and holes 6 are easily formed, and the opposed electrodes 26 are placed on the surfaces different from those in the sixth embodiment.

The opposed electrodes 26 are so provided as to apply an electric field perpendicularly to a longitudinal direction of a plurality of columns 19 made of a Pockels crystal forming the first functional part 7 and also perpendicularly to the optical axis 22 of the optical fiber 1. To do this, the opposed electrodes 26 are characterized by being placed parallel to each other with respect to the optical axis 22 and also parallel to the longitudinal direction of the columns 19. As shown in FIGS. 16A and 16B, the electrodes 26 are provided on planes parallel to the longitudinal direction of the columns 19 and the optical axis 22, that is, the first parallel boundary surfaces 32, one electrode being placed above the uppermost columns, and the other below the lowermost. Such provision is different from that of the electrodes 9. These opposed electrodes 26 arranged as such can adjust an optical modulation function in the first functional part 7 structured by the columns 19 made of a Pockels crystal.

Voltage is applied to one electrode 26 by a signal source 10, which is placed externally to the capillary 12. The other electrode 26 is connected to a ground 11. Such structure is the same as that of the optical device according to the sixth embodiment. Therefore, further description is omitted herein.

(Tenth Embodiment)

Figures 17A, 17B:
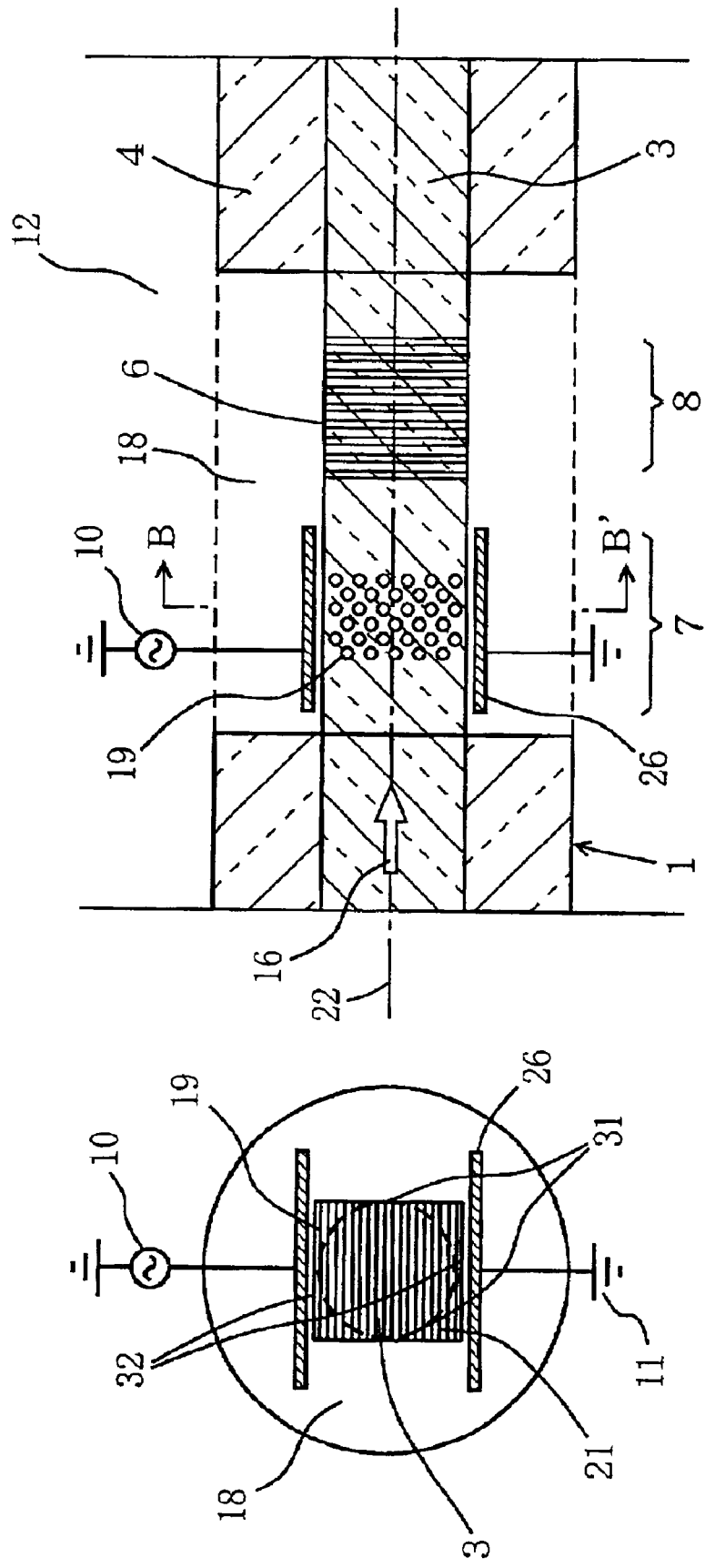
FIGS. 17A and 17B are schematic diagrams each showing the structure of an optical device according to a tenth embodiment of the present invention.

Described below is a tenth embodiment of the present invention with reference to the drawings. FIG. 17A is a schematic side view of an optical device according to the tenth embodiment of the present invention. FIG. 17B is a schematic view of a section of the optical device of FIG. 17A through a line B–B' perpendicular to an optical axis 2.

As shown in FIG. 17A, the optical device is similar in structure to that according to ninth embodiment shown in FIG. 16A, except that the longitudinal direction of holes 6 is different from that of the sixth embodiment. That is, the optical device according to the present embodiment is characterized in that the longitudinal direction of a plurality of columns 10 forming a first functional part 7 provided in the optical fiber 1 is perpendicular to that of a plurality of holes 6 forming a second functional part 8. More specifically, as shown in FIG. 17B, the longitudinal direction of columns 19 are extending toward a horizontal direction of the drawing, while the longitudinal direction of holes 6 are extending toward a vertical direction thereof.

As such, the longitudinal direction of the columns 19 forming the first functional part 7 and the longitudinal direction of the holes 6 forming the second functional part 8 are made perpendicularly to each other. Thus, the optical modulation function of each functional part can be adjusted.

Note that, in the sixth to tenth embodiments, description is made to the case where two functional parts are provided. This is not restrictive, and the description can also be applied to a case where three functional parts are provided as in the optical device according to the fourth embodiment.

(Eleventh Embodiment)

An optical device according to an eleventh embodiment of the present invention is characterized in that electrodes for applying an electric field are so provided that the direction of the electric field forms an angle θ with the longitudinal direction of columns forming a first functional part. With this, the optical modulation function of the first functional part can be adjusted.

Figure 18A:
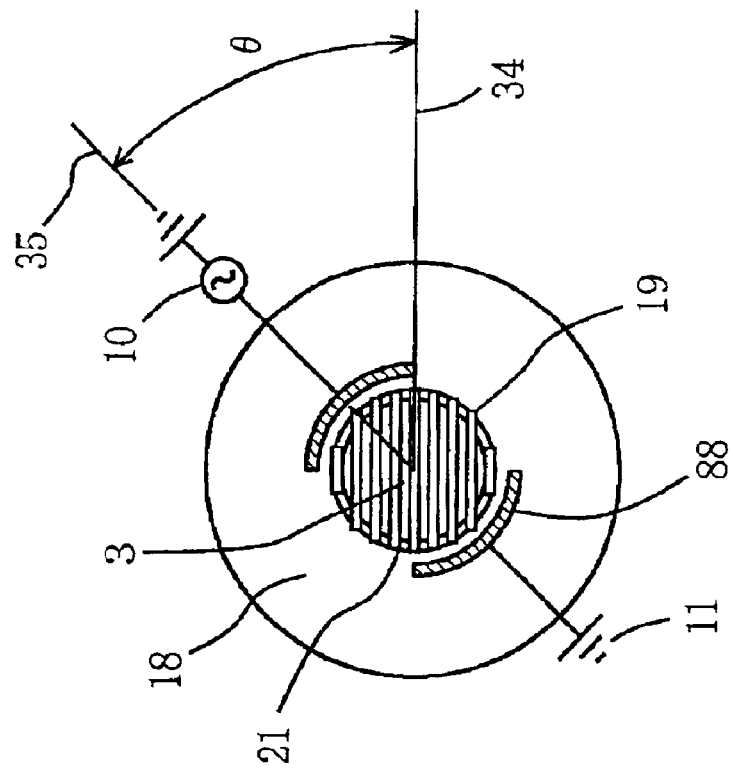
FIGS. 18A and 18B are schematic section views of an example arrangement of electrodes in an optical device according to an eleventh embodiment of the present invention.

Compared with the optical device according to the ninth or tenth embodiment, the present optical device is different in that, as can be seen from FIG. 18A showing a section of the optical fiber 1, a pair of parallel electrodes 87 for applying an electric field is so provided as that the direction of the electric field forms the angle θ with the longitudinal direction of columns 19 forming a first functional part 7.

Figure 18B:
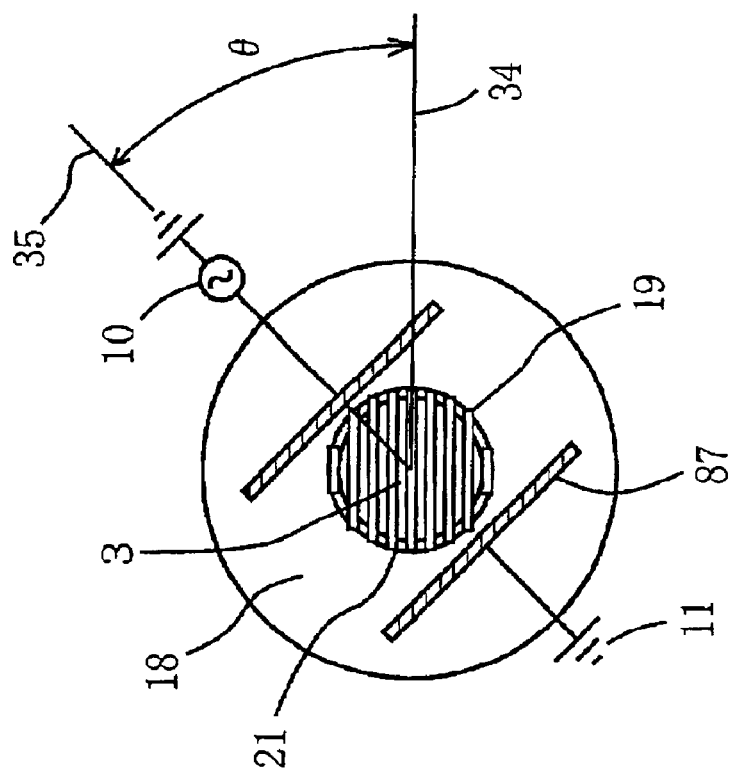

More specifically, a clad 4 is almost entirely removed from the optical fiber 1 with a core 3 left unremoved. The parallel electrodes 87 are provided on positions directly or almost touching the core 3 and form the angle θ with the longitudinal direction of the columns 19. Alternatively, instead of the flat parallel electrodes 87 as shown in FIG. 18A, curved electrodes 88 that are curved nearly along a curved surface of the core 3, as shown in FIG. 18B, may be used for the optical device 1. In this case, the curved electrodes 88 are so provided as that the longitudinal direction of the columns 19 forms the angle θ with a direction 35 of the normal to the curve at the center.

(Twelfth Embodiment)

An optical device according to a twelfth embodiment of the present invention is characterized in that a first functional part of the optical fiber is structured by a plurality of columns made of a crystal having a Faraday effect and penetrating through a core. Since the columns of the first functional part are made as such, it is possible to adjust a Faraday rotation angle of the first functional part. Therefore, the present optical device functions as an optical isolator.

FIG. 19 is a horizontal section view showing the optical device according to the twelfth embodiment of the present invention. As shown in FIG. 19, the present optical device is different from the optical device functioning as an optical modulator according to the sixth embodiment in that a first functional part 7 of an optical fiber 1 is structured by a plurality of columns 91 made of a crystal having the Faraday effect and penetrating through the core 3. More specifically, such crystal having the Faraday effect includes, by way of example only, a garnet crystal and a rare-earth garnet crystal (YIG, for example). Furthermore, a magnet 95 is provided on a surface made by processing the outer surface of a capillary 12 or on the outer surface itself. The capillary 12 is to apply a magnetic field 94 to the crystal having the Faraday effect. As the magnet 95, any type of magnet can be used including a permanent magnet such as a rare-earth magnet or an electromagnet, as long as the magnet can induce a magnetic field having enough intensity to rotate the plane of polarization of light. Since the Faraday rotation angle does not depend on the direction of the magnetic field, the direction of applying the magnetic field 94 can be selected variously.

<Embodiment for Optical Sensors>

Specifically described next are the structure and operation of optical sensors such as an optical voltage sensor, an optical current sensor, and an optical magnetic field sensor.

(Thirteenth Embodiment)

Described first is an optical voltage sensor according to a thirteenth embodiment of the present invention.

Figure 20:
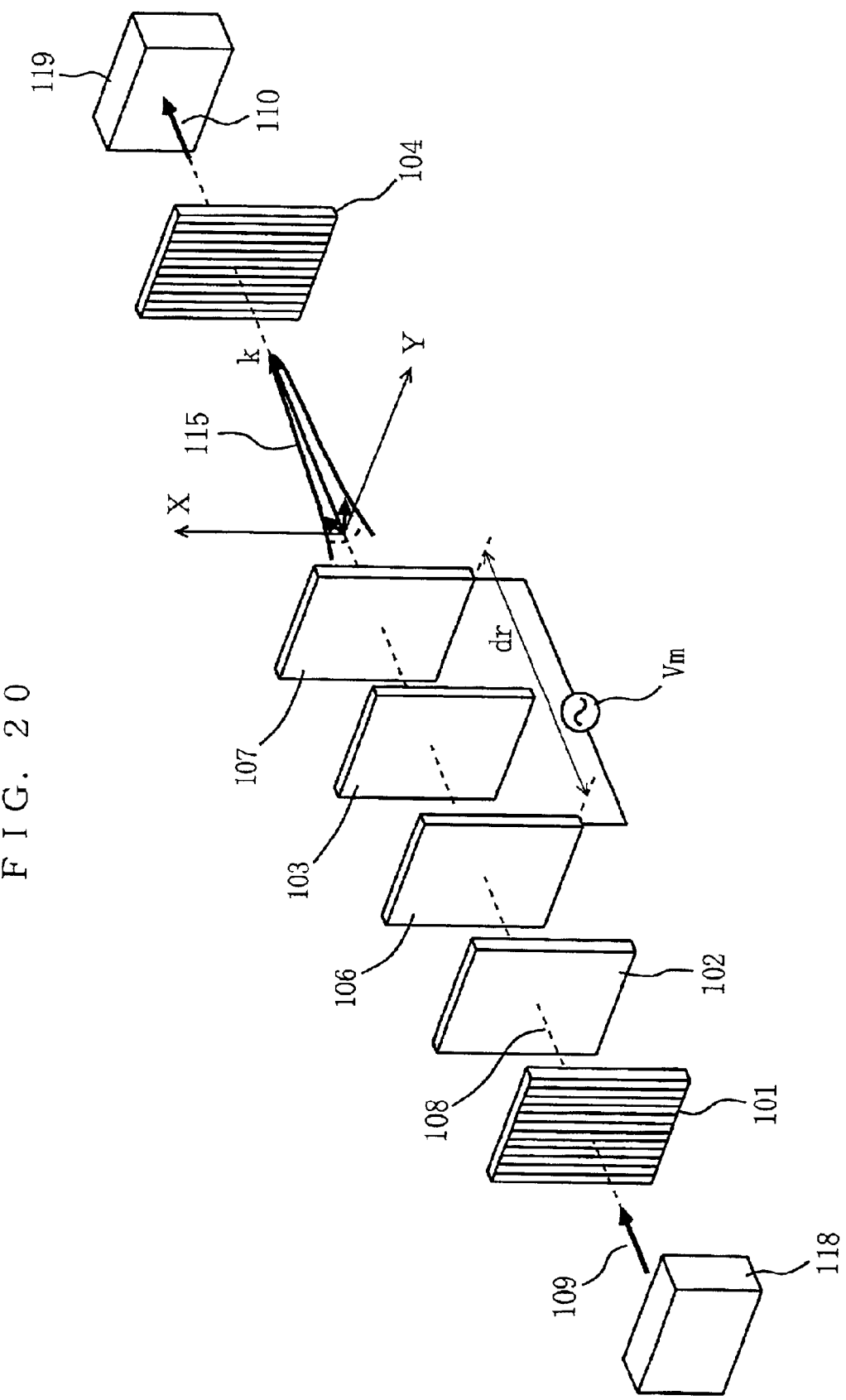
FIG. 20 is a schematic diagram showing the structure of an optical voltage sensor according to a thirteenth embodiment of the present invention.

As shown in FIG. 20, the optical voltage sensor according to the present embodiment includes a sensor part, a light-emitting part 118, and a light-receiving part 119. The sensor part includes a polarizer 101, a λ/4 plate 102, a first conductive reflective film 106, an electro-optic crystal 103, a second conductive reflective film 107, and an analyzer 104.

The light-emitting part 118 includes an E/O circuit having an light-emitting device typified by a LED as a light source, and an incidence side optical system having an optical fiber, for example. A light beam emitted from the light source is inputted through the incidence side optical system to the sensor part.

In the sensor part, the polarizer 101, the λ/4 plate 102, the first conductive reflective film 106, the electro-optic crystal 103, the second conductive reflective film 107, and the analyzer 104 are arranged in this order on an optical path of the light beam. The light beam is modulated by these optical devices with a voltage Vm to be measured, and then outputted. In the present embodiment, the electro-optic crystal 103 is implemented by a LiNbO$_3$ crystal through which light propagates in the Z axis direction (hereinafter, Z-axis-propagation LiNbO$_3$ crystal), and so placed as that the Z axis (C axis) is aligned with an optical axis 108. The first and second conductive reflective films 106 and 107 are placed with their reflection planes perpendicularly to the optical axis 108 and with their interval dr being an integral multiple of half of the wavelength of an incident light 109 supplied to the sensor part. As shown in FIG. 20, assume herein that the coordinate system is so structured that the Z axis is along the optical axis 108, and the X and Y axes are respectively along two directions perpendicular to each other on a plane perpendicular to the optical axis 108. Under this assumption, consider a case where an electric field is applied to the Z-axis-propagation LiNbO$_3$ crystal in the Z-axis direction, that is, longitudinal modulation. In this case, electro-optic coefficients related to the modulation index are γ33 and γ31. Also in this case, consider a setting direction, which is a principal-axis direction of an ellipse indicative of a refractive index to the light beam inputted to the electro-optic crystal or the λ/4 plate. If the setting direction for the Z-axis-propagation LiNbO$_3$ crystal is the X-axis direction, the setting direction for the polarizer 101 and the analyzer 104 is a direction forming an angle of ±45° with the X axis, and the setting direction for the λ/4 plate 102 is the X- or Y-axis direction.

The light-receiving part 119 is structured by an output side optical system including an optical fiber, and an O/E circuit including an optical-electrical conversion device for converting an optical signal into an electrical signal. The light beam emitted from the sensor part goes through the output side optical system to the optical-electrical conversion device in the O/E circuit for conversion to an electrical signal. This electrical signal is responsive to the polarization state of the light beam after passing through the LiNbO$_3$ crystal, and varied in polarization state according to the voltage Vm. A light-receiving side signal processing circuit (not shown) is connected to the light-receiving part 119, calculating the modulation index based on the above electrical signal to obtain the value of the voltage to be measured.

The structure of the above structured optical voltage sensor is specifically shown in FIG. 24 or 30, for example, which will be referred to later.

In the optical voltage sensor of the present invention, as stated above, the interval dr between the first and second conductive reflective film 106 and 107 in the sensor part is set to have an integral multiple of half of the wavelength of the incident light 109 supplied thereto. With such setting, the first and second conductive reflective films 106 and 107 forms an etalon resonator (also called Fabry-Perot resonator). Thus, light propagating in the optical axis 108 direction perpendicular to the first and second conductive reflective films 106 and 107 becomes dominant and, as shown in FIG. 20, beam angle distribution 115 becomes steep. In other words, even if the center direction and distribution of the incident light 109 are varied due to tolerances among the optics or structural variations, the etalon resonator formed by the first and second conductive reflective films 106 and 107 makes the light passing through the electro-optic crystal 103 perpendicular, in the center direction, to the reflection plane (parallel to the optical axis 108) and constant in distribution and also wavelength.

As such, according to the present embodiment, the etalon resonator formed by the first and second conductive reflective films 106 and 107 makes the light passing through the electro-optic crystal 103 constant in the center direction and distribution. That is, the incident light beams supplied to and coming out from the electro-optic crystal 103 become stable in beam state. As a result, even if the incident light 109 supplied to the sensor part is varied due to tolerances among the optics and other factors, the modulation index, that is, the output from the optical voltage sensor according to the present invention, becomes stable. If the center direction of the incident light 109 supplied to the sensor part is varied, the light beam supplied to the electro-optic crystal 103 becomes varied in intensity, but not in distribution. Therefore, such variation in the center direction of the incident light 109 does not have substantial effects on variations in modulation index indicative of a ratio between AC components and DC components in the amount of light received by the light-receiving part 119.

Figure 35:
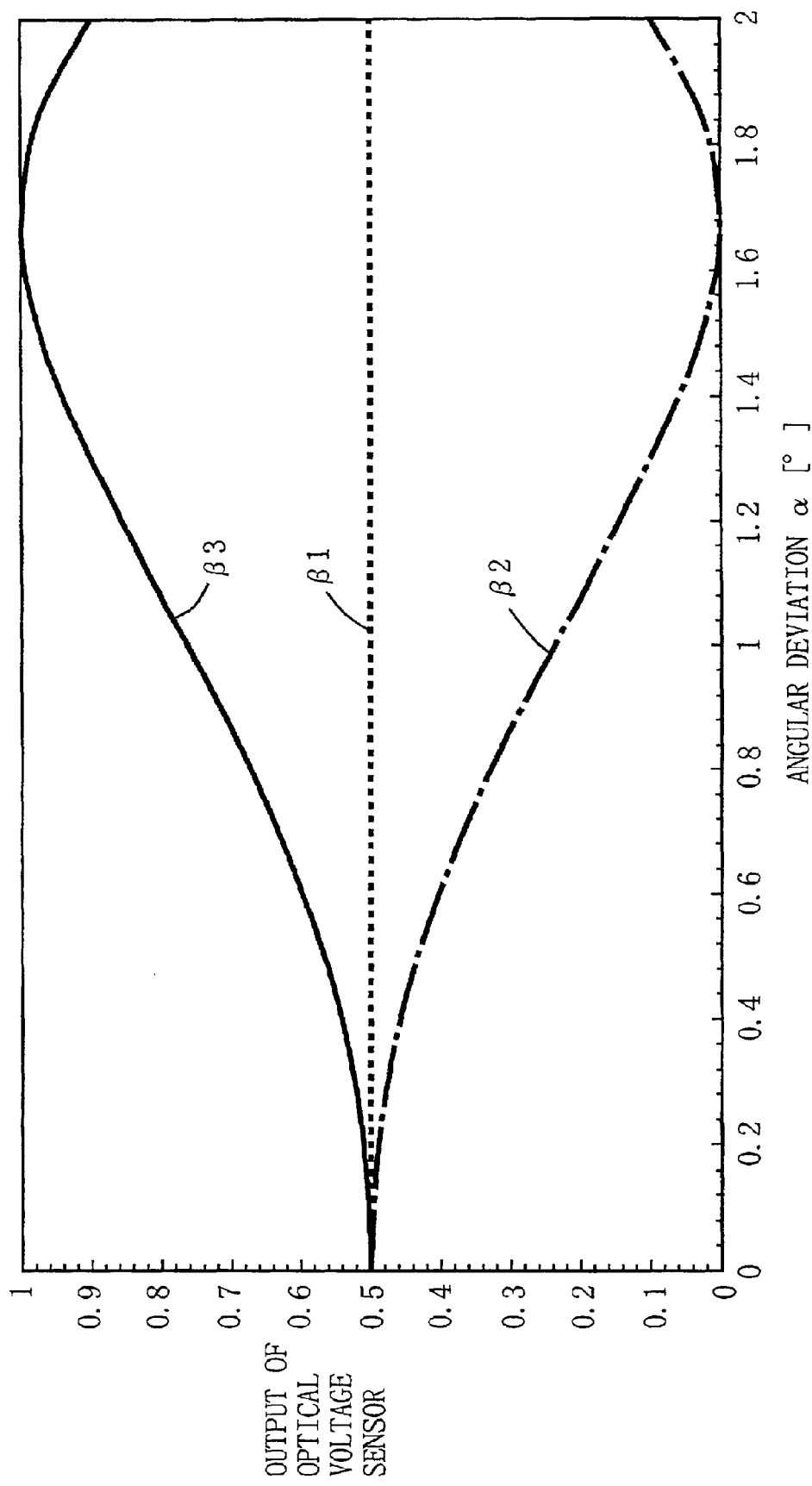
FIG. 35 is a diagram showing characteristics observed in a relation between outputs of the conventional optical voltage sensor and angular deviation of incident light to an electro-optic crystal.

The beam angle distribution 115 is dependent on the reflectance between the first and second conductive reflective films 106 and 107. The higher the reflectance, the smaller the beam angle distribution 115. Therefore, the reflectance is preferably not less than 0.6. As such, as the beam angle distribution 115 becomes smaller, such characteristic as shown in FIG. 35 can be observed with respect to axial deviation due to birefringence.

In the present embodiment, longitudinal modulation is adopted, where an electric field is applied to the Z-axis-propagation $LiNbO_3$ crystal in the Z-axis direction, that is, in the optical axis 108 direction. Alternatively, transverse modulation may be adopted, where an electric field is applied thereto in X-axis direction. The structure of a transverse-modulation-type optical voltage sensor will be exemplarily described later with reference to FIG. 25.

Figure 21:
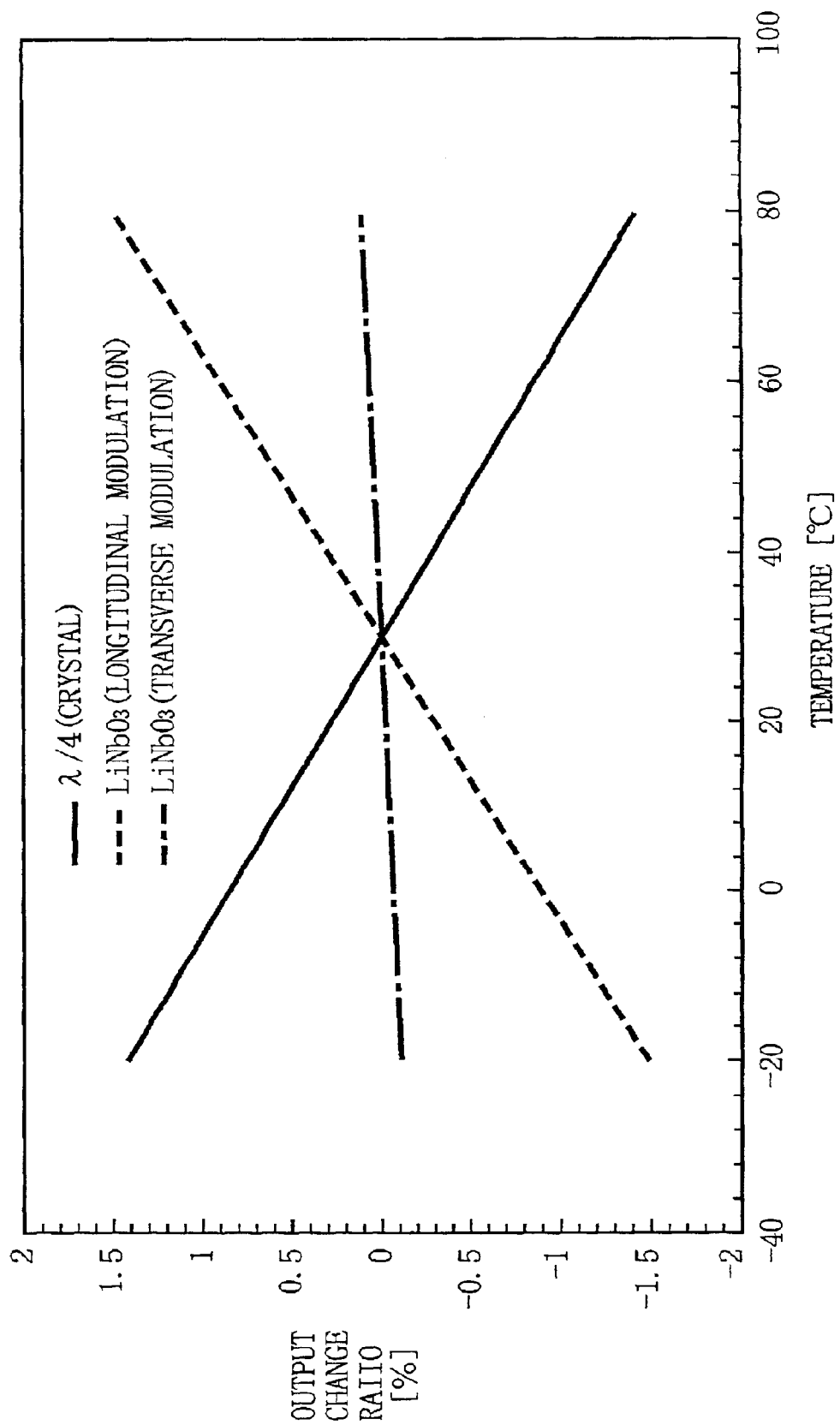
FIG. 21 is a diagram showing temperature dependency of output changes of an optical voltage sensor due to temperature dependency of a crystal λ/4 plate, output changes of a vertical-modulation optical voltage sensor due to temperature dependency of an electro-optic $LiNbO_3$ crystal, and output changes of a lateral-modulation optical voltage sensor due to temperature dependency of the electro-optic $LiNbO_3$ crystal.

If transverse modulation is adopted, the electro-optic coefficient related to the modulation index of the optical voltage sensor is $\gamma22$. Also in this case, if the setting direction for the Z-axis-propagation $LiNbO_3$ crystal is the X-axis direction, the one for the polarizer 101 and the analyzer 104 is the X- or Y-axis direction, and one for the $\lambda/4$ plate 102 is a direction forming an angle of $\pm45°$ with the X axis. The temperature dependency for the electro-optic coefficient $\gamma22$ is relatively small. Therefore, in transverse modulation, influences by the temperature dependency of the $LiNbO_3$ crystal on changes of outputs from the optical voltage sensor (modulation index) due to temperature (hereinafter, output change due to temperature) is almost negligible, as shown in FIG. 21 by a dotted line. In FIG. 21, the vertical axis represents relative output change with reference to outputs from the optical voltage sensor (modulation index) at 25° C. However, the temperature dependency due to birefringence of the $\lambda/4$ plate 102 does cause the output of the transverse-modulation optical voltage sensor, that is, the modulation index, to have the temperature dependency. Nevertheless, as stated above, an etalon resonator is formed within an area surrounding the $LiNbO_3$ crystal 103 to stabilize the state of the light beam and, therefore the temperature dependency of the outputs from the optical voltage sensor becomes stabilized even if the beam state of the incident light 109 to the sensor part is varied due to tolerances among optics. Thus, if such transverse modulation is adopted, the optical voltage sensor can also be used as a temperature sensor.

If longitudinal modulation is adopted as in the present embodiment, the electro-optic coefficients related to the output from the optical voltage sensor, that is, the modulation index, are $\gamma33$ and $\gamma31$, as described above. If the setting direction for the Z-axis-propagation $LiNbO_3$ crystal is the X-axis direction, the one for the polarizer 101 and the analyzer 104 is a direction forming an angle of $\pm45°$ with the X axis, and the one for the $\lambda/4$ plate 102 is the X- or Y-axis direction, as described above. In transverse modulation, with the temperature dependency of the electro-optic coefficients $\gamma33$ and $\gamma31$, output changes by temperature in the optical voltage sensor due to the temperature dependency of the $LiNbO_3$ crystal 103 are as shown in FIG. 21 by a dotted line. That is, as the temperature rises, the output from the optical voltage sensor is decreased due to the temperature dependency of the $LiNbO_3$ crystal. The output change by temperature in the optical voltage sensor is also caused by the temperature dependency of birefringence of the $\lambda/4$ plate 102. Such output change is hereinafter referred to as "output change due to the temperature dependency of the $\lambda/4$ plate 102. Meanwhile, an ellipse indicative of a refractive index (hereinafter, "refractive-index ellipse") of the $\lambda/4$ plate 102 with respect to the incident light thereto becomes closer to a perfect circle as the temperature rises. On the other hand, the refractive-index ellipse of the $LiNbO_3$ crystal 103 with respect to the incident light thereto becomes more flat. Therefore, if a fast-axis direction (a direction to which the phase advances) of the refractive-index ellipse of the $\lambda/4$ plate 102 matches a fast-axis direction of the refractive-index ellipse of the $LiNbO_3$ crystal 103, the temperature dependencies of sensor outputs due to the temperature dependency of the $\lambda/4$ plate 102 and that of the $LiNbO_3$ crystal 103 are cancelled out each other (refer to FIG. 21, the dotted line and the straight line). Consequently, the output change in the optical voltage sensor due to temperature is reduced. In other words, when the setting direction of the $LiNbO_3$ crystal 103 is in the X-axis direction, the setting direction of the $\lambda/4$ plate 102 is also set in the X-axis direction. With this, the temperature dependency of the output from the optical voltage sensor can be improved.

(Fourteenth Embodiment)

Described next is an optical voltage sensor according to a fourteenth embodiment of the present invention.

The optical voltage sensor according the present embodiment is basically similar in structure to that according to the thirteenth embodiment as shown in FIG. 20. Therefore, in the present embodiment, each component similar to that in the thirteenth embodiment is provided the same reference numeral, and not described herein. Also, the overall operation of the optical voltage sensor in the present embodiment is substantially similar to that in the thirteenth embodiment, and therefore not described in detail herein.

Figure 22:
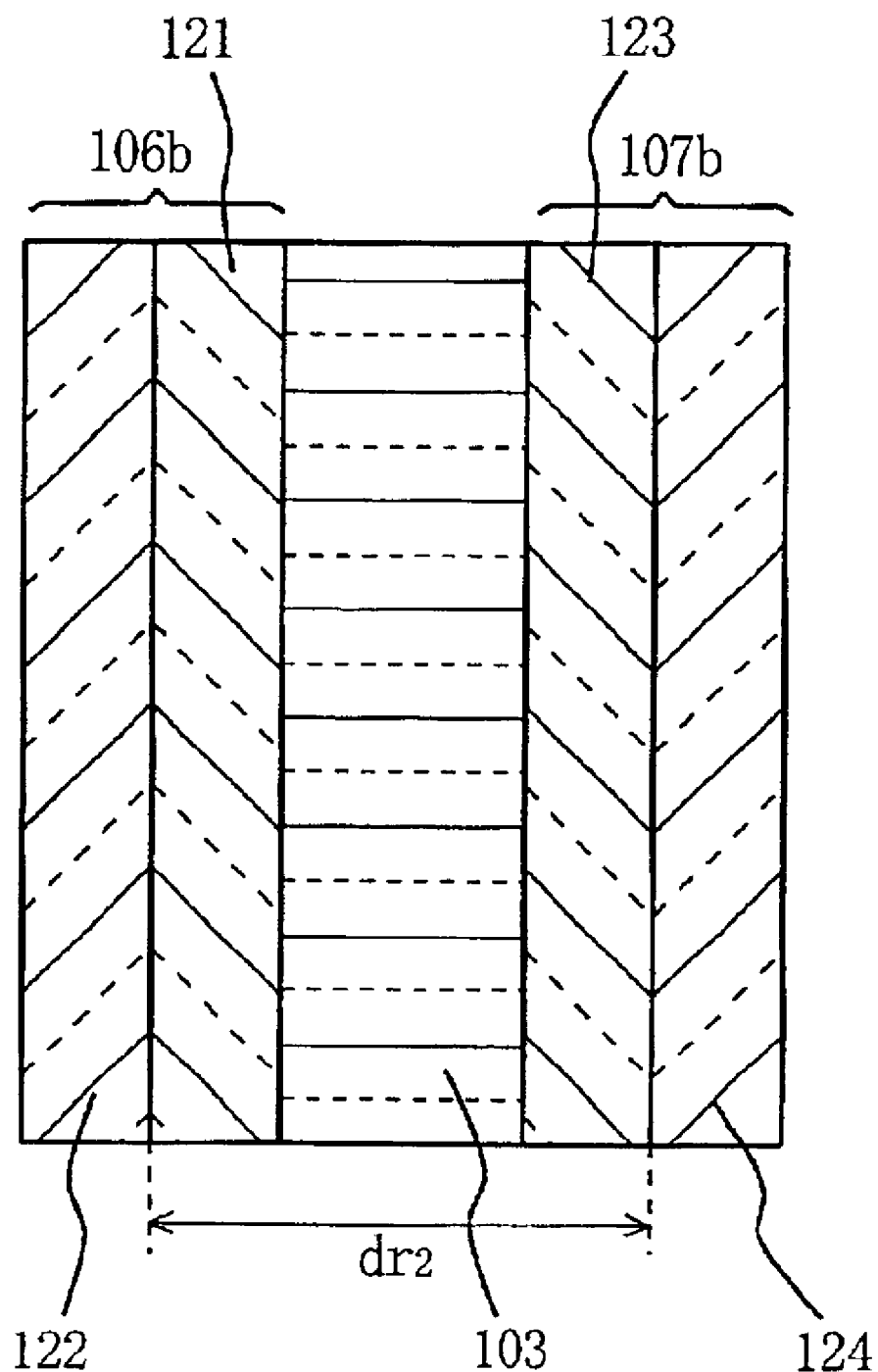
FIG. 22 is a diagram showing a conductive reflective film in an optical voltage sensor according to a fourteenth embodiment of the present embodiment.

In the present embodiment, as shown in FIG. 22, the conductive reflective film for composing an etalon resonator in the sensor part is realized by a multilayered film composed of a reflective film and a transparent conductive film. That is, The first conductive reflective film 106 in the above thirteenth embodiment is realized by a multilayered film composed of a first transparent conductive film 121 and a first reflective film 122. This multilayered film achieves a first conductive reflective film 106b. The second conductive reflective film 107 in the thirteenth embodiment is realized by another multilayered film composed of a second transparent conductive film 123 and a second reflective film 124, and denoted herein by a reference numeral 107b. Therefore, in the present embodiment, the conductive reflective films 106b and 107b are so placed that an interval dr2 between the first reflective film 122 and the second reflective film 124 is an integral multiple of half the wavelength of the incident light 109 to the sensor part. As the first and second transparent conductive films 121 and 123, ITO (Indium-Tin-Oxide) films can be exemplarily used.

Shown in FIG. 22 is an example case where the first transparent conductive film 121 composing the first conductive reflective film 106b and the second transparent conductive film 123 composing the second conductive reflective film 107b are both placed on LiNbO3 crystal (electro-optic crystal) 103 side. This is not restrictive, and the order of the first transparent conductive film 121 and the first reflective film 122 and the order of the second transparent conductive film 123 and the second reflective film 124 may be arbitrary, provided that the interval between the first and second reflective films 122 and 124 is an integer multiple of half the wavelength of the incident light 109 to the sensor part.

According to the present embodiment, the transparent conductive film and the reflective film forms a multilayered film. The first and second conductive reflective films 106b and 107b form an etalon resonator, similarly to the thirteenth embodiment. Thus, the center direction and distribution of the light passing through the electro-optic crystal 103 become constant. As a result, even if the beam state of the incident light 109 supplied to the sensor part is varied due to tolerances among the optics and other factors, the modulation index, that is, the output from the optical voltage sensor according to the present invention, becomes stable. Furthermore, according to the present embodiment, the first and second conductive reflective films 106b and 107b are realized as multilayered films each composed of the transparent conductive film and the reflective film. Therefore, the first and second conductive reflective films 106b and 107b can be separately controlled in conductivity and reflectivity when formed. Therefore, an conductive reflective film having large reflectivity can be easily formed, compared with a case where the conductive reflective film is realized by a single-layered film. Thus, the beam state can be more stabilized.

(Fifteenth Embodiment)

Described next is an optical voltage sensor according to a fifteenth embodiment of the present invention.

The optical voltage sensor according the present embodiment is basically similar in structure to that according to the thirteenth embodiment as shown in FIG. 20. Therefore, in the present embodiment, each component similar to that in the thirteenth embodiment is provided with the same reference numeral, and not described herein. Also, the overall operation of the optical voltage sensor in the present embodiment is substantially similar to that in the thirteenth embodiment, and therefore not described in detail herein.

Figure 23:
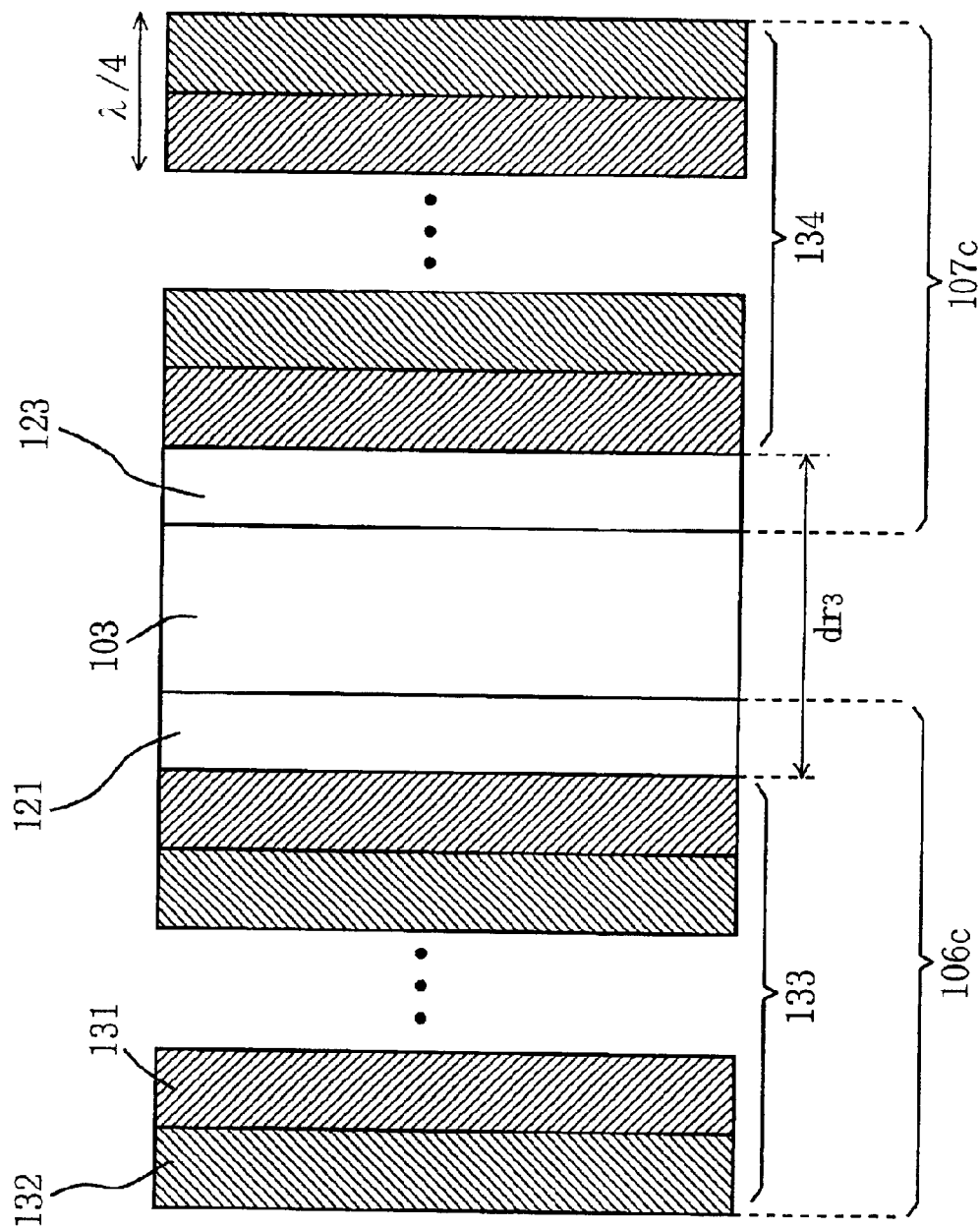
FIG. 23 is a diagram showing a multilayered conductive reflective film formed by alternately laminating a low-refractive-index layer and a high-refractive-index layer.

In the present embodiment, two conductive reflective films are provided in the sensor part with the LiNbO$_3$ crystal film (electro-optic crystal 103) placed therebetween. These two conductive reflective films are each realized by a multilayered film as shown in FIG. 23. That is, the first conductive reflective film 106 in the above thirteenth embodiment is realized by, in the present embodiment, the first transparent conductive film 121 and a first multilayered film 133 functioning as a reflective film, together forming a first conductive reflective film 106c. Also, the second conductive reflective film 107 in the above thirteenth embodiment is realized by, in the present embodiment, the second transparent conductive film 123 and a second multilayered film 134 functioning as a reflective film, together forming a second conductive reflective film 107c. Each of the first and second multilayered films 133 and 134 is a film formed by alternately multilayering two types of layers, that is, a high-refractive-index layer 131 and a low-refractive-index layer 132 in the optical axis 108 direction. These multilayered films 133 and 134 each have a periodic structure in which the refractive index is periodically varied in the optical axis 108 direction. In other words, they are one-dimensional photonic crystals. Also in the present embodiment, the first transparent conductive film 121 is placed between the first multilayered film 133 and the LiNbO$_3$ crystal film 103, while the second transparent conductive film 123 is between the second multilayered film 134 and the LiNbO$_3$ crystal film 103. Among the layers forming the first multilayered film 133, a layer attached to the first transparent conductive film 121, that is, closest to the LiNbO$_3$ crystal film 103, is hereinafter referred to as "first adjacent layer". On the other hand, among the layers forming the second multilayered film 134, a layer attached to the second transparent conductive film 123, that is, closest to the LiNbO$_3$ crystal film 103, is hereinafter referred to as "second adjacent layer". Here, the first and second adjacent layers are the same in type, that is, have the same refractive index. In the example shown in FIG. 23, the first and second adjacent layers are both the high-refractive-index layers 131. As these first and second transparent conductive films 121 and 123, ITO (Indium-Tin-Oxide) films can be used, for example. For the high-refractive-index layer 131, Ta$_2$O$_5$, TiO$_2$, Ge, Si and other materials having a refractive index of approximately 3.4 to 3.6, for example) can be used. For the low-refractive-index layer 132, SiO$_2$ and other materials having a refractive index of approximately 1.46 or air (refractive index of 1) can be used.

In the above first conductive reflective films 106c and 107c, the layers are so arranged as that the sum of a thickness of the high-refractive-index layer 131 and a thickness of the low-refractive-index layer 132 becomes one-quarter the wavelength of the incident light 109 supplied to the sensor part. Also, the first and second multilayered films 133 and 134 are so arranged as that an interval between the first and second adjacent layers is an integral multiple of half the wavelength of the incident light 109 supplied to the sensor part. In other word, an interval dr3 between a surface attached to the first transparent conductive film 121 of the first multilayered film 133 and a surface attached to the second transparent conductive film 123 of the second multilayered film 134 becomes as such.

The above structured and arranged first and second conductive reflective films 106c and 107c each function as a so-called PBG (Photonic Band Gap) reflector with respect to the incident light 109. Within an area between PBG reflectors, strong resonance is established. In other words, greater effects that are similar in quality to those produced by the etalon resonator in the thirteenth embodiment can be obtained. Thus, the center direction and distribution of light passing through the electro-optic crystal 103 become constant. As a result, even if the beam state of the incident light 109 supplied to the sensor part is varied due to tolerances among the optics and other factors, the modulation index, that is, the output from the optical voltage sensor according to the present embodiment, becomes stable.

In the above structure, the first and second conductive reflective films 106c and 107c are so formed that the sum of the thickness of the high-refractive-index layer 131 and the thickness of the low-refractive-index layer 132 becomes one-quarter the wavelength of the incident light 109 supplied to the sensor part. To increase the above effects, each thickness of the first and second conductive reflective films 106c and 107c is preferably one-eighth the wavelength thereof.

The application of PGB reflectors has been suggested in many documents, such as U.S. Pat. No. 5,365,541.

(Sixteenth Embodiment)

Described next is an optical voltage sensor according to a sixteenth embodiment of the present invention The optical voltage sensor according the present embodiment is basically similar in structure to that according to the thirteenth embodiment as shown in FIG. 20. Therefore, in the present embodiment, each component similar to that in the thirteenth embodiment is provided the same reference numeral, and not described herein. Also, the overall operation of the optical voltage sensor in the present embodiment is substantially similar to that in the thirteenth embodiment, and therefore not described in detail herein.

Figure 24:
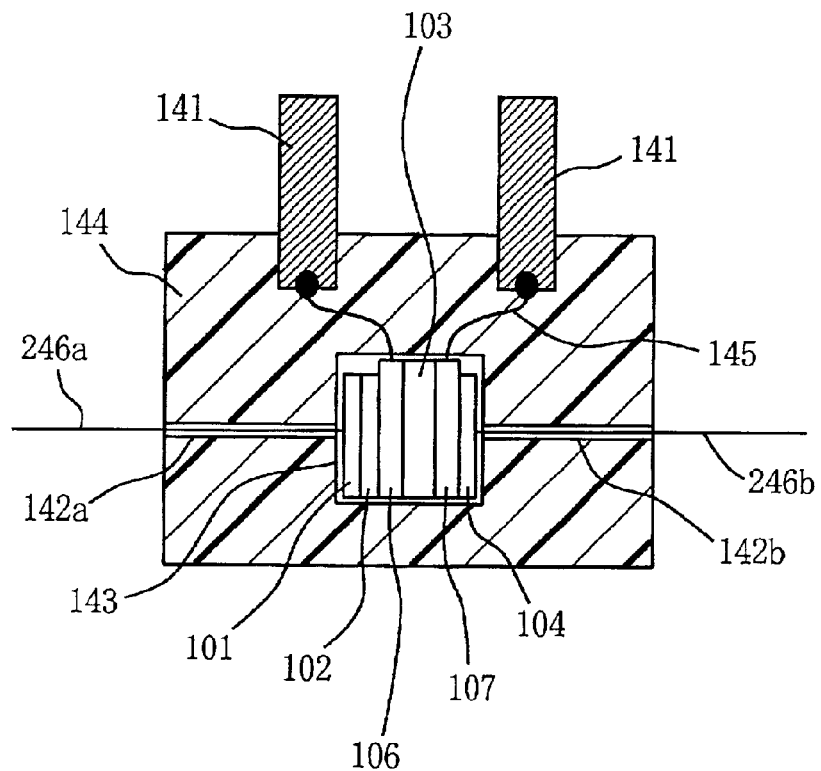
FIG. 24 is a front perspective view of the main structure of an optical voltage sensor according to a sixteenth embodiment of the present invention.

FIG. 24 is a front perspective view of the optical voltage sensor according to the present embodiment, specifically showing the main part thereof. The optical voltage sensor includes a substrate 144. Provided on the center part of the substrate 144 is a component guide 143 for closely attaching and sequentially positioning on a predetermined optical axis 108 the polarizer 101, the λ/4 plate 102, the first conductive reflective film 106, the LiNbO$_3$ crystal film 103 as the electro-optic crystal, the second conductive reflective film 107, and the analyzer 104 that together compose the sensor part of the optical voltage sensor. The component guide 143 has four edges. Among them, two opposed edges are perpendicularly connected to optical fiber guides 142a and 142b, respectively, provided on the substrate 144. The optical fiber guide 142a guides an optical fiber 246a composing the incidence side optical system of the light-emitting part 118, optically coupling the optical fiber 246a to the polarizer 101 positioned by the component guide 143. The optical fiber guide 142b guides an optical fiber 246b composing the output side optical system of the light-receiving part 119, optically coupling the optical fiber 246b to the analyzer 104 positioned by the component guide 143. Also provided on the substrate 144 is a pair of electrodes 141, one electrically connected to the first conductive reflective film 106 positioned by the component guide 143, and the other to the second conductive reflective film 107 also positioned thereby. Such connection is made via lead wires 145. Therefore, once the voltage Vm to be measured is applied between these electrodes 141, the voltage Vm is also applied to the LiNbO$_3$ film 103 as the electro-optic crystal in the Z-axis direction (optical axis 108 direction).

As with the thirteenth embodiment, in the present embodiment, the interval dr between the first and second conductive reflective films 106 and 107 is set to be an integral multiple of half the wavelength of the incident light 109 supplied to the sensor part. Thus, an etalon resonator is formed therebetween. With this, light propagating in the optical axis 108 direction perpendicular to the first and second conductive reflective films 106 and 107 becomes dominant and the beam angle distribution 115 becomes steep. As a result, even if the beam state of the incident light 109 supplied to the sensor part is varied due to tolerances among the optics, the output from the present optical voltage sensor, that is, the modulation index, becomes stabilized. Furthermore, the directivity of the light passing through the sensor part can be improved.

Figure 33:
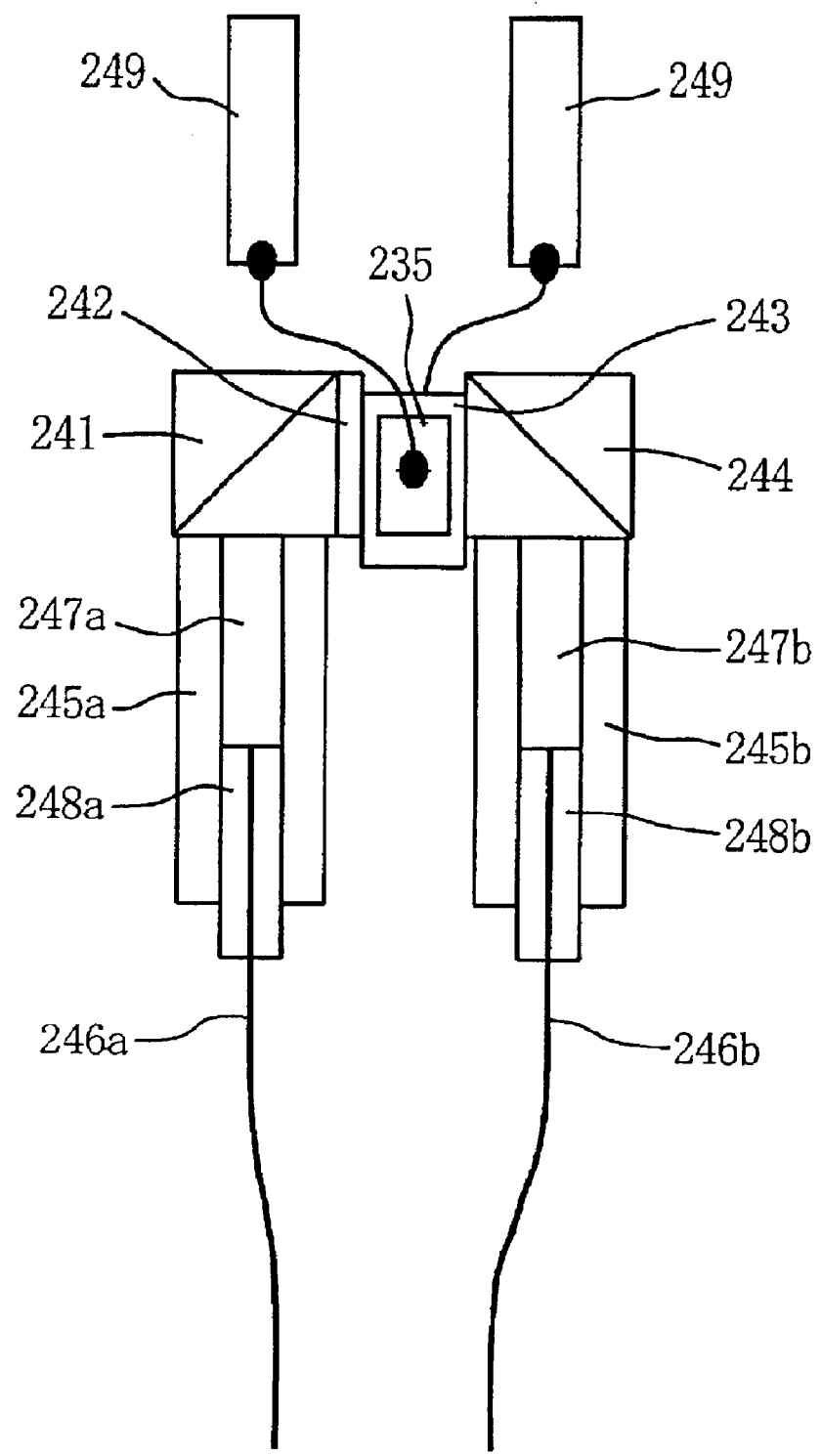
FIG. 33 is a front perspective view of a conventional optical voltage sensor.
Figure 34:
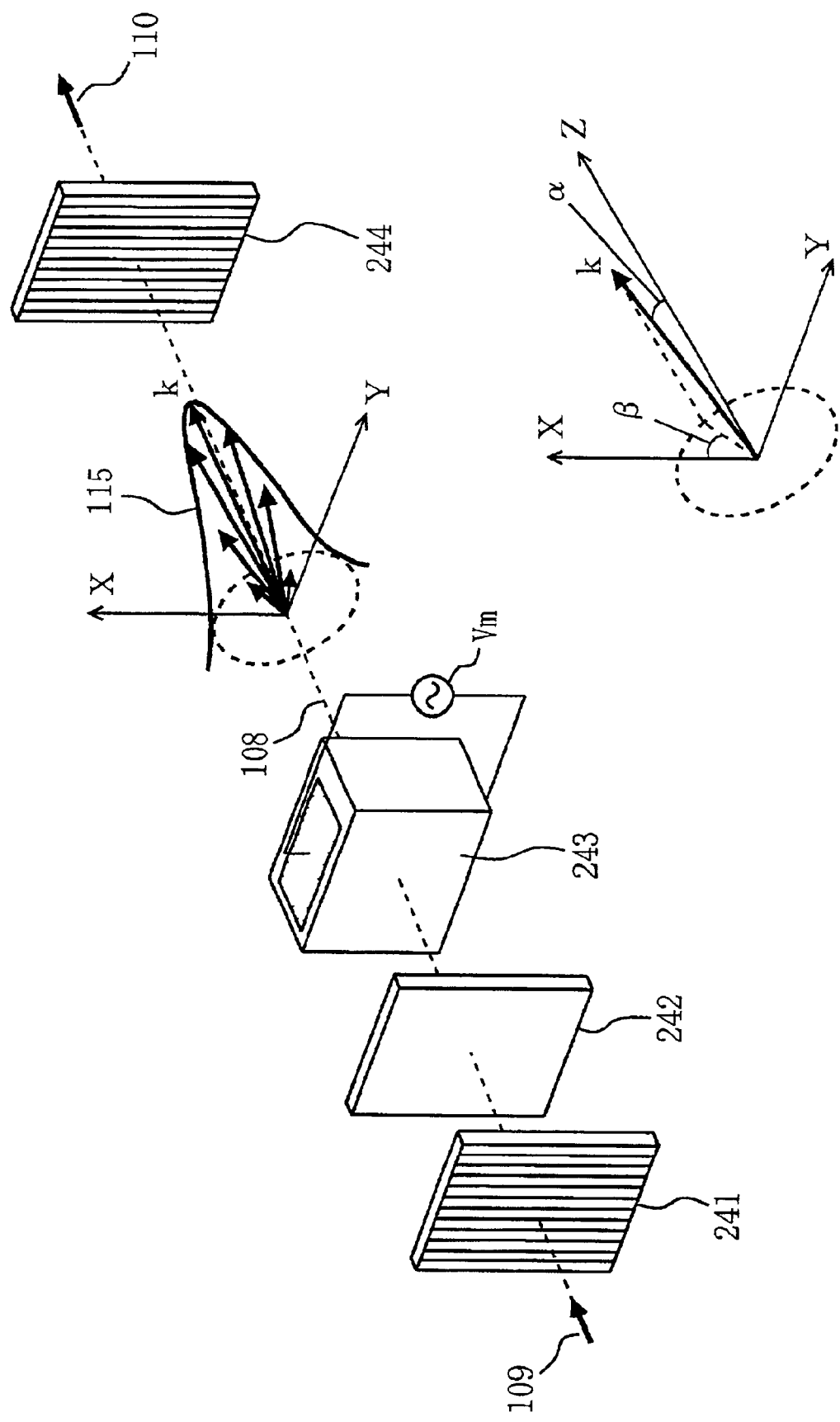
FIG. 34 is a diagram demonstrating the operational principle of the optical voltage sensor.

As described above, according to the present embodiment, an etalon resonator is formed in an area surrounding the LiNbO$_3$ crystal film 103 in the sensor part. Thus, the directivity of the light passing through the sensor part is improved, and axial deviation of the incident light beams to the LiNbO$_3$ crystal film 103 can be suppressed. Also, each optical component composing the sensor part is shaped like a sheet or film, and positioned by the component guide 143 to be closely attached to another. Therefore, the optical path in the sensor part can be shortened to approximately 2 to 3 mm, for example, compared with the conventional structure (refer to FIG. 33). In the present embodiment, in addition to the improved directivity and shortened optical path as stated above, the optical fiber 246a of the incidence side optical system is optically coupled directly to the polarizer 101 by the optical fiber guide 142a, and similarly, the optical fiber 246b of the output side optical system is to the analyzer 104 by the optical fiber guide 142b. In other words, with the improved directivity and shortened optical path as stated above, coupling losses in the optical fibers 246a and 246b on the polarizer 101 side and the analyzer 104 side, respectively, can be made within a negligible range for actual use without using a lens. As such, according to the present embodiment, the number of components and cost can be reduced.

(Seventeenth Embodiment)

Described next is an optical voltage sensor according to a seventeenth embodiment of the present invention.

The optical voltage sensor according to the present embodiment is of transverse-modulation type, in which an electric field is applied to the Z-axis-propagation LiNbO$_3$ of the electro-optic crystal in the X-axis direction (refer to FIG. 20 for the coordinate system). In this respect, the optical voltage sensor according to the present embodiment is different from those according to the thirteenth and sixteenth embodiment, which are of longitudinal-modulation type. In the present embodiment, the direction of applying an electric field to the LiNbO$_3$ crystal film is not the Z-axis direction (optical axis 108 direction) but the X-axis direction. Therefore, in the sensor part, the first and second reflective films 122 and 124 are used instead of the first and second conductive reflective films 106 and 107, respectively, and do not require conductivity. Also, in the sensor part, electrodes 151 are provided in a pair with the LiNbO$_3$ crystal film 103 placed therebetween, for applying thereto the voltage Vm to be measured in the X-axis direction. As in the present embodiment, when an electric field is applied to the Z-axis-propagation LiNbO$_3$ crystal film 103 in the X-axis direction, an electro-optic coefficient related to the modulation index is γ22. In this case, the setting direction of the polarizer 101 and the analyzer 104 are X- or Y-direction, and the setting direction of the λ/4 plate 102 forms an angle of ±45°.

Other than the above, the optical voltage sensor according the present embodiment is basically similar in structure to that according to the thirteenth embodiment as shown in FIG. 20. Therefore, in the present embodiment, each component similar to that in the thirteenth embodiment is provided the same reference numeral, and not described herein. Also, the overall operation of the optical voltage sensor in the present embodiment is substantially similar to that in the thirteenth embodiment, and therefore not described in detail herein.

Figure 25:
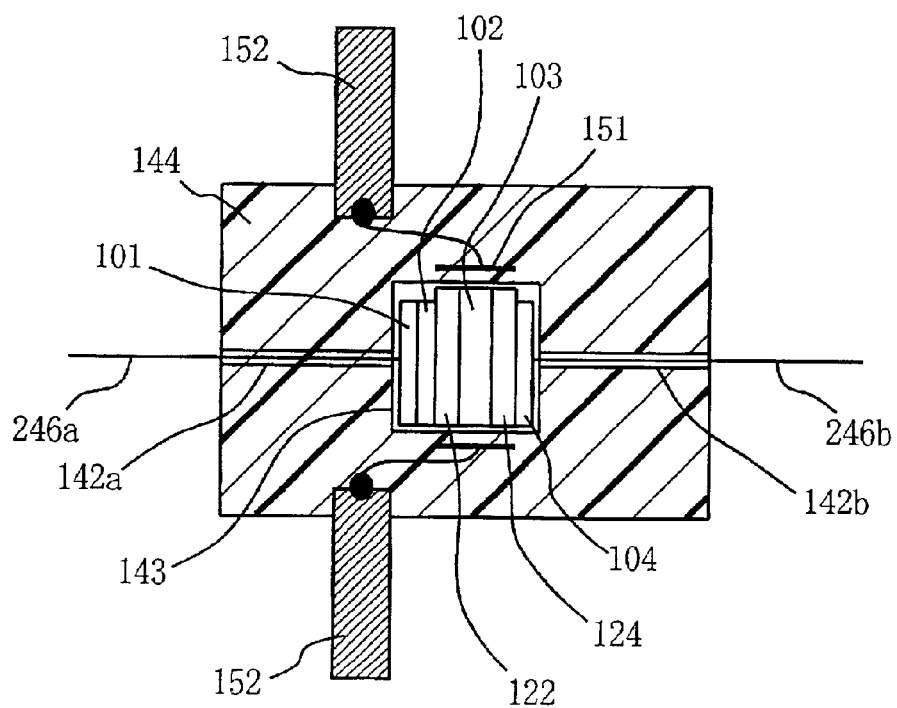
FIG. 25 is a front perspective view of the main structure of an optical voltage sensor according a seventeenth embodiment of the present invention.

FIG. 25 is a front perspective view of the optical voltage sensor according to the present embodiment, specifically showing the main part thereof. As with the sixteenth embodiment, the optical voltage sensor includes the substrate 144. Provided on the center part of the substrate 144 is the component guide 143 for closely attaching and sequentially positioning on the predetermined optical axis 108 the polarizer 101, the λ/4 plate 102, the first reflective film 122, the LiNbO$_3$ crystal film 103 as the electro-optic crystal, the second reflective film 124, and the analyzer 104 that together compose the sensor part of the optical voltage sensor. On the substrate 144, the optical fiber guides 142a and 142b structured similarly to those of the sixteenth embodiment are provided. The optical fiber guide 142a guides the optical fiber 246a composing the incidence side optical system of the light-emitting part 118, optically coupling the optical fiber 246a to the polarizer 101 positioned by the component guide 143. The optical fiber guide 142b guides the optical fiber 246b composing the output side optical system of the light-receiving part 119, optically coupling the optical fiber 246b to the analyzer 104 positioned by the component guide 143. Also provided on the substrate 144 is a pair of electrodes 152, one electrically connected to one electrode 151, and the other to the other electrode 151. Such connection is made via lead wires. Therefore, once the voltage Vm to be measured is applied between the electrodes 151, the voltage Vm is also applied to the LiNbO$_3$ film 103 as the electro-optic crystal in the X-axis direction.

In the present embodiment, an interval between the first and second reflective films 122 and 124 is set to be an integral multiple of half the wavelength of the incident light 109 supplied to the sensor part. Thus, an etalon resonator is formed therebetween, as with the thirteenth and sixteenth embodiments. With this, light propagating in the optical axis 108 direction perpendicular to the first and second reflective films 122 and 124 becomes dominant and the beam angle distribution 115 becomes steep. As a result, even if the beam state of the incident light 109 supplied to the sensor part is varied due to tolerances among the optics, the output from the present optical voltage sensor, that is, the modulation index, becomes stabilized. Furthermore, the directivity of the light passing through the sensor part can be improved.

As described above, according to the present embodiment, similarly to the sixteenth embodiment, an etalon resonator is formed in an area surrounding the LiNbO$_3$ crystal film 103 in the sensor part. Thus, the directivity of the light passing through the sensor part is improved, and axial deviation of the incident light beams to the LiNbO$_3$ crystal film 103 can be suppressed. Also, each optical component composing the sensor part is shaped like sheet or film, and positioned by the component guide 143 to be closely attached to another. Therefore, the optical path in the sensor part can be shortened to approximately 2 to 3 mm, for example. Therefore, also in the present embodiment, with the improved directivity and shortened optical path as stated above, coupling losses in the optical fibers 246a and 246b on the polarizer 101 side and the analyzer 104 side, respectively, can be made within a negligible range for actual use without using a lens. Thus, as with the sixteenth embodiment, degradation in performance as an optical sensor can be almost prevented, and the number of components and cost can be reduced.

(Eighteenth Embodiment)

Described next is an optical voltage sensor according to an eighteenth embodiment of the present invention.

The optical voltage sensor according the present embodiment is basically similar in structure to that according to the thirteenth embodiment as shown in FIG. 20. Therefore, in the present embodiment, each component similar to that in the thirteenth embodiment is provided with the same reference numeral, and not described herein. Also, the overall operation of the optical voltage sensor in the present embodiment is substantially similar to that in the thirteenth embodiment, and therefore not described in detail herein.

Figure 26:
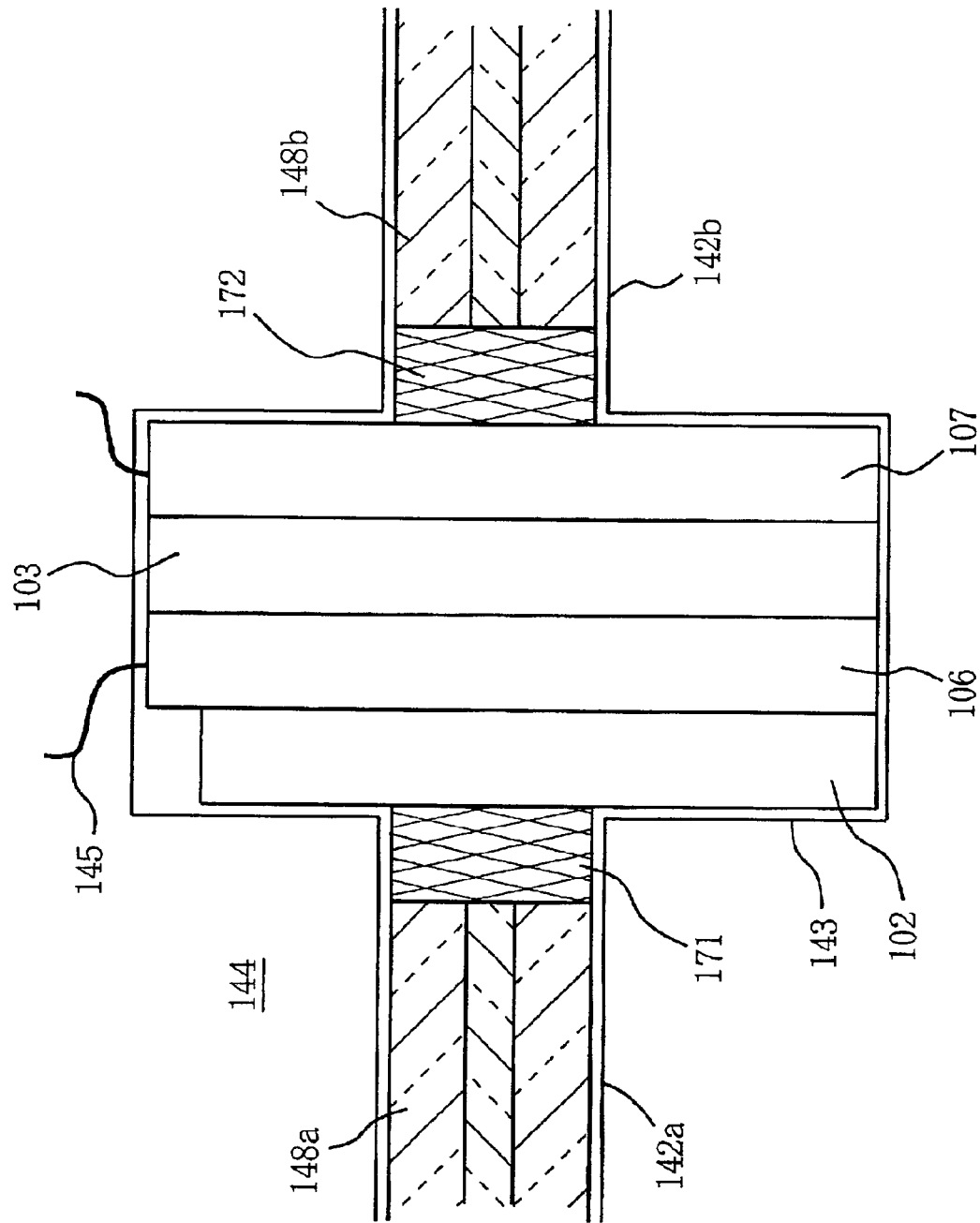
FIG. 26 is a front perspective view of the main structure of an optical voltage sensor according to an eighteenth embodiment of the present invention.

FIG. 26 is a front perspective view of the optical voltage sensor according to the present embodiment, specifically showing the main part thereof. As with the sixteenth embodiment, the optical voltage sensor includes the substrate 144. Provided on the substrate 144 are the component guide 143 for closely attaching and sequentially positioning on the predetermined optical axis 108 the optical components that together compose the sensor part of the optical voltage sensor, the incidence side optical fiber guide 142a for optically coupling an optical fiber (hereinafter "incidence side optical fiber") 148a composing the incidence side optical system of the light-emitting part 118 to a predetermined optical component positioned by the component guide 143, and the output side optical fiber guide 142b for optically coupling an optical fiber (hereinafter "output side optical fiber") 148b composing the output side optical system of the light-receiving part 119 to a predetermined optical component positioned by the component guide 143.

In the present embodiment, on one end surface of the incidence side optical fiber 148a, a photonic crystal layer functioning as a polarizer (hereinafter, "photonic-crystal polarizer") 171 is formed. On one end surface of the output side optical fiber 148b, a photonic crystal layer functioning as an analyzer (hereinafter, "photonic-crystal analyzer") 172 is formed. The component guide 143 according to the present embodiment is different from that according to the sixteenth embodiment, since being structured to closely attach and position the λ/4 plate 102, the first conductive reflective film 106, the LiNbO$_3$ crystal film 103 as the electro-optic crystal, and the second conductive reflective film 107. The incidence side fiber guide 142a guides the incidence side optical fiber 148a so that the photonic-crystal polarizer 171 formed on the end surface of the incidence side optical fiber 148a is optically coupled to the λ/4 plate 102 positioned by the component guide 143. The output side fiber guide 142b guides the output side optical fiber 148b so that the photonic-crystal analyzer 172 formed on the end surface of the output side optical fiber 148b is optically coupled to the second conductive reflective film 107 positioned by the component guide 143. Other than the above, the optical voltage sensor according the present embodiment is basically similar in structure to that according to the sixteenth embodiment. Therefore, in the present embodiment, each component similar to that in the sixteenth embodiment is provided with the same reference numeral, and not described herein. How to fabricate the photonic-crystal polarizer 171 and the photonic-crystal analyzer 172 will be described later.

In the present embodiment described above, as with the sixteenth embodiment, with the improved directivity of light in the sensor part and shortened optical path, no lens is required. Furthermore, each of a polarizer and an analyzer is formed on the end surface of the optical fiber as a photonic crystal layer, thereby further shortening the optical path. Thus, the number of components in the optical voltage sensor is further reduced and, accordingly, further cost reduction is achieved. Moreover, as with the sixteenth embodiment, an etalon resonator is formed within an area surrounding the LiNbO$_3$ crystal film 103 in the sensor part, thereby improving the directivity of the light beam. If the optical path can be shortened enough to dispense with a lens, however, such etalon resonator is not required. In this case, transparent conductive films may be used instead of the first and second conductive reflective films 106 and 107.

(Nineteenth Embodiment)

Described next is an optical voltage sensor according to a nineteenth embodiment of the present invention.

The optical voltage sensor according the present embodiment is basically similar in structure to that according to the thirteenth embodiment as shown in FIG. 20. Therefore, in the present embodiment, each component similar to that in the thirteenth embodiment is provided with the same reference numeral, and not described herein. Also, the overall operation of the optical voltage sensor in the present embodiment is substantially similar to that in the thirteenth embodiment, and therefore not described in detail herein.

Figure 27:
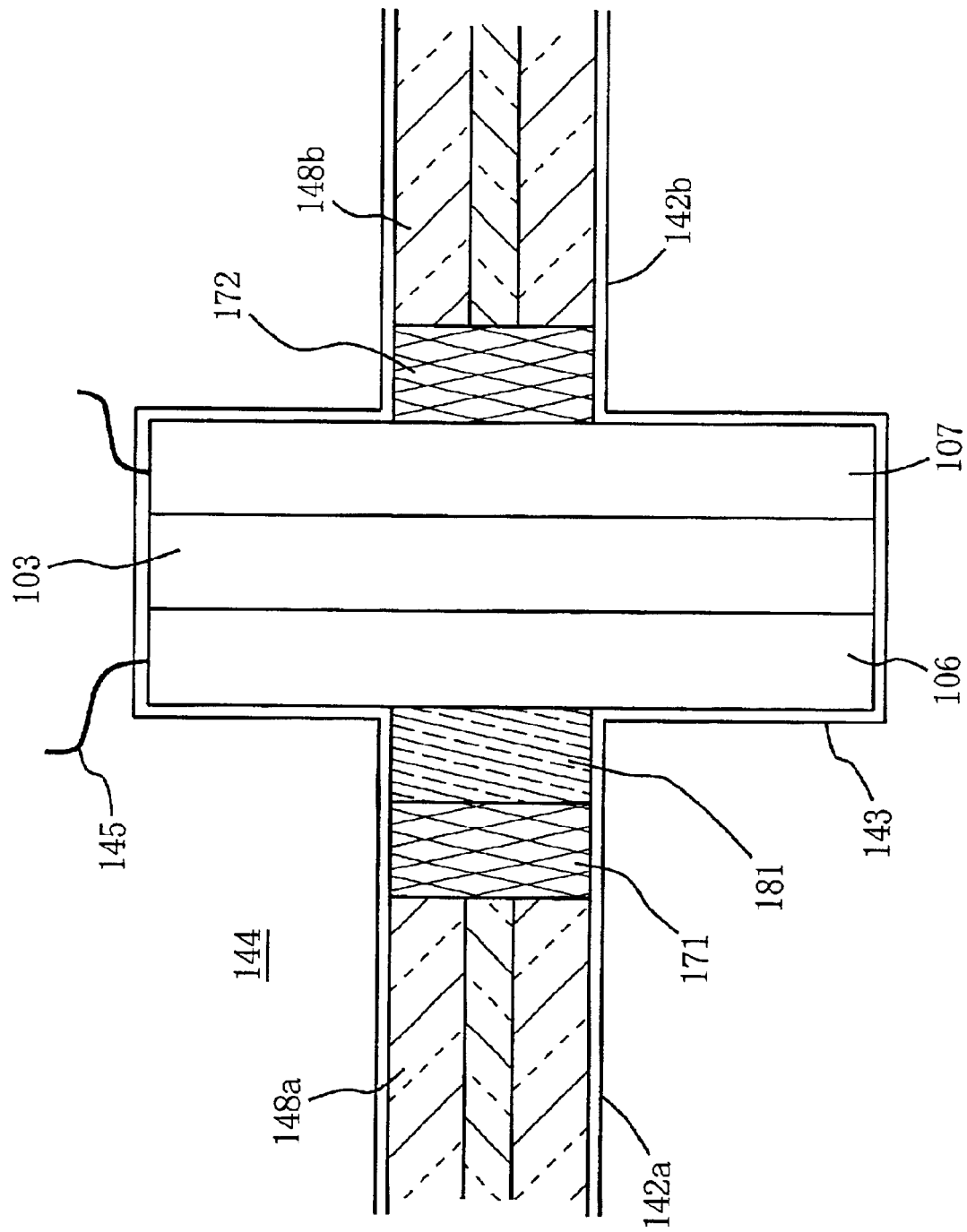
FIG. 27 is a front perspective view of the main structure of an optical voltage sensor according to a nineteenth embodiment of the present invention.

FIG. 27 is a front perspective view of the optical voltage sensor according to the present embodiment, specifically showing the main part thereof. As with the eighteenth embodiment, the optical voltage sensor includes the substrate 144. Provided on the substrate 144 are the component guide 143 for closely attaching and sequentially positioning on the predetermined optical axis 108 the optical components that together compose the sensor part of the optical voltage sensor, the incidence side optical fiber guide 142a for optically coupling the incidence side optical fiber 148a composing the incidence side optical system of the light-emitting part 118 to a predetermined optical component positioned by the component guide 143, and the output side optical fiber guide 142b for optically coupling the output side optical fiber 148b composing the output side optical system of the light-receiving part 119 to a predetermined optical component positioned by the component guide 143.

In the present embodiment, on one end surface of the incidence side optical fiber 148a, the photonic-crystal polarizer 171 is formed, which is a photonic crystal layer functioning as a linear polarizer. Further formed thereon is a photonic-crystal λ/4 plate 181, which is a photonic crystal layer functioning as a λ/4 plate. In other words, by multi-layering the photonic-crystal polarizer 171 and the photonic-crystal λ/4 plate 181, a photonic-crystal multilayered film is formed on one end surface of the incidence side optical fiber 148a for functioning as a circular polarizer. On one end surface of the output side optical fiber 148b, the photonic-crystal analyzer 172 is formed, which is a photonic crystal layer functioning as an analyzer.

The component guide 143 according to the present embodiment is different from that according to the eighteenth embodiment, since being structured to closely attach and position the first conductive reflective film 106, the LiNbO₃ crystal film 103 as the electro-optic crystal, and the second conductive reflective film 107. The incidence side fiber guide 142a guides the incidence side optical fiber 148a so that the photonic-crystal λ/4 plate 181 formed on the end surface of the incidence side optical fiber 148a is optically coupled to the first conductive reflective film 106 positioned by the component guide 143. The output side fiber guide 142b guides the output side optical fiber 148b so that the photonic-crystal analyzer 172 formed on the end surface of the output side optical fiber 148b is optically coupled to the second conductive reflective film 107 positioned by the component guide 143.

Other than the above, the optical voltage sensor according the present embodiment is basically similar in structure to that according to the sixteenth embodiment. Therefore, in the present embodiment, each component similar to that in the sixteenth embodiment is provided the same reference numeral, and not described herein. How to fabricate the photonic-crystal polarizer 171, the photonic-crystal λ/4 plate 181, and the photonic-crystal analyzer 172 will be described later.

In the present embodiment described above, as with the sixteenth embodiment, with the improved directivity of light in the sensor part and shortened optical path, no lens is required. Furthermore, each of a linear polarizer and a λ/4 plate is formed on the end surface of the incidence side optical fiber 148a and an analyzer on the end surface of the output side optical fiber 148b as a photonic crystal layer, thereby further shortening the optical path. Thus, the number of components in the optical voltage sensor is further reduced and, accordingly, further cost reduction is achieved.

(Twentieth Embodiment)

Described next is an optical voltage sensor according to a twentieth embodiment of the present invention.

The optical voltage sensor according the present embodiment is basically similar in structure to that according to the thirteenth embodiment as shown in FIG. 20. However, the polarizer 101 and the λ/4 plate 102 in the thirteenth embodiment are realized by a single circular polarizer in the present embodiment. Other than that, in the present embodiment, each component similar to that in the thirteenth embodiment is provided the same reference numeral, and not described herein. Also, the overall operation of the optical voltage sensor in the present embodiment is substantially similar to that in the thirteenth embodiment, and therefore not described in detail herein.

Figure 28:
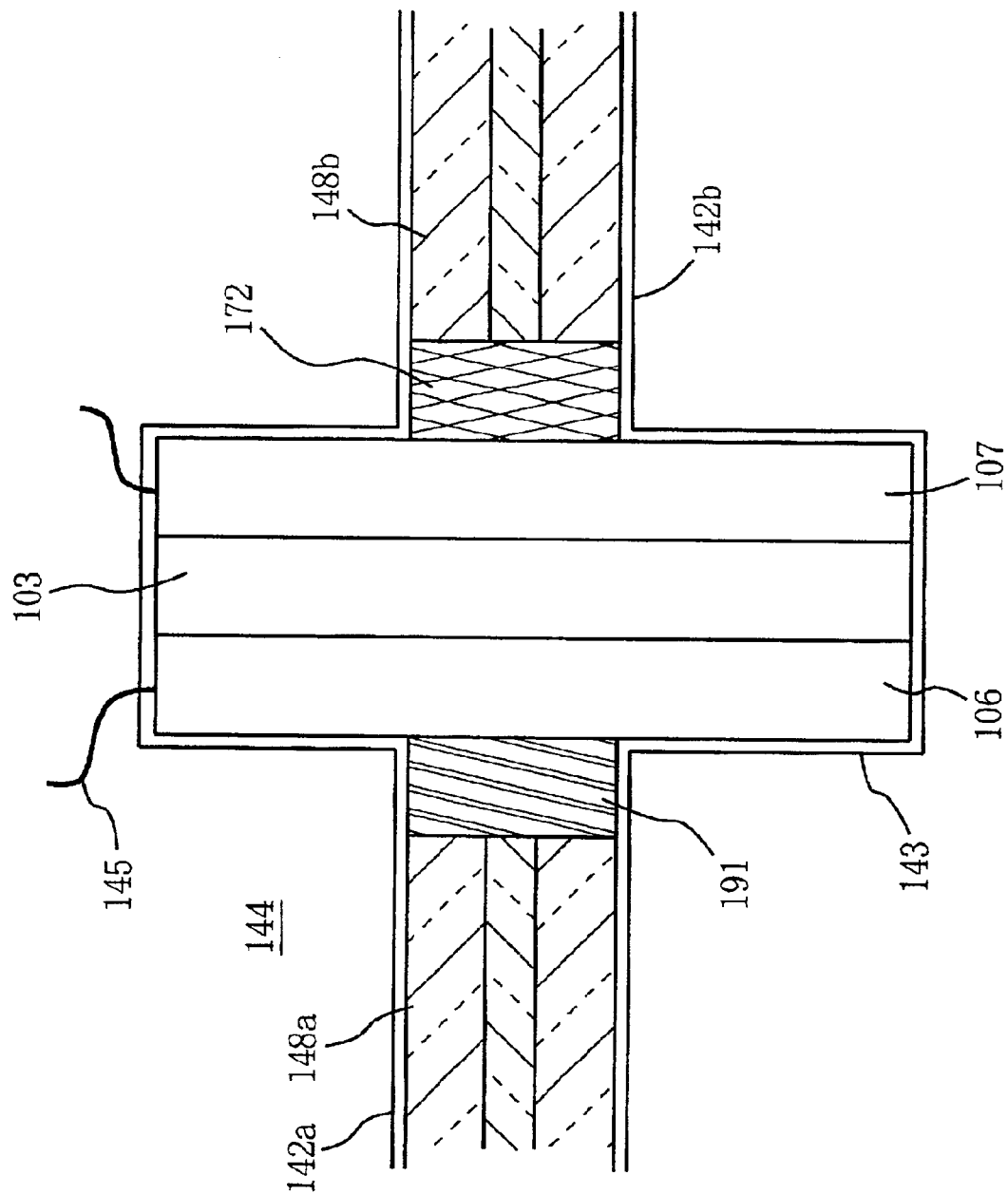
FIG. 28 is a front perspective view of the main structure of an optical voltage sensor according to a twentieth embodiment of the present invention.

FIG. 28 is a front perspective view of the optical voltage sensor according to the present embodiment, specifically showing the main part thereof. The main part is similar in structure to that of the nineteenth embodiment shown in FIG.27, except that a photonic crystal layer 191 functioning as a circular polarizer (hereinafter, "photonic-crystal circular polarizer") is formed as a single layer on one end surface of the incidence side optical fiber 148a. In this respect, the present embodiment is different from the nineteenth embodiment, in which a circular polarizer is realized by multilayering the photonic-crystal polarizer 171 and the photonic-crystal λ/4 plate 181. Also, in the present embodiment, the incidence side optical fiber guide 142a guides the incidence side optical fiber 148a so that the above photonic-crystal circular polarizer 191 formed on the end surface of the incidence side optical fiber 148a is optically coupled to the first conductive reflective film 106 positioned by the component guide 143. Other than that, the structure is similar to that of the nineteenth embodiment. How to fabricate the photonic-crystal circular polarizer 191 and the photonic-crystal analyzer 172 has been described above (refer to FIG. 1).

In the present embodiment described above, as with the nineteenth embodiment, with the improved directivity of light in the sensor part and shortened optical path, no lens is required. Furthermore, a circular polarizer is formed on the end surface of the incidence side optical fiber 148a and an analyzer on the end surface of the output side optical fiber 148b as a photonic crystal layer, thereby further shortening the optical path. Thus, as with the nineteenth embodiment, the number of components in the optical voltage sensor is further reduced and, accordingly, further cost reduction is achieved. Furthermore, in the present embodiment, the photonic-crystal polarizer 171 and the photonic-crystal λ/4 plate 181 in the nineteenth embodiment are realized by a single photonic-crystal layer functioning as a circular polarizer, that is, the photonic-crystal circular polarizer 191. Therefore, advantageously, cost can be further reduced.

(Twenty-first Embodiment)

Described next is an optical magnetic-field sensor according to a twenty-first embodiment of the present invention.

The optical magnetic-field sensor according the present embodiment includes a magneto-optic crystal film 201, instead of the λ/4 plate 102, the first conductive reflective film 106, the LiNbO₃ crystal film 103, and the second conductive reflective film 107 that are positioned by the component guide 143 in the optical voltage sensor according to the eighteenth embodiment shown in FIG. 26. For use, this optical magnetic-field sensor applies, to the magneto-optic crystal film 206 in the X-axis direction (optical axis direction), the a magnetic field induced by a current flowing through a power transmission line, an electricity distribution line, or other line, and measures the intensity of that magnetic field. Therefore, the $LiNbO_3$ crystal film 103 of the electro-optic crystal does not require electrodes or lead wires for applying an electric field (voltage). Other than that, the optical magnetic-field sensor according to the present embodiment is basically similar in structure to that according to the eighteenth embodiment. Therefore, in the present embodiment, each component similar to that in the thirteenth embodiment is provided the same reference numeral, and not described herein. Such optical magnetic-field sensor measures the intensity of the magnetic field induced by the current flowing through a power transmission line, an electricity distribution line, or other line, thereby detecting the amount of current.

Figure 29:
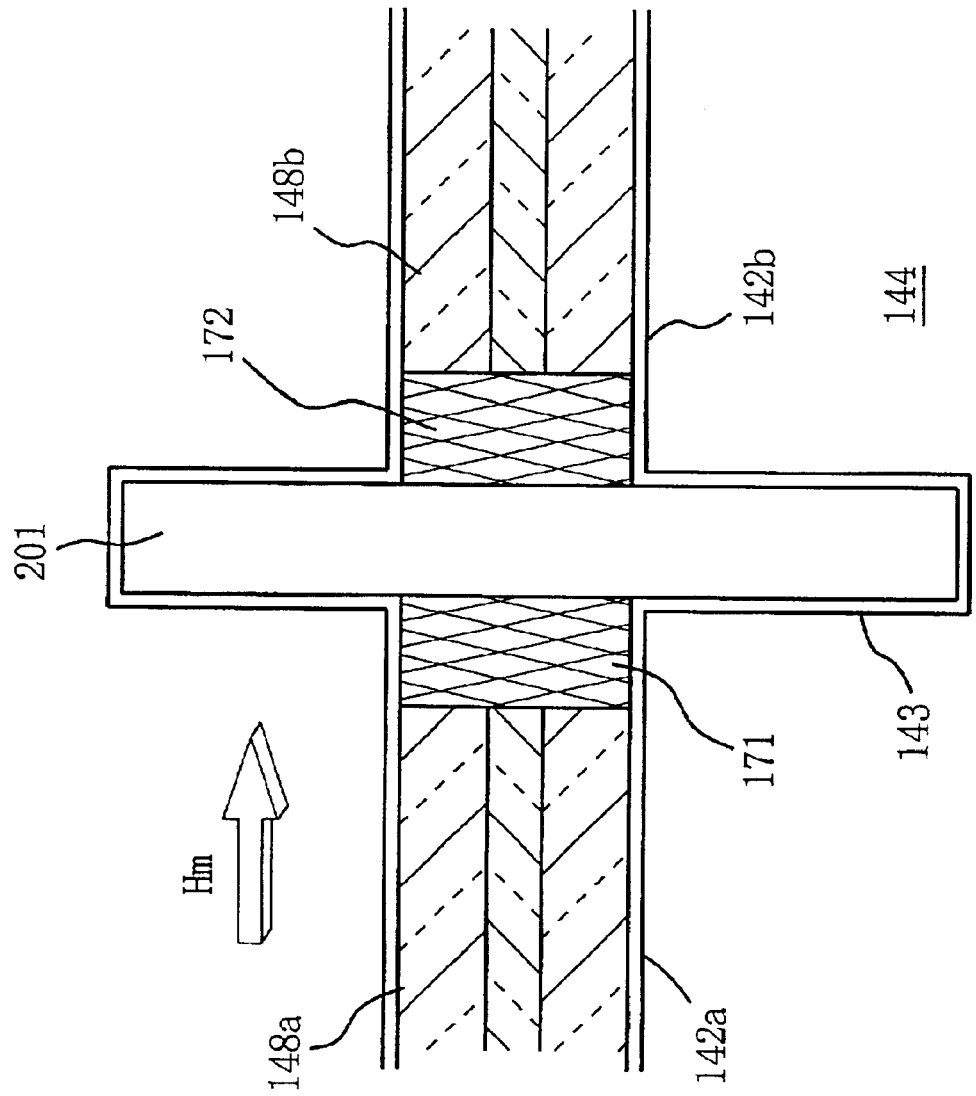
FIG. 29 is a front perspective view of the main structure of an optical magnetic-field sensor according to a twenty-first embodiment of the present invention.

FIG. 29 is a front perspective view of the optical magnetic-field sensor according to the present embodiment, specifically showing the main part thereof. This optical magnetic-field sensor includes the substrate 144. Provided on the substrate 144 are the component guide 143 for positioning the magneto-optic crystal film 201 on the predetermined optical axis 108, the incidence side optical fiber guide 142a for optically coupling the incidence side optical fiber 148a composing the incidence side optical system of the light-emitting part 118 to the magneto-optic crystal film 102 positioned by the component guide 143, and the output side optical fiber guide 142b for optically coupling the output side optical fiber 148b composing the output side optical system of the light-receiving part 119 to the magneto-optic crystal film 201 positioned by the component guide 143.

In the present embodiment, as with the eighteenth embodiment, on one end surface of the incidence side optical fiber 148a, the photonic-crystal polarizer 171 functioning as a linear polarizer 171 is formed. On one end surface of the output side optical fiber 148b, the photonic-crystal analyzer 172 is formed. The incidence side fiber guide 142a guides the incidence side optical fiber 148a so that the photonic-crystal polarizer 171 formed on the end surface of the incidence side optical fiber 148a is optically coupled to one end surface of the magneto-optic crystal film 201 positioned by the component guide 143. The output side fiber guide 142b guides the output side optical fiber 148b so that the photonic-crystal analyzer 172 formed on the end surface of the output side optical fiber 148b is optically coupled to the other end surface of the magneto-optic crystal film 201 positioned by the component guide 143. In this manner, the photonic-crystal polarizer and analyzer 171 and 172 optically coupled to the two surfaces of the magneto-optic crystal film 201 are so set as that their setting directions have an angle of 45°. Therefore, a direction of polarization of the linearly polarized light after passing through the photonic-crystal polarizer 171 deviates by 45 degrees from that after passing through the photonic-crystal analyzer 172.

In the above optical magnetic-field sensor as structured above, unpolarized light emitted from the light source of the light emitting part passes through the photonic-crystal polarizer 171 formed on the end surface of the incidence side optical fiber 148a to become linearly polarized light. The linearly polarized light goes into the magneto-optic crystal film 201, in which the direction of polarization is rotated by an angle according to the intensity of components of a magnetic field Hm that are perpendicularly applied to the magneto-optic crystal film 201. After passing through the magneto-optic crystal film 201, the linearly polarized light goes through the photonic-crystal analyzer 172 formed on the end surface of the output side optical fiber 148 to an optical-electrical conversion device in the light-receiving part, and converted therein into an electrical signal. The amount of light of the linearly polarized light is changed according to the rotation angle of the direction of polarization in the magneto-optic crystal film 102. Therefore, based on the electrical signal outputted from the optical-electrical conversion device in the light-receiving part, the intensity of the magnetic field Hm applied to the magneto-optic crystal film 201 is changed.

According to the present embodiment described above, each of a polarizer and an analyzer is formed on the end surface of the optical fiber as a photonic crystal layer. Therefore, the number of components is reduced. Also, it is possible to shorten the optical path, in which the light from the light source in the light-emitting part comes into the incidence side optical fiber 148a, goes through the polarizer 171, the magneto-optic crystal film 201, and the analyzer 172, and reaches the end surface of the output side optical fiber 148b. With this shortened optical path, no lens is required in the present embodiment, thereby further reducing the number of components and, accordingly, reducing cost.

(Twenty-Second Embodiment)

Described next is an optical voltage sensor according to a twenty-second embodiment of the present invention.

The optical voltage sensor according to the present embodiment is of longitudinal-modulation type, and basically similar in structure to that according to the thirteenth embodiment (refer to FIG. 20). On the other hand, the specific structure is similar to that according to the conventional optical voltage sensor shown in FIG. 33, where a cubic PBS (Polarization Beam Splitter) is used.

Figure 30:
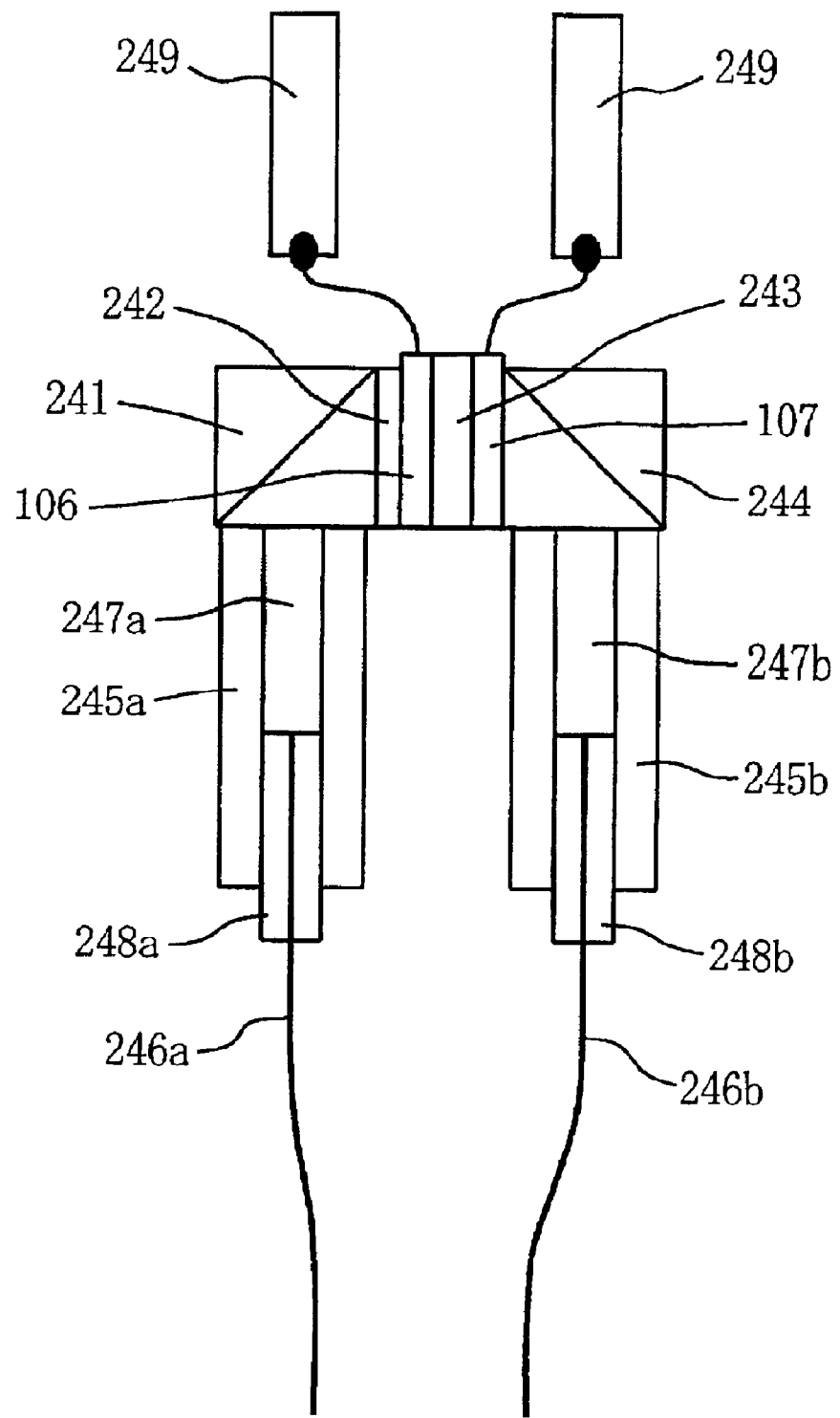
FIG. 30 is a front perspective view of an optical magnetic field sensor according to a twenty-second embodiment of the present invention.
Figure 31:
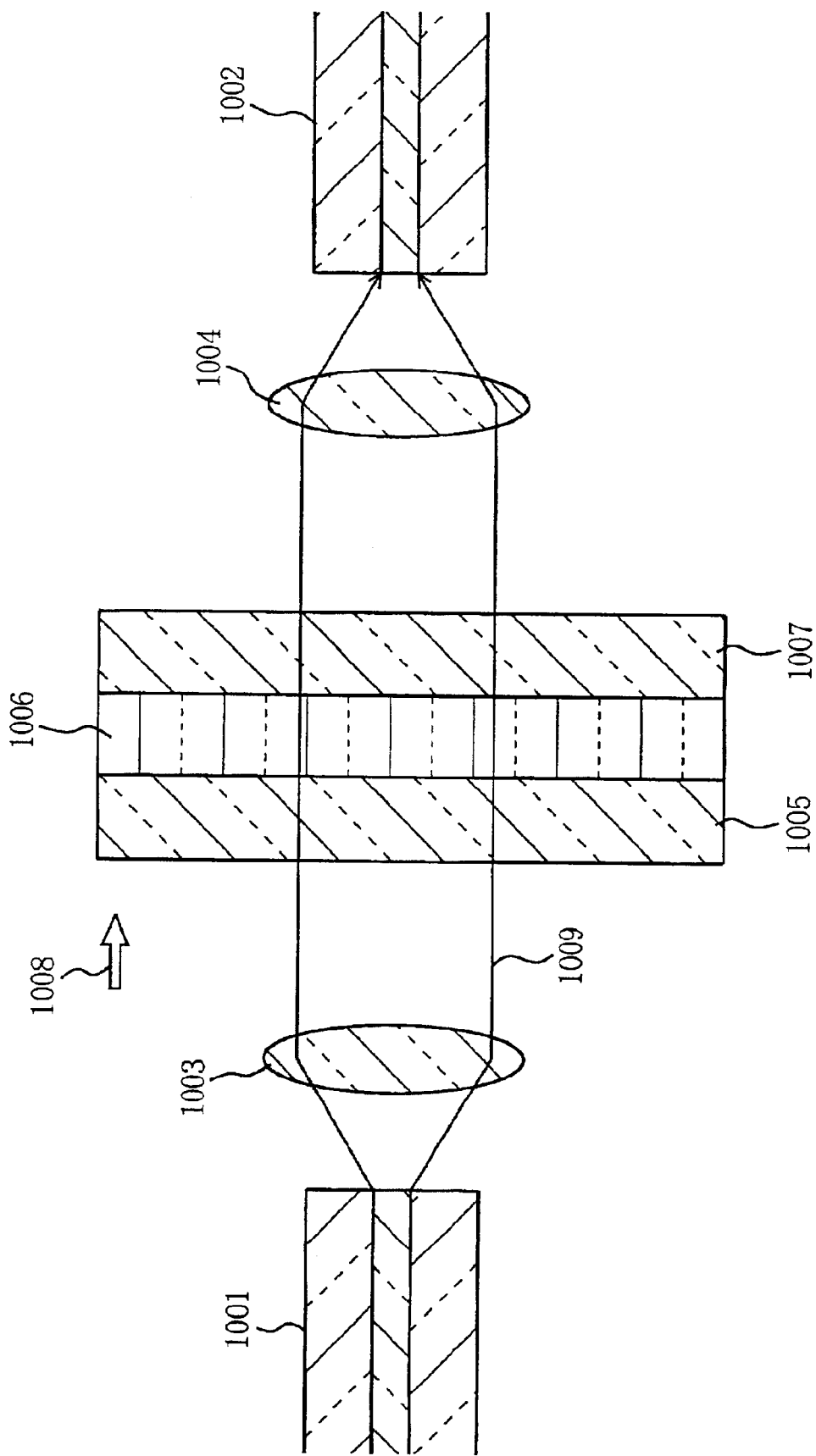
FIG. 31 is a schematic diagram showing the structure of an optical isolator, which is one of conventional optical devices.
Figure 32:
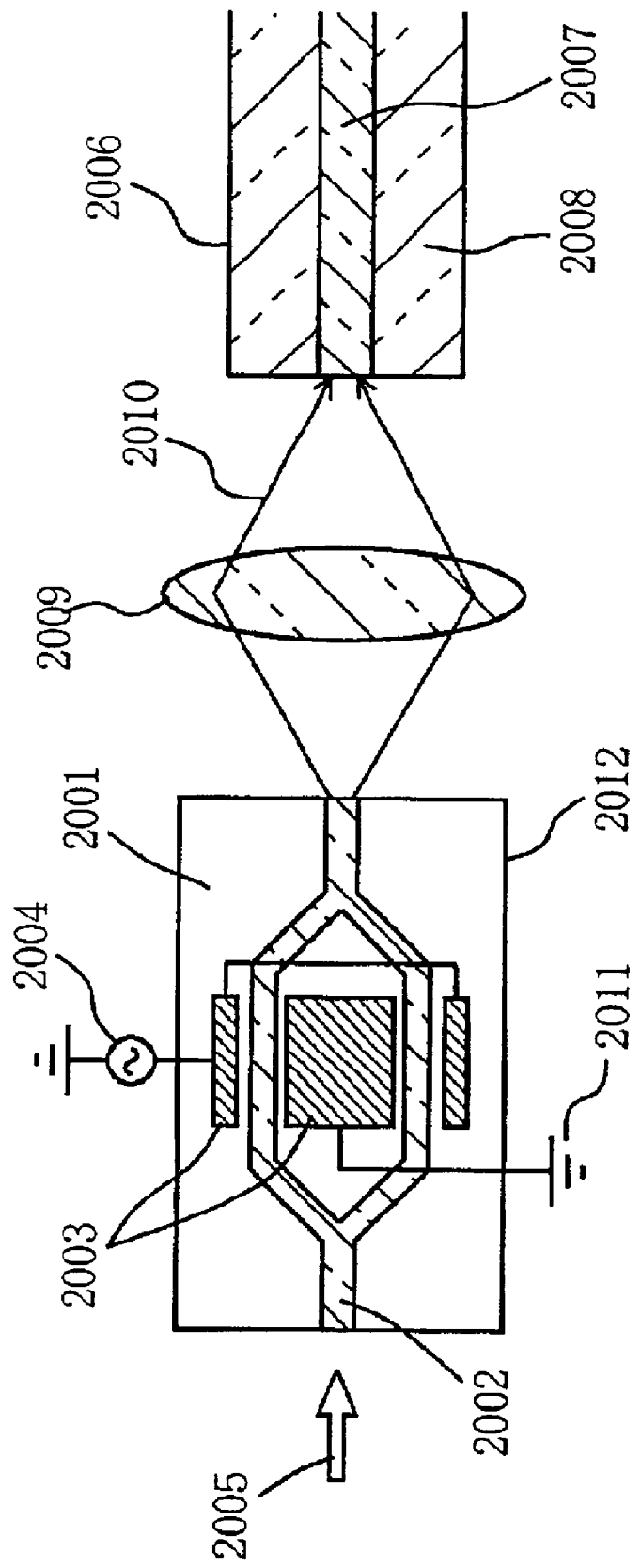
FIG. 32 is a schematic diagram showing the structure of a Mach-Zehnder type modulator.

FIG. 30 is a front perspective view of the optical voltage sensor according to the present embodiment, specifically showing the structure. This optical voltage sensor includes the sensor part, the light-emitting part, the signal processing circuits on the light-emitting side and the light-receiving side (not shown). The sensor part includes a cubic PBS 241 as a polarizer, a λ/4 plate 242, the first conductive reflective film 106, an electro-optic crystal 242, the second conductive reflective film 107, and a cubic PBS 244 as an analyzer, all placed sequentially on the same optical axis. The light-emitting part is structured by the E/O circuit including the light-emitting device as a light source, and the incidence side optical system composed of the optical fiber 246a, the ferrule 248a, a GRIN lens 247a of 0.25 pitch, and a holder 245a, all of these arranged on the same optical axis and attached together on each optical axis plane with an adhesive. The light-emitting part includes the output side optical system composed of the optical fiber 246b, the ferrule 248b, the GRIN lens 247b of 0.25 pitch, and the holder 245b, all of these arranged on the same optical axis and attached together on each optical axis plane with an adhesive, and the O/E circuit including the device for converting an optical signal emitted from the output side optical system into an electrical signal.

In the sensor part of the above optical voltage sensor, the polarizer 241, the λ/4 plate 242, the first conductive reflective film 106, the electro-optic crystal 243, the second conductive reflective film 107, and the analyzer 244 all arranged on the same optical axis are attached together on each optical axis plane with an adhesive. The first conductive reflective film 106 is connected to one of the electrodes 249, while the second conductive reflective film 107 to the other. The voltage Vm to be measured is applied between these electrodes 249.

The signal processing circuits in the light-emitting and light-receiving sides are respectively connected through the light-emitting part and the light-receiving part to the sensor part. In the sensor part, the polarizer 241 is fixed, with an adhesive, at its plane of incidence to the optical axis plane of the GRIN lens 247a in the light-emitting part. The analyzer 244 is fixed, with an adhesive, at its plane of emittance to the optical axis plane of the GRIN lens 247b. The adhesively fixed sensor part, incidence side optical system in the light-emitting part, and output side optical system in the light-receiving part are mechanically fixed to a case (not shown). As the adhesive for the optical components in the above optical voltage sensor, epoxy resin or urethane resin is used. In this optical voltage sensor, used as the electro-optic crystal 243 is $Bi_{12}SiO_{20}$ (BSO), $KH_2PO_4$ (KDP), or a natural birefringent material such as $LiNbO_3$ and $LiTaO_3$, for example.

In the above structure, attached together at each optical plane with an adhesive are the light-emitting part and the sensor part, the light-receiving part and the sensor part, their components. However, each optical component composing the sensor part is preferably supported by frictions between the surfaces. That is, attached at each optical axis plane without an adhesive are as follows: the cubic PBS as the polarizer 241 of the emittance side and the λ/4 plate 242 of the incidence side; the λ/4 plate 242 of the emittance side and the first conductive reflective film 106 of the incidence side; the first conductive reflective film 106 of the emittance side and the electro-optic crystal 243 of the incidence side; the electro-optic crystal 243 of the emittance side and the second conductive reflective film 107 of the incidence side; and the second conductive reflective film 107 of the emittance side and the analyzer 244 of the incidence side. Via these five non-adhesive surfaces, the λ/4 plate 242, the first conductive reflection film 106, the electro-optic crystal 243, and the second conductive reflection film 107 are supported by friction with appropriate force between the polarizer 241 adhesively attached to the incidence side optical system and the analyzer 244 adhesively attached to the output side optical system. With such structure, the temperature dependency of the electro-optic crystal 243 can be improved by relaxing stress thereto (refer to Japanese Patent Laid-Open Publication No. 9-145745 (1997-145745)).

In the sensor part according to the present embodiment, as with the thirteenth embodiment, the thickness of each optical component composing the sensor part, for example is so structured that the interval between the first and second conductive reflective films 106 and 107 becomes an integral multiple of half the wavelength of incident light supplied to the sensor part. Thus, in an area surrounding the electro-optic crystal 243 therebetween, an etalon resonator is formed.

According to the present embodiment as described above, with such etalon resonator, the state of light beam becomes stabilized. Therefore, even if the beam state of the incident light 109 to the sensor part is varied due to tolerances among optics, the temperature dependency of the output from the optical voltage sensor is not varied and becomes stabilized.

While the invention has been described in detail, the foregoing description is in all aspects illustrative and not restrictive. It is understood that numerous other modifications and variations can be devised without departing from the scope of the invention.

What is claimed is:

1. A method of fabricating a photonic crystal comprising forming the photonic crystal directly on an end surface of at least one optical fiber as a substrate.

2. The photonic crystal fabricating method according to claim 1, wherein
said forming operation comprises:
tying a plurality of optical fibers in bundle with each end surface aligned on a same plane to form an optical fiber bundle; and
growing the photonic crystal directly on an end surface of the optical fiber bundle formed by the end surfaces of the optical fibers aligned on the same plane as the substrate,
wherein by separating the optical fiber bundle into the optical fibers, the photonic crystal formed on the end surface of the optical fiber is obtained.

3. The photonic crystal fabricating method according to claim 1, further comprising:
processing the end surface of the optical fiber so that the end surface forms a predetermined angle with an optical axis of the optical fiber,
wherein said forming operation comprises growing the photonic crystal directly on the processed end surface as the substrate in a direction normal to the end surface.

4. The photonic crystal fabricating method according to claim 1, wherein
said forming operation comprises growing the photonic crystal on the substrate by periodically multilayering particles having a refractive index higher than air on the substrate in a direction normal to the substrate.

5. The photonic crystal fabricating method according to claim 1, wherein
said forming operation comprises forming a pattern on the substrate for arbitrarily arranging particles having a refractive index higher than air on the substrate.

6. An optical device comprising:
a first optical fiber having a core and a plurality of holes parallel to each other penetrating through said core in a predetermined section along an optical axis and periodically distributed on a plane perpendicular to a longitudinal direction of said holes;
a second optical fiber having a core and a plurality of holes parallel to each other penetrating through said core in a predetermined section along an optical axis and periodically distributed on a plane perpendicular to a longitudinal direction of said holes;
a Faraday device placed to be closely attached between said first and second optical fibers; and
a guide for mechanically adjusting the optical axis of said first optical fiber and the optical axis of said second optical fiber, wherein
the longitudinal direction of said holes of said first optical fiber forms an angle of 45° with the longitudinal direction of said holes of said second optical fiber along a plane perpendicular to the optical axis.

7. A method of fabricating a photonic crystal comprising:
forming, in a predetermined section along an optical axis of an optical fiber having a core adapted to have light propagate therethrough and a clad surrounding the core, at least one pair of planes parallel to the optical axis by partially removing the clad in the predetermined section from the optical fiber toward the core; and forming, perpendicular to the pair of planes formed in said forming operation, a plurality of holes penetrating the core.

8. An optical transmission member for transmitting light having a predetermined wavelength, the optical transmission member comprising:
   an optical fiber for transmitting the light inputted at one end surface thereof to another end surface thereof for output; and
   a photonic crystal layer formed on at least one of the one end surface and the another end surface of said optical fiber, said photonic crystal layer adapted as a linear polarizer for the light having the wavelength.

9. An optical transmission member for transmitting light having a predetermined wavelength, the optical transmission member comprising:
   an optical fiber for transmitting the light inputted at one end surface thereof to another end surface thereof for output; and
   a photonic crystal layer formed on at least one of the one end surface and the another end surface of said optical fiber, said photonic crystal layer adapted as a λ/4 plate for the light having the wavelength.

10. An optical transmission member for transmitting light having a predetermined wavelength, optical transmission member comprising:
    an optical fiber for transmitting the light inputted at one end surface thereof to another end surface thereof for output; and
    at least one photonic crystal layer formed on at least one of the one end surface and the another end surface of said optical fiber, said photonic crystal layer adapted as a photonic-crystal circular polarizer for the light having the wavelength.

11. The optical transmission member according to claim 10, wherein
    said at least one photonic crystal layer includes:
      a first photonic crystal layer adapted as a polarizer for convening unpolarized light of the wavelength into linearly polarized light; and
      a second photonic crystal layer adapted as a λ/4 plate for converting the linearly polarized light of the wavelength obtained though said first photonic crystal layer into circularly polarized light.

12. The optical transmission member according to claim 10, wherein
    said at least one photonic crystal layer is a plurality of photonic crystal layers having a periodic structure with a high magnetic permeability portion having first magnetic permeability and a low magnetic permeability portion having second magnetic permeability lower than the first magnetic permeability.

13. An optical device comprising:
    an optical fiber having a core adapted to have light propagate therethrough and a clad surrounding said core, wherein a portion of said clad in a predetermined section of said optical fiber has been removed from said optical fiber toward said core to form at least one pair of planes parallel to an optical axis of said optical fiber, said optical fiber having:
      at least one functional part, formed as a photonic crystal, having a plurality of columns penetrating through said core and being perpendicular to said pair of planes; and
      a propagation part for propagating the light as a function of said optical fiber.

14. The optical device according to claim 13, wherein
    said plurality of columns are parallel to each other and periodically distributed on a plane perpendicular to a longitudinal direction of said plurality columns.

15. The optical device according to claim 13, wherein
    said plurality of columns penetrate through said core and said clad of said optical fiber.

16. The optical device according to claim 13, wherein
    said plurality of columns have a refractive index different from a refractive index of material forming said core.

17. The optical device according to claim 16, wherein
    at least a of said plurality of columns is a hole.

18. The optical device according to claim 16, wherein
    at least a part of said plurality of columns is made of material having a Faraday effect.

19. The optical device according to claim 18, further comprising a magnetic field generator for applying a magnetic field to said functional part.

20. The optical device according to claim 16, wherein
    at least a part of said plurality of columns is made of material having an electro-optic effect.

21. The optical device according to claim 20, further comprising a plurality of electrodes for applying an electric field to said functional part.

22. The optical device according to claim 21, wherein
    said electrodes are provided on a surface formed by partially removing said clad.

23. The optical device according to claim 22, wherein
    said electrodes are a pair of electrodes located on a surface perpendicular to a longitudinal direction of said plurality of columns forming said functional part.

24. The optical device according to claim 22, wherein
    said electrodes are a pair of electrodes located on two surfaces parallel and opposed to each other with said functional part therebetween, said pair of electrodes also being perpendicular to a longitudinal direction of said plurality of columns forming said functional part.

25. The optical device according to claim 22, wherein
    said electrodes are a pair of electrodes on two surfaces parallel and opposed to each other with said functional part therebetween, said pair of electrodes also being parallel to the optical axis and a longitudinal direction of said plurality of columns forming said functional part.

26. The optical device according to claim 21, wherein
    said electrodes are arranged to apply the electric field to said functional part in a direction parallel to the optical axis of said optical fiber.

27. The optical device according to claim 21, wherein
    said electrodes are arranged to apply the electric field to said functional part perpendicularly to a longitudinal direction of said plurality of columns forming said functional part and the optical axis of said optical fiber.

28. The optical device according to claim 21, wherein
    said electrodes are arranged to apply the electric field to form a predetermined angle with a longitudinal direction of said plurality of columns along a plane perpendicular to the optical axis.

29. The optical device according to claim 13, wherein
    said functional part is a plurality of functional parts provided along the optical axis of said optical fiber at predetermined intervals.

30. The optical device according to claim 29, wherein
    said plurality of columns of a first functional part of said plurality of functional parts are parallel to each other and periodically distributed on a plane perpendicular to a longitudinal direction of said columns, and said plurality of columns are made of a Faraday crystal having a refractive index different from a refractive index of material forming said core, said plurality of columns of a second functional part of said plurality of functional parts are holes parallel to each other and distributed on a plane perpendicular to a longitudinal direction of said holes, and the longitudinal direction of said plurality of columns of said first functional part forms an angle of 45° with the longitudinal direction of said holes of said second functional part along a plane perpendicular to the optical axis.

31. The optical device according to claim 29, wherein said plurality of columns of a first functional part of said plurality of functional parts are parallel to each other and periodically distributed on a plane perpendicular to a longitudinal direction of said plurality of columns, and said plurality of columns are made of an electro-optic crystal having a refractive index different from a refractive index of material forming said core, said plurality of columns of a second functional part of said plurality of functional parts are first holes parallel to each other and distributed on a plane perpendicular to a longitudinal direction of said first holes, and the longitudinal direction of said plurality of columns of said first functional part is perpendicular or parallel to the longitudinal direction of said first holes of said second functional part along a plane perpendicular to the optical axis.

32. The optical device according to claim 31, wherein said plurality of columns of a third functional part of said plurality of functional parts are second holes parallel to each other and periodically distributed on a plane in a longitudinal direction of said second holes, and the longitudinal direction of said plurality of columns of said first functional part is perpendicular or parallel to the longitudinal direction of said second holes of said third functional part along the plane perpendicular to the optical axis.

33. The optical device according to claim 13, wherein said functional part has a predetermined refractive index and state of distribution to have a wavelength dispersion characteristic of recovering a waveform of the light to be a steep waveform for output, the light being spread by a wavelength dispersion characteristic unique to an optical fiber through which the light passed before being inputted to said optical fiber.

34. The optical device according to claim 13, further comprising a guide for surrounding said optical fiber, wherein said guide is cylindrically shaped and has a diameter approximately equal to a diameter of a ferrule of another optical fiber connected to said optical fiber.

* * * * *

UNITED STATES PATENT AND TRADEMARK OFFICE
CERTIFICATE OF CORRECTION

PATENT NO. : 6,798,960 B2 Page 1 of 1
DATED : September 28, 2004
INVENTOR(S) : Hidenobu Hamada It is certified that error appears in the above-identified patent and that said Letters Patent is hereby corrected as shown below:

Title page,
Item [56], References Cited, OTHER PUBLICATIONS, insert:
-- Knight et al, "All-silica single-mode optical fiber with photonic crystal cladding", Optics Letters, Vol. 21, No. 19, pp.1547-1549 --.

Signed and Sealed this

Seventh Day of March, 2006

JON W. DUDAS
*Director of the United States Patent and Trademark Office*